(12) United States Patent
Banning et al.

(10) Patent No.: US 6,755,902 B2
(45) Date of Patent: Jun. 29, 2004

(54) PHASE CHANGE INKS CONTAINING AZO PYRIDONE COLORANTS

(75) Inventors: Jeffrey H. Banning, Hillsboro, OR (US); Bo Wu, Wilsonville, OR (US); James D. Mayo, Mississauga (CA); James M. Duff, Mississauga (CA); Rina Carlini, Mississagua (CA); Jule W. Thomas, Jr., West Linn, OR (US); Paul F. Smith, Oakville (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/185,264

(22) Filed: Jun. 27, 2002

(65) Prior Publication Data

US 2004/0007155 A1 Jan. 15, 2004

(51) Int. Cl.$^7$ .............................................. C09D 11/00
(52) U.S. Cl. ............................... 106/31.29; 106/31.61; 106/31.48; 106/31.77; 106/31.3; 106/31.62; 106/31.58; 106/31.86
(58) Field of Search ......................... 106/31.29, 31.61, 106/31.48, 31.77, 31.3, 31.62, 31.58, 31.86

(56) References Cited

U.S. PATENT DOCUMENTS

| | | | |
|---|---|---|---|
| 3,653,932 A | 4/1972 | Berry et al. ............... | 106/22 |
| 3,957,749 A | 5/1976 | von Brachel et al. ....... | 260/156 |
| 4,083,842 A | 4/1978 | Burkhard et al. ........... | 260/156 |
| 4,216,145 A | 8/1980 | Battisti et al. ............. | 260/156 |
| 4,247,456 A | 1/1981 | von Brachel et al. ....... | 260/156 |
| 4,359,418 A | 11/1982 | Lienhard et al. ........... | 260/156 |
| 4,380,452 A | 4/1983 | Loeffler et al. ............. | 8/532 |
| 4,390,369 A | 6/1983 | Merritt et al. .............. | 106/31 |
| 4,484,948 A | 11/1984 | Merritt et al. .............. | 106/31 |
| 4,644,058 A | 2/1987 | Shimidzu et al. .......... | 534/635 |
| 4,684,956 A | 8/1987 | Ball .......................... | 346/1.1 |
| 4,734,349 A | 3/1988 | Chapman et al. .......... | 430/106 |
| 4,739,042 A | 4/1988 | Lorenz et al. .............. | 534/649 |
| 4,851,045 A | 7/1989 | Taniguchi .................. | 106/31 |
| 4,889,560 A | 12/1989 | Jaeger et al. ............... | 106/27 |
| 4,889,761 A | 12/1989 | Titterington et al. ....... | 428/195 |
| 4,994,564 A | 2/1991 | Etzbach et al. ............ | 534/766 |
| 5,006,170 A | 4/1991 | Schwarz et al. ............ | 106/20 |
| 5,037,964 A | 8/1991 | Moser et al. ............... | 534/608 |
| 5,041,413 A | 8/1991 | Evans et al. ............... | 503/227 |
| 5,066,791 A | 11/1991 | Hansen et al. ............. | 534/772 |
| 5,151,120 A | 9/1992 | You et al. .................. | 106/27 |
| 5,221,335 A | 6/1993 | Williams et al. ........... | 106/23 |
| 5,372,852 A | 12/1994 | Titterington et al. ....... | 427/288 |
| 5,413,630 A | 5/1995 | Schwarz et al. ............ | 106/22 |
| 5,496,879 A | 3/1996 | Griebel et al. ............. | 524/320 |
| 5,621,022 A | 4/1997 | Jaeger et al. ............... | 523/161 |
| 5,827,918 A | 10/1998 | Titterington et al. ....... | 524/590 |
| 5,902,841 A | 5/1999 | Jaeger et al. ............... | 523/161 |
| 5,919,839 A | 7/1999 | Titterington et al. ....... | 523/161 |
| 5,929,218 A | 7/1999 | Lee et al. ................... | 534/772 |
| 6,406,526 B1 | 6/2002 | Meyrick et al. ........... | 106/31.48 |

FOREIGN PATENT DOCUMENTS

| | | |
|---|---|---|
| DE | 3538517 A1 | 5/1986 |
| EP | 1 559 001 | 1/1980 |
| EP | 0 023 770 A1 | 2/1981 |
| EP | 0 083 553 A1 | 12/1982 |
| EP | 0 142 863 B1 | 5/1985 |
| EP | 0 172 283 A1 | 2/1986 |
| EP | 0 187 352 A2 | 7/1986 |
| EP | 0 206 286 A1 | 12/1986 |
| EP | 0 247 737 A1 | 12/1987 |
| EP | 268897 | 6/1988 |
| EP | 0 302 401 A1 | 7/1988 |
| EP | 0 314 002 B1 | 9/1991 |
| EP | 0 468 647 B1 | 1/1992 |
| EP | 0 404 493 B1 | 5/1994 |
| EP | 0 319 234 B1 | 3/1995 |
| EP | 0 524 637 B1 | 3/1996 |
| EP | 0 529 282 B1 | 10/1996 |
| EP | 0 706 679 B1 | 9/1997 |
| EP | 0 844 287 B1 | 5/2000 |
| EP | 1 125 990 A1 | 8/2001 |
| EP | 1 168 046 A1 | 1/2002 |
| GB | 1 455 632 | 11/1976 |
| GB | 2 008 606 A | 6/1979 |
| IN | 147868 | 7/1980 |
| KR | 119563 | 8/1997 |
| WO | WO 94/04619 | 3/1994 |
| WO | WO 98/59008 | 12/1998 |
| WO | WO 99/43754 | 9/1999 |
| WO | WO 01/21714 A2 | 3/2001 |
| WO | WO 01/09256 A1 | 8/2001 |

OTHER PUBLICATIONS

Copending application U.S. Ser. No. 10/185,261 (Attorney Docket No. D/A2233), filed Jun. 27, 2002, entitled "Processes for Preparing Dianthranilate Compounds and Diazopyridone Colorants," by Rina Carlini et al.

Copending application U.S. Ser. No. 10/185,994 (Attorney Docket No. D/A2234), filed Jun. 27, 2002, entitled "Dimeric Azo Pyridone Colorants," by Rina Carlini et al.

Copending application U.S. Ser. No. 10/184,269 (Attorney Docket No. D/A2236), filed Jun. 27, 2002, entitled "Phase Change Inks Containing Dimeric Azo Pyridone Colorants," by Bo Wu et al.

(List continued on next page.)

*Primary Examiner*—Mark L. Bell
*Assistant Examiner*—Veronica F. Faison
(74) *Attorney, Agent, or Firm*—Judith L. Byorick

(57) ABSTRACT

Disclosed is a phase change ink composition comprising a phase change ink carrier and a colorant compound of the formula

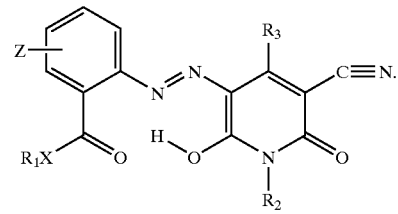

76 Claims, No Drawings

OTHER PUBLICATIONS

Copending application U.S. Ser. No. 10/186,024 (Attorney Docket No. D/A2238), filed Jun. 27, 2002, entitled "Azo Pyridone Colorants," by Jeffery H. Banning etal.

Copending application U.S. Ser. No. 10/185,597 (Attorney Docket No. D/A2239), filed Jun. 27, 2002, entitled "Process for Preparing Substituted Pyridone Compounds," by James D. Mayo et al.

Copending application U.S. Ser. No. 10/185,828 (Attorney Docket No. D/A2278), filed Jun. 27, 2002, entitled "Method for Making Dimeric Azo Pyridone Colorants," by Rina Carlini et al.

Copending application U.S. Ser. No. 10/186,023 (Attorney Docket No. D/A2281), filed Jun. 27, 2002, entitled "Dimeric Azo Pyridone Colorants," by Rina Carlini et al.

Copending application U.S. Ser. No. 10/184,266 (Attorney Docket No. D/A2281Q), filed Jun. 27, 2002, entitled "Phase Change Inks Containing Dimeric Azo Pyridone Colorants," by Bo Wu et al.

English Abstract for German Patent Publication DE 4205636, Aug. 1993.

English Abstract for German Patent Publication DE 4205713, Aug. 1993.

English Abstract for Japanese Patent Publication JP 05331382, Dec. 1993.

English Abstract for German Patent Publication DE 19646430, May 1997.

English Abstract for German Patent Publication DE 19646429, May 1997.

English Abstract for German Patent Publication DE 19647869, May 1997.

English Abstract for Japanese Patent Publication JP 3192158, Aug. 1991.

"Preparation and Evaluation of Yellow Pigments Based on H–Pyridone and Esters of Aminoterephthalic Acid," P. Slosar et al., CHEMagazin, vol. 9, No. 6, pp. 8–11 (1999) (Not translated), no month available.

"Synthesis, Morphology, and Optical Properties of Tetrahedral Oligo(phenylenevinylene) Materials," S. Wang et al., *J. Am. Chem. Soc.*, vol. 120, p. 5695 (2000), Jun.

"Synthesis of Amphiphilic Diblock Copolymers Containing a Conjugated Block and Their Self–Assembling Properties," H. Wang et al., *J. Am. Chem. Soc.*, vol. 122, p. 6855 (2000), Jul.

"Crystal Engineering of Conjugated Oligomers and the Spectral Signtature of π Stacking in Conjugated Oligomers and Polymers," A. Koren et al., *Chem. Mater.*, vol. 12, p. 1519 (2000), Jun.

"The Chemistry of Isatoic Anhydride," G. M. Coppola, *Synthesis*, p. 505 (1980), no month available.

"Isatoic Anhydride. IV. Reactions with Various Nucleophiles," R. P. Staiger et al., *J. Org. Chem.*, vol. 24, p. 1214 (1959), no month available.

"Investigation of the Reaction Conditions for the Synthesis of 4,6–Disubstituted–3–cyano–2–pyridones and 4–Methyl–3–cyano–6–hydroxy–2–pyridone," D. Z. Mijin et al., *J. Serb. Chem. Soc.*, vol. 59, No. 12, p. 959 (1994), no month available.

Synthesis of Isoquinoline Alkaloids. II. The Synthesis and Reactions of 4–Methyl–3–pyridinecarboxaldehyde and Other 4–Methyl–3–substituted Pyridines, J. M. Bobbitt et al., *J. Org. Chem.*, vol. 25, p. 560 (1960), no month available.

"Synthesis and Dyeing Characteristics of 5–(4–Arylazophenyl) azo–3–cyano–4–methyl–6–hydroxy–2–pyridones," J. Kanhere et al., *Indian Journal of Textile Research*, vol. 13, p. 213 (1988) no month available.

"Synthesis of Some Pyridone Azo Dyes from 1–Substituted 2–Hydroxy–6–pyridone Derivatives and their Colour Assessment," C. Chen et al., *Dyes and Pigments*, vol. 15, p. 69 (1991), no month available.

English Abstract and description (not translated) for German Patent Publication DE 3543360, Jun. 1987.

English Abstract for Japanese Patent Publication JP 2001214083, Aug. 2001.

English Abstract for German Patent Publication DE 3505899, Sep. 1988.

"Yellow to Violet Azo–N–Substituted Pyridinone Disperse Dyes for Synthetic Fibers," I.M.S. Mamak, *Indian*, pp. 1–11 (1980) (Indian Patent Publication 147527), Mar.

English Abstract for Japanese Patent Publication JR2000062327, Feb. 2000.

English Abstract for Japanese Patent Publication JP60152563, Aug. 1985.

"Synthesis of 3–Cyano–6–hydroxy–5–[2–(perfluoroalkyl)phenylazo]–2–pyridones and their Application for Dye Diffusion Thermal Transfer Printing," *Bull. Chem. Soc. Jpn.*, vol. 66, Iss. 6, pp. 1790–1794, (1993), no month available.

English Abstract for Chinese Patent Publication CN1115773, Jan. 1996.

English Abstract for German Patent Publication DE 3447117, Jul. 1986.

English Abstract for Japanese Patent Publication JP 5331382, Dec. 1993.

English Abstract for Japanese Patent Publication JP 63210169, Aug. 1988.

English Abstract for Japanese Patent Publication JP 63199764, Aug. 1988.

English Abstract for Japanese Patent Publication JP 63199763, Aug. 1988.

English Abstract for Japanese Patent Publication JP 63199762, Aug. 1988.

English Abstract for Japanese Patent Publication JP 63199761, Aug. 1988.

English Abstract for Japanese Patent Publication JP 63199760, Aug. 1988.

English Abstract for Japanese Patent Publication JP 63071392, Mar. 1988.

English Abstract for Japanese Patent Publication JP 61181865, Aug. 1986.

English Abstract for Japanese Patent Publication JP 61036366, Feb. 1986.

English Abstract for Japanese Patent Publication JP 60112862, Jun. 1985.

English Abstract for Japanese Patent Publication JP 60112861, Jun. 1985.

English Abstract for Japanese Patent Publication JP 58149953, Sep. 1983.

English Abstract for Japanese Patent Publication JP 56092961, Jul. 1981.

English Abstract for Japanese Patent Publication JP 56026957, Mar. 1981.

English Abstract for Japanese Patent Publication JP 55099958, Jul. 1980.

English Abstract for Japanese Patent Publication JP 96 11443 (JP8011443), Jan. 1996.

English Abstract for Japanese Patent Publication JP 93169849 (JP5169849), Jul. 1993.
English Abstract for Japanese Patent Publication JP 93 51536 (JP5051536), Mar. 1993.
English Abstract for Japanese Patent Publication JP 90185569 (JP2185569), Jul. 1990.
English Abstract for Japanese Patent Publication JP 87290762 (JP62290762), Dec. 1987.
English Abstract for Japanese Patent Publication JP 86244595 (JP61244595), Oct. 1986.
English Abstract for Spanish Patent Publication 475254 (Equivalent of Italian Patent Publication IT 1088895), Jun. 1979.
English Abstract for German Patent Publication DE 2727809, Aug. 1980.
"Colour and Constitution of Azo Dyes Derived from 2–Thioalkyl–4,6–Diaminopyrimidines and 3–Cyano–1, 4–dimethyl–6–hydroxy–2–pyridone as Coupling Components," L. Cheng et al., *Dyes and Pigments*, vol. 7, No. 5, pp. 373–388 (1986), no month available.
English Abstract for Japanese Patent Publication JP 63039380, Feb. 1988.
English Abstract for Japanese Patent Publication JP 54102328, Aug. 1979.
English Abstract for Japanese Patent Publication JP 54070337, Jun. 1979.
"Trends in Modern Dye Chemistry. Part 10," N. R. Ayyangar and K. V. Srinivasan, *Colourage*, vol. 37, No. 2, pp. 29–30 (Jan. 16, 1990).
English Abstract for Japanese Patent Publication JP 05169854, Jul. 1993.
English Abstract for Japanese Patent Publication JP 04292988, Oct. 1992.
English Abstact for Japanese Patent Publication JP 63161060, Jul. 1988.
English Abstract for Japanese Patent Publication JP 61244595, Oct. 1986.
English Abstract for Japanese Patent Publication JP 00239549 (JP2000239549), Sep. 2000.
English Abstract for Japanese Patent Publication JP 11269402, Oct. 1999.
English Abstract for Japanese Patent Publication JP 09041267, Feb. 1997.
English Abstract for Japanese Patent Publication JP 08039941, Feb. 1996.
English Abstract for Japanese Patent Publication JP 06294909, Oct. 1994.
English Abstract for Japanese Patent Publication JP 06122829, May 1994.
English Abstract for Japanese Patent Publication JP 05255602, Oct. 1993.
English Abstract for Japanese Patent Publication JP 05051536, Mar. 1993.
English Abstract for Japanese Patent Publication JP 04235093, Aug. 1992.
English Abstract for European Patent Publication EP 0 063 275, Jan. 1982.
English Abstract for German Patent Publication DE 2606506, May 1978.

PHASE CHANGE INKS CONTAINING AZO PYRIDONE COLORANTS

Cross-reference is made to the following applications:

Copending application U.S. Ser. No. 10/185,261, filed concurrently herewith, entitled "Processes for Preparing Dianthranilate Compounds and Diazopyridone Colorants," with the named inventors Rina Carlini, James M. Duff, Stephen G. Robinson, George Liebermann, Roger E. Gaynor, Tania L. Pereira, Jeffery H. Banning, and James D. Mayo, the disclosure of which is totally incorporated herein by reference, discloses a process for preparing dianthranilate compounds which comprises (a) admixing reactants as follows: (1) a diol of the formula $R_1(OH)_2$, wherein $R_1$ is an alkylene group having at least about 20 carbon atoms, and wherein the —OH groups are primary or secondary, (2) isatoic anhydride, present in an amount of at least about 2 moles of isatoic anhydride per every one mole of diol, (3) a catalyst which is 1,4-diazabicyclo[2.2.2]octane, N,N,N',N'-tetramethylethylene diamine, or a mixture thereof, said catalyst being present in an amount of at least about 0.2 mole of catalyst per every one mole of diol, and (4) a solvent; and (b) heating the mixture thus formed to form a dianthranilate compound of the formula

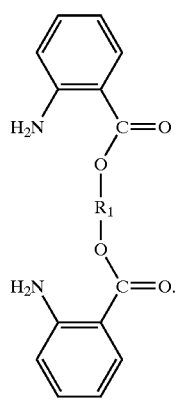

Also disclosed is a process for preparing diazopyridone colorants which comprises (I) preparing a dianthranilate compound by the aforementioned method, (II) reacting the dianthranilate compound with nitrosylsulfuric acid to form a diazonium salt, and (III) reacting the diazonium salt with a pyridone compound to form a diazopyridone compound.

Copending application U.S. Ser. No. 10/185,994, filed concurrently herewith, entitled "Dimeric Azo Pyridone Colorants," with the named inventors Rina Carlini, Jeffery H. Banning, James M. Duff, Bo Wu, and James D. Mayo, the disclosure of which is totally incorporated herein by reference, discloses compounds of the formula

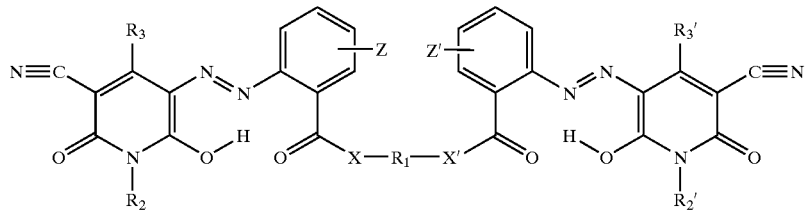

The compounds are useful as colorants, particularly in applications such as phase change inks.

Copending application U.S. Ser. No. 10/184,269, filed concurrently herewith, entitled "Phase Change Inks Containing Dimeric Azo Pyridone Colorants," with the named inventors Bo Wu, Rina Carlini, Jeffery H. Banning, James M. Duff, James D. Mayo, Jule W. Thomas, Paul F. Smith, and Michael B. Meinhardt, the disclosure of which is totally incorporated herein by reference, discloses a phase change ink composition comprising a phase change ink carrier and a colorant compound of the formula

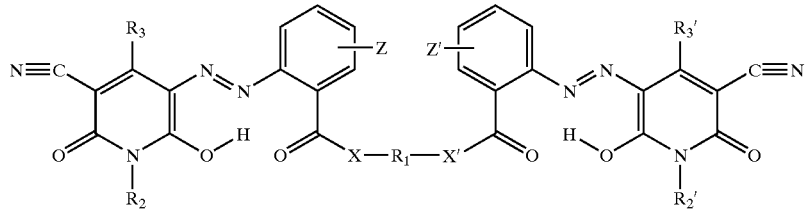

Copending application U.S. Ser. No. 10/186,024, filed concurrently herewith, entitled "Azo Pyridone Colorants," with the named inventors Jeffery H. Banning, Rina Carlini, James D. Mayo, James M. Duff, and C. Wayne Jaeger, the disclosure of which is totally incorporated herein by reference, discloses compounds of the formula

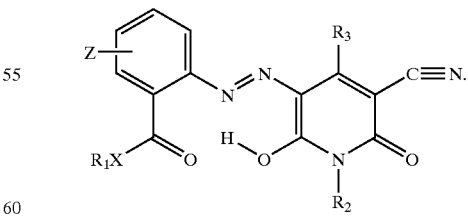

The compounds are useful as colorants, particularly in applications such as phase change inks.

Copending application U.S. Ser. No. 10/185,597, filed concurrently herewith, entitled "Process for Preparing Substituted Pyridone Compounds," with the named inventors James D. Mayo, James M. Duff, Rina Carlini, Roger E.

Gaynor, and George Liebermann, the disclosure of which is totally incorporated herein by reference, discloses a process for preparing substituted pyridone compounds which comprises (a) admixing in the absence of a solvent (1) an amine of the formula $R_1$—$NH_2$ wherein $R_1$ is an alkyl group, an aryl group, an arylalkyl group, or an alkylaryl group, and (2) a first ester of the formula

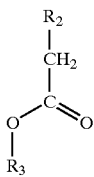

wherein $R_2$ is an electron withdrawing group and $R_3$ is an alkyl group; (b) heating the mixture containing the amine and the first ester to form an intermediate compound of the formula

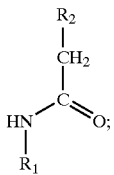

(c) admixing the intermediate compound with (1) a base and (2) a second ester of the formula

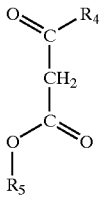

wherein $R_4$ is an alkyl group, an aryl group, an arylalkyl group, or an alkylaryl group and $R_5$ is an alkyl group, said second ester being present in a molar excess relative to the intermediate compound, said base being present in a molar excess relative to the intermediate compound, and (d) heating the mixture containing the intermediate compound, the second ester, and the base to form a pyridone compound of the formula

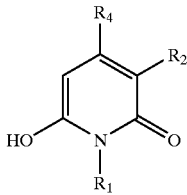

or a salt thereof. Also disclosed is a process for preparing diazopyridone colorants which comprises preparing a pyridone compound by the above process and reacting the pyridone compound with a diazonium salt to form a diazopyridone compound.

Copending application U.S. Ser. No. 10/185,828, filed concurrently herewith, entitled "Method for Making Dimeric Azo Pyridone Colorants," with the named inventors Rina Carlini, James D. Mayo, James M. Duff, Jeffery H. Banning, Paul F. Smith, George Liebermann, and Roger E. Gaynor, the disclosure of which is totally incorporated herein by reference, discloses a process for preparing a diazopyridone compound which comprises (a) preparing a first solution comprising (1) either (A) a dianiline of the formula

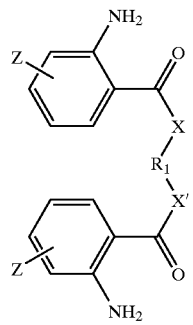

or (B) an aniline of the formula

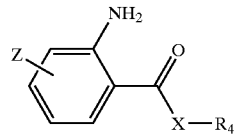

and (2) a first solvent mixture comprising (I) a solvent, (II) acetic acid, and (III) an optional second acid, said acetic acid being present in the solvent mixture in an amount of at least about 95 percent by weight of the solvent mixture, said first solution being at a temperature of about +15° C. or lower; (b) adding to the first solution nitrosylsulfuric acid, thereby forming a diazonium salt either (A) of the formula

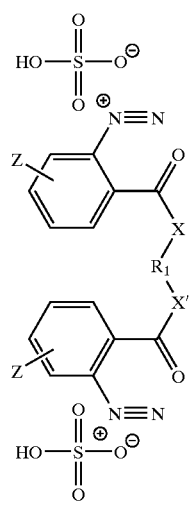

or (B) of the formula

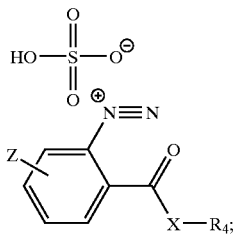

(c) preparing a second solution comprising (1) a second solvent mixture comprising water and an organic solvent soluble in or miscible in water, (2) either (A) a pyridone of the formula

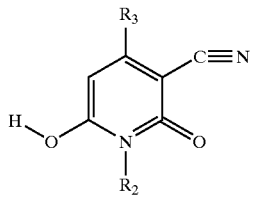

or (B) a dipyridone of the formula

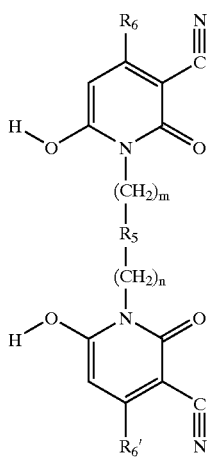

(3) a base present in an amount of at least about 3 molar equivalents of base per mole of pyridone moiety, and (4) an optional buffer salt, and (d) combining either (A) the second solution containing the dianiline and the first solution containing the pyridone, or (B) the second solution containing the aniline and the first solution containing the dipyridone to form a third solution and effect a coupling reaction to form a diazopyridone compound either (A) of the formula or (B) of the formula

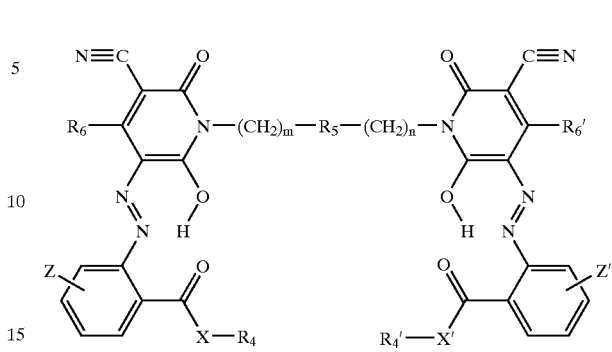

Copending application U.S. Ser. No. 10/186,023, filed concurrently herewith, entitled "Dimeric Azo Pyridone Colorants," with the named inventors Rina Carlini, James M. Duff, Jeffery H. Banning, Bo Wu, and James D. Mayo, the disclosure of which is totally incorporated herein by reference, discloses compounds of the formula

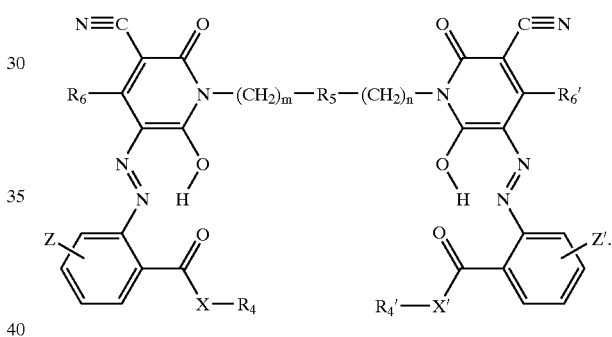

The compounds are useful as colorants, particularly in applications such as phase change inks.

Copending application U.S. Ser. No. 10/184,266, filed concurrently herewith, entitled "Phase Change Inks Containing Dimeric Azo Pyridone Colorants," with the named inventors Bo Wu, Rina Carlini, James M. Duff, Jeffery H. Banning, and James D. Mayo, the disclosure of which is totally incorporated herein by reference, discloses a phase change ink composition comprising a phase change ink carrier and a colorant compound of the formula

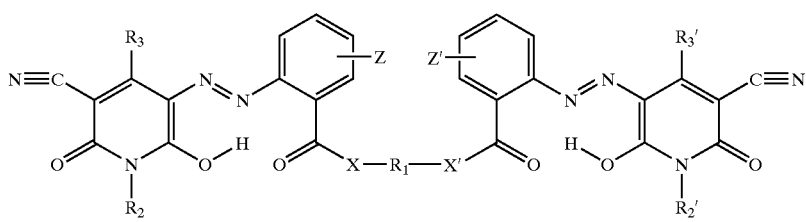

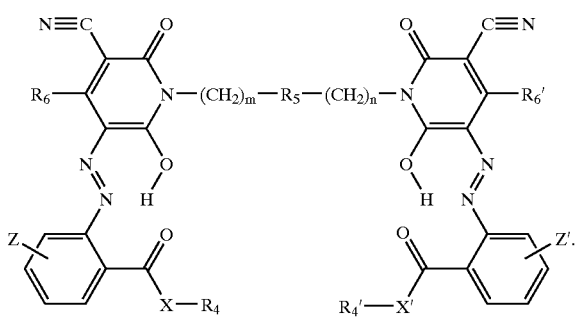

BACKGROUND OF THE INVENTION

The present invention is directed to phase change inks. More specifically, the present invention is directed to hot melt or phase change inks containing specific azo pyridone colorant compounds. One embodiment of the present invention is directed to a phase change ink composition comprising a phase change ink carrier and a colorant compound of the formula

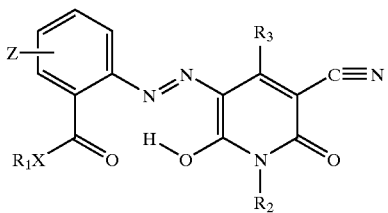

wherein (A) $R_1$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, (B) $R_2$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

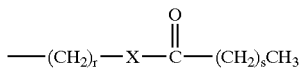

wherein r and s are each, independently of the other, integers representing a number of repeat —CH$_2$— groups, (C) $R_3$ is (i) an alkyl group, (ii) an aryl group, (iii) an arylalkyl group, or (iv) an alkylaryl group, (D) X is (i) a direct bond, (ii) an oxygen atom, (iii) a sulfur atom, (iv) a group of the formula —NR$_{40}$— wherein $R_{40}$ is a hydrogen atom, an alkyl group, an aryl group, an arylalkyl group, or an alkylaryl group, or (v) a group of the formula —CR$_{50}$R$_{60}$— wherein $R_{50}$ and $R_{60}$ each, independently of the other, is a hydrogen atom, an alkyl group, an aryl group, an arylalkyl group, or an alkylaryl group, and (E) Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

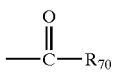

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —SO$_2$R$_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —PO$_3$R$_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

European Patent Publication 1 125 990 A1 and PCT Patent Publication WO 01/09256 A1, the disclosures of each of which are totally incorporated herein by reference, discloses an aqueous ink for ink jet recording which contains at least a water-insoluble coloring matter, water, and a resin as main components and which takes the form of an emulsion, which is characterized by containing at least one yellow hue coloring matter selected from the group consisting of a quinophthalone compound represented by the formula (1)

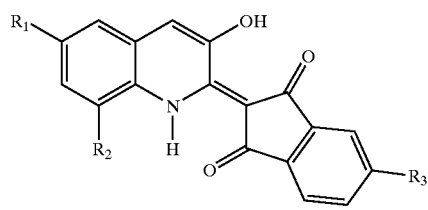

wherein each of $R_1$ to $R_3$ independently represents a hydrogen atom, an unsubstituted or substituted alkyl group, —$CONR_4R_5$, or —$COOR_6$ (in which each of $R_4$ to $R_6$ independently represents a hydrogen atom, an unsubstituted or substituted alkyl group, or an unsubstituted or substituted aryl group) and all of $R_1$ to $R_3$ are not a hydrogen atom at the same time, and a pyridone azo compound represented by the formula (2)

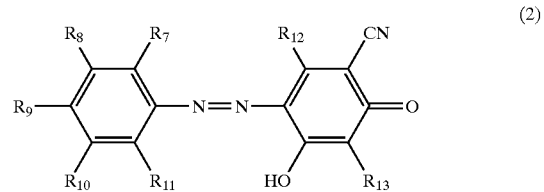

wherein each of $R_7$ to $R_{11}$ independently represents a hydrogen atom, a halogen atom, an unsubstituted or substituted alkyl group, an aralkyl group, an unsubstituted or substituted alkoxy group, an unsubstituted or substituted aryl group, an unsubstituted or substituted aryloxy group, a hydroxyl group, —$NR_{14}R_{15}$ (in which $R_{14}$ and $R_{15}$ independently represent a hydrogen atom, an unsubstituted or substituted alkyl group, or an aralkyl group), —$COX_1$ (in which $X_1$ represents an unsubstituted or substituted alkoxy group, an unsubstituted or substituted aryloxy group, or —$NR_{16}R_{17}$ (in which each of $R_{16}$ and $R_{17}$ independently represent a hydrogen atom, an unsubstituted or substituted alkyl group, an aralkyl group, or an unsubstituted or substituted aryl group)), —$COO(CH_2)_n$—$COX_2$, —$OCOX_3$, or —$NHCOX_4$ (in which each of $X_2$ to $X_4$ independently represents an unsubstituted or substituted alkyl group, an aralkyl group, an unsubstituted or substituted aryl group, an unsubstituted or substituted alkoxy group, or an unsubstituted or substituted aryloxy group, and n is an integer of 1 to 3), $R_{12}$ represents an unsubstituted or substituted alkyl group, and $R_{13}$ represents an unsubstituted or substituted alkyl group, an aralkyl group, or an unsubstituted or substituted aryl group. The ink is for ink jet recording having excellent light resistance and storage stability, and enables formation of a high quality image without blotting, and the obtained recording image is excellent in water resistance.

PCT Patent Publication WO 01/21714, the disclosure of which is totally incorporated herein by reference, discloses compositions comprising a solvent and at least one compound of the formula

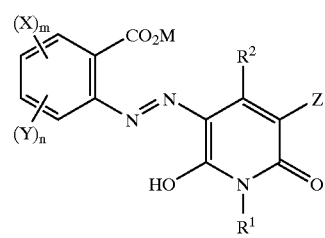

in which $R^1$ represents H, an optionally substituted $C_{1-8}$ carbyl derived group, or a group of the formula

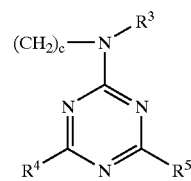

where C is from 2 to 6, $R^3$ represents optionally substituted $C_{1-8}$ carbyl derived group, $R^4$ and $R^5$ independently represent an optional substituent, $R^2$ represents an optionally substituted $C_{1-8}$ carbyl derived group, X Y, and Z independently represent H or an optional substituent, M represents H or a cation, and m and n independently represent 0, 1, or 2. Also disclosed are compounds of the above formula providing that at least one of $R^1$, $R^2$, X, Y, or Z comprises a group of formula $SO_3M$ or $PO_3M_2$. These compositions and compounds are useful as the colorants to prepare color filters for displays.

U.S. Pat. No. 4,247,456 (von Brachel et al.), the disclosure of which is totally incorporated herein by reference, discloses water-insoluble monoazo dyes of the formula

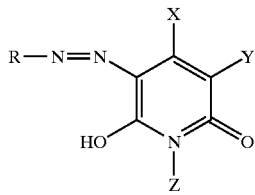

wherein R is the residue of a benzene, naphthalene, diphenyl, diphenylmethane, or heterocyclic diazo compound which is free from water solubilizing groups, produced by reacting a diazotized amine of the benzene, naphthalene, diphenyl, diphenylmethane, or heterocyclic series which is free from water solubilizing groups with the appropriate 6-hydroxy-2-pyridone and the utility thereof for the dyeing and printing of synthetic fabric materials to yellow to red shades having excellent fastness to light and sublimation.

U.S. Pat. No. 3,957,749 (von Brachel et al.), the disclosure of which is totally incorporated herein by reference, discloses water-insoluble monoazo dyes of the formula

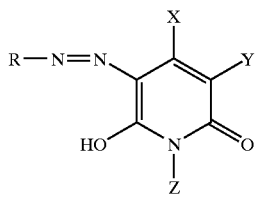

produced by reacting a diazotized amine of the benzene, naphthalene, diphenyl, diphenylmethane, or heterocyclic series which is free from water solubilizing groups with the appropriate 6-hydroxy-2-pyridone and the utility thereof for the dyeing and printing of synthetic fabric materials to yellow to red shades having excellent fastness to light and sublimation.

Japanese Patent Publication JP 05331382, the disclosure of which is totally incorporated herein by reference, discloses a specific pyridone azo pigment which is bright yellow and highly soluble in a solvent, absorbs light of long wavelength, and is useful for a thermal transfer sheet. The pyridone azo pigment is represented by the formula

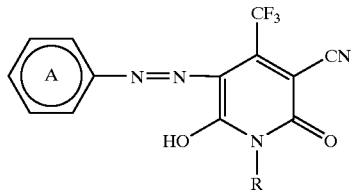

wherein R is H, alkyl, substituted alkyl, cycloalkyl, aryl, or optionally substituted phenyl, and ring A is a benzene ring optionally having a nonionic group. The pigment is prepared by diazotizing an aniline compound and coupling the resulting diazo compound with a pyridone compound. Having a good solubility in an organic solvent and a good dispersibility in water, the pigment facilitates the preparation of an ink containing a high concentration of the pigment homogeneously dissolved or dispersed. The prepared ink enables the preparation of a thermal transfer sheet coated with the ink uniformly in a high density.

British Patent 1,559,001 (Harvey et al.), the disclosure of which is totally incorporated herein by reference, discloses a hydrophilic textile material colored with a dyestuff of the formula

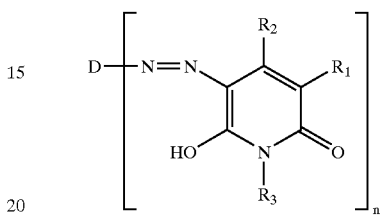

wherein D is the residue of a diazo or tetrazo component; $R_1$ is a hydrogen atom or an alkyl, chloro, acetamido, benzamido, carbamoyl, or an N-substituted carbamyl, for example —CONHBr, group or, preferably, a cyano group; $R_2$ is an alkyl group, especially methyl, optionally substituted with a chlorine atom, a phenyl group, optionally substituted with an alkyl or alkoxy group, or a carboxylic acid or carboxylic acid ester group; or $R_1$ and $R_2$ together with the carbon atoms in the 3- or 4-position of the pyridone ring may form an alicyclic or aromatic ring system so that, for example, $R_1$ and $R_2$ together may be a tri- or tetra-methylene group forming with the pyridone of penteno [c] or hexeno [c] pyrid-2-one, or $R_1$ and $R_2$ may form together with the adjacent carbon atoms of the pyridone ring a benzene ring giving a benz [c] pyrid-2one; $R_3$ is an aryl group carrying one or more substituents selected from —NO, —$SO_2R^1$, —$COR^1$, —$COOR^1$, —CF, or —CN, wherein $R^1$ is an optionally substituted alkyl or aryl group; and n is an integer which may be 1 or 2.

German Patent Publication DE 19646430, the disclosure of which is totally incorporated herein by reference, discloses dye mixtures comprising at least two structurally different dyes, each corresponding to formula

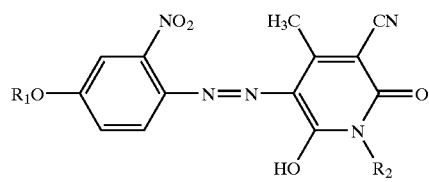

wherein $R_1$ is $C_1$–$C_4$ alkyl; $R_2$ is the $(CH_2)_nO$—$R_5$ radical; $R_5$ is, independently of $R_1$, $C_1$–$C_4$ alkyl or phenyl (which is unsubstituted or substituted by $C_1$–$C_4$ alkyl, $C_1$–$C_4$ alkoxy, hydroxy, or halogen); and n is 2 or 3, which dye mixtures are suitable for dyeing or printing textile fibre materials (e.g. polyester materials), giving dyeings having good around fastness properties.

German Patent Publication DE 19646429, the disclosure of which is totally incorporated herein by reference, discloses dye mixtures comprising at least two structurally different dyes, each of which has the formula

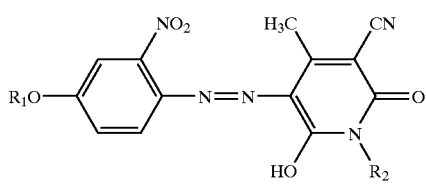

in which $R_1$ is $C_1$–$C_4$ alkyl and $R_2$ is isopropyl, n-butyl, isobutyl, sec-butyl, or tert-butyl; or $C_1$–$C_3$ alkyl which is substituted by phenyl or phenoxy; or $R_1$ is phenyl (which is unsubstituted or substituted by $C_1$–$C_4$ alkyl, $C_1$–$C_4$ alkoxy, hydroxyl, or halogen), $C_1$–$C_4$ alkoxy-$C_1$–$C_3$ alkylene, phenoxy-$C_1$–$C_3$ alkylene, or $C_1$–$C_3$ alkyl which is substituted by phenyl (which is unsubstituted or substituted by $C_1$–$C_4$ alkyl, $C_1$–$C_4$ alkoxy, hydroxyl, or halogen) and $R_2$ is $C_1$–$C_{10}$ alkyl (which is unsubstituted or substituted by hydroxyl, $OCOR_3$, or phenoxy, where the phenyl ring in phenoxy is unsubstituted or substituted by $C_1$–$C_4$ alkyl, $C_1$–$C_4$ alkoxy, hydroxyl, or halogen) and the alkyl chain in $C_1$–$C_{10}$ alkyl from $C_2$ can be interrupted by one or more oxygen atoms; phenyl (which is unsubstituted or substituted by $C_1$–$C_4$ alkyl, $C_1$–$C_4$ alkoxy, hydroxyl, or halogen); or $C_5$–$C_7$ cycloalkyl; and $R_3$ is $C_1$–$C_4$ alkyl, are suitable for dyeing or printing textile fibre materials (e.g. polyester materials) and give dyeings with good allround properties.

German Patent Publication DE 19647869, the disclosure of which is totally incorporated herein by reference, discloses a dye mixture containing at least 2 dyes with different structures, each of formula

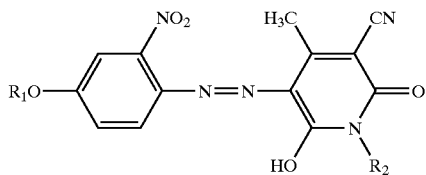

where $R_1$ is a 1–4C alkyl; and $R_2$ is a linear 1–3C alkyl. Also claimed is hydrophobic fibre material, preferably polyester textile material, dyed or printed with the mixture.

PCT Patent Publication WO 99/43754, the disclosure of which is totally incorporated herein by reference, discloses compounds of the formula

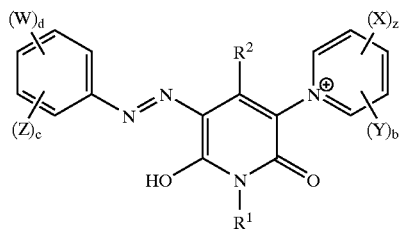

and salts and tautomers thereof, wherein: $R_1$ and $R_2$ each independently is H, optionally substituted alkyl, optionally substituted aryl, or optionally substituted arylalkyl; each W and each X independently is —COOH, —$SO_3H$, —$PO_3H_2$, or alkyl substituted by one or more groups selected from —COOH, —$SO_3H$, and —$PO_3H_2$; each Y and each Z independently is a substituent other than those defined for W and X; a and d each independently is 1 to 5; b and c each independently is 0 to 4; (a+b) has a value of 5 or less; and (c+d) has a value of 5 or less. Also claimed are inks containing a compound of this formula, an ink jet printing process using the inks, substrates printed with the inks, and ink jet printer cartridges containing the inks.

U.S. Pat. No. 5,929,218 (Lee et al.), the disclosure of which is totally incorporated herein by reference, discloses pyridone-based yellow monoazo dyes used in thermal transfer having following formula which have good stability and hue

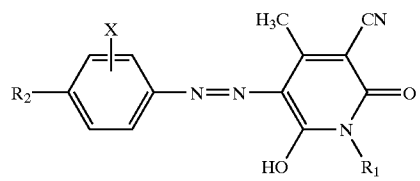

wherein $R_1$ is hydrogen atom; unsubstituted or substituted alkyl group of from 1 to 8 carbon atoms with alkoxy or aryl; or unsubstituted or substituted aryl group with alkoxy or halogen, and X is hydrogen atom; alkyl group of from 1 to 4 carbon atoms; alkoxy group; or halogen; $R_2$ is selected from the following groups;

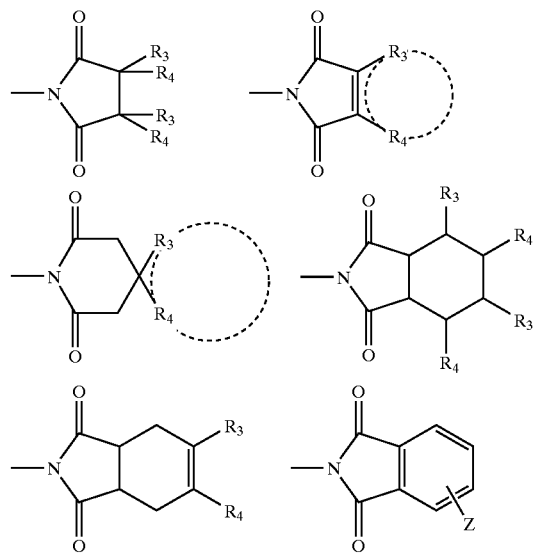

wherein $R_3$ and $R_4$ are independently selected from groups consisting hydrogen, substituted or unsubstituted alkyl group of from 1 to 4 carbon atoms, halogen, alkyl carboxylate, and carbonyl group; $R_3$–$R_4$ is noncyclization with $R_3$ and $R_4$ and selected respectively from the above substituents ($R_3$ and $R_4$); or saturated or unsaturated cycloalkyl of from 3 to 6 carbon atoms, Z is nitro, halogen, alkyl group of from 1 to 4 carbon atoms, alkoxy, sulfonyl, carbonyl, carboxyamide, sulfonamino, cyano, hydroxy, or hydrogen atom.

European Patent Publication EP 0 706 679 B1, U.S. Pat. No. 5,853,929 (Campbell), and PCT Patent Publication WO 95/00885, the disclosures of each of which are totally incorporated herein by reference, disclose colored cyan toner for electroreprography and laser printing based on Solvent Blue 70, and a trichomatic set of coloured toners based on Solvent Blue 70, benzodifuranone red dyes, and azo pyridone yellow dyes of the formula

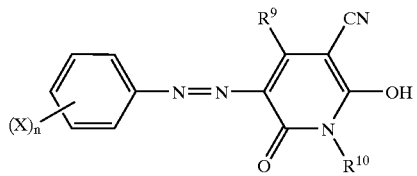

wherein X is halogen, nitro, or a group —COOR$^5$, R$^9$ is C$_{1-4}$ alkyl, R$^{10}$ is C$_{1-12}$ alkyl, R$^5$ is C$_{1-8}$ alkyl or a group of formula —(C$_{1-3}$-alkylene)-(CO)$_q$—Z wherein q is 0 or 1 and Z is —OR$^6$ or —NR$^6$R$^7$ when q=1 or Z is —OR$^8$ when q=0, R$^6$ is selected from optionally substituted C$_{1-8}$ alkyl, optionally substituted C$_{1-8}$ alkoxy-C$_{1-8}$ alkyl, and a second group represented by R$^5$ in which R$^6$ is optionally substituted C$_{1-8}$ alkyl or optionally substituted C$_{1-8}$ alkoxy-C$_{1-8}$ alkyl, R$^7$ is selected from H and optionally substituted C$_{1-8}$ alkyl, and R$^8$ is selected from optionally substituted C$_{1-8}$ alkyl, optionally substituted C$_{1-8}$ alkoxy-C$_{1-8}$ alkyl, optionally substituted C$_{1-8}$ alkyl sulfonyl or carbonyl, and optionally substituted phenyl sulfonyl or carbamoyl.

European Patent Publication EP 0 247 737, the disclosure of which is totally incorporated herein by reference, discloses a thermal transfer printing sheet suitable for use in a thermal transfer printing process, especially for the conversion of a digital image into a visible print, comprising a substrate having a coating comprising a dye of the formula

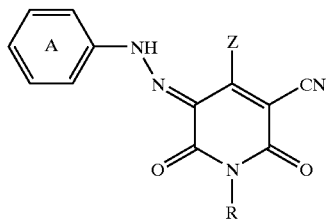

wherein Ring A is unsubstituted or carries, in the 2- or 4-position with respect to the azo link, at least one group selected from —CX$_3$, X$^1$, CN, NO$_2$, —OCO.Y, —CO.Y, —CO.H, —OSO$_2$.Y, and —SO$_2$.Y, provided that A is substituted when Z is CH$_3$ and R is C$_{2-4}$-alkyl; X and X$^1$ are each independently halogen; Y is selected from R$^1$, —OR$^1$, SR$^1$, and —NR$^1$R$^2$; R$^1$ is selected from C$_{1-12}$-alkyl, C$_{1-12}$-alkyl interrupted by one or two groups selected from —O—, —CO—, O.CO—, and —CO.O—, C$_{3-7}$-cycloalkyl, mono- or bi-cyclic aryl, and C$_{1-3}$-alkylene attached to an adjacent carbon atom on Ring A; R$^2$ is selected from H, C$_{1-12}$-alkyl, C$_{3-7}$-cycloalkyl, and mono- or bi-cyclic aryl; Z is C$_{1-12}$-alkyl or phenyl; and R is selected from C$_{2-12}$-alkyl unbranched in the alpha-position, C$_{2-12}$-alkyl unbranched in alpha-position and interrupted by one or two groups selected from —O—, —CO—, O.CO—, and —CO.O—, phenyl, C$_{1-4}$-alkylphenyl, biphenyl, and biphenyl interrupted by a group selected from —O—, —CO—, O.CO—, and —CO.O—, each of which is free from hydrogen atoms capable of intermolecular hydrogen bonding.

U.S. Pat. No. 5,041,413 (Evans et al.), the disclosure of which is totally incorporated herein by reference, discloses a yellow dye-donor element for thermal dye transfer comprises a support having thereon a dye layer comprising a mixture of yellow dyes dispersed in a polymeric binder, at least one of the yellow dyes having the formula

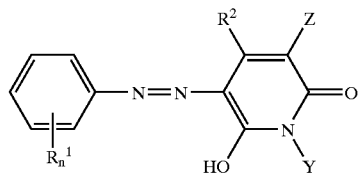

wherein: each R$^1$ independently represents a substituted or unsubstituted alkyl group of from 1 to about 10 carbon atoms, a cycloalkyl group of from about 5 to about 7 carbon atoms; a substituted or unsubstituted allyl group; an aryl group of from about 6 to about 10 carbon atoms; a hetaryl group of from 5 to 10 atoms; acyl; arylsulfonyl; aminocarbonyl; aminosulfonyl; fluorosulfonyl; halogen; nitro; alkylthio; or arylthio; or any two adjacent R$^1$'s together represent the atoms necessary to form a 5- or 6-membered fused ring; n represents an integer from 0–4; R$^2$ represents hydrogen; a substituted or unsubstituted alkyl, cycloalkyl, allyl, aryl or hetaryl group as described above for R$^1$; cyano; acyl; alkylsulfonyl; arylsulfonyl; or alkoxycarbonyl; Z represents cyano; alkoxycarbonyl; acyl; nitro; arylsulfonyl or alkylsulfonyl; Y represents hydrogen; a substituted or unsubstituted alkyl, cycloalkyl, allyl, aryl or hetaryl group as described above for R$^1$; amino; alkylamino; arylamino; acylamino; or sulfonylamino; and at least one of the other of the dyes having the formula

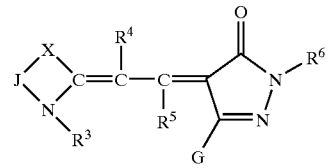

wherein R$^3$ represents the same groups as R$^1$ above; R$^4$ and R$^5$ each independently represents hydrogen, R$^3$; cyano; acyloxy; alkoxy of 1 to about 6 carbon atoms; halogen; or alkoxycarbonyl; or any two of R$^3$, R$^4$ and R$^5$ together represent the atoms necessary to complete a 5- to 7-membered ring; R$^6$ represents the same groups as R$^3$; G represents a substituted or unsubstituted alkyl, cycloalkyl or allyl group as described above for R$^3$, NR$^7$R$^8$ or OR$^9$; R$^7$ and R$^8$ each independently represents hydrogen, acyl or R$^3$, with the proviso that R$^7$ and R$^8$ cannot both be hydrogen at the same time; or R$^7$ and R$^8$ together represent the atoms necessary to complete a 5- to 7-membered ring; R$^9$ represents the same groups as R$^3$; X represents C(R$^{10}$)(R$^{11}$), S, O or NR$^{10}$; R$^{10}$ and R$^{11}$ each independently represents the same groups as R$^3$; or R$^{10}$ and R$^{11}$ together represent the atoms necessary to complete a 5- to 7-membered ring; and J represents the atoms necessary to complete a 5- or 6-membered ring which may be fused to another ring system.

U.S. Pat. No. 4,359,418 (Lienhard et al.), the disclosure of which is totally incorporated herein by reference, discloses azo dyestuff sulfonic acid salts of the formula

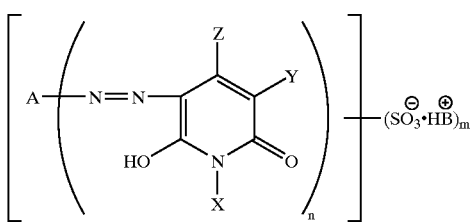

wherein A represents a carbocyclic or heterocyclic aromatic radical, B represents an aliphatic, cycloaliphatic or araliphatic amine, X represents a hydrogen atom or a substituted or unsubstituted alkyl group, a cycloalkyl, aralkyl or aryl group, Y represents a hydrogen or halogen atom, a nitro, cyano, acyl, sulfonic acid, arylsulfonyl, alkoxycarbonyl group or a substituted or unsubstituted alkyl, sulfamoyl or carbamoyl group, Z represents a substituted or unsubstituted alkyl group or an aryl radical, m and n are 1 or 2; said dyestuffs salts having good solubility in organic solvents and functioning to color solutions of film forming polymers in yellow to orange shades.

German Patent Publication DE 3538517 and U.S. Pat. No. 5,037,964 (Moser et al.), the disclosures of each of which are totally incorporated herein by reference, disclose sulfonic acid group-free basic azo compounds, which correspond in one of the possible tautomeric forms to the formula

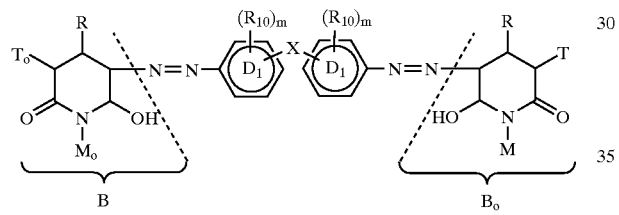

their preparation and their use for dyeing paper.

Japanese Patent Publication JP 03192158, the disclosure of which is totally incorporated herein by reference, discloses obtaining a yellow dye exhibiting high dyeing speed and degree of exhaustion in dyeing a textile material, leather, pulp, paper, etc., as well as excellent brightness and fastness to water by selecting a compound wherein a pyridopyridinium salt is linked to diphenylfluorene through azo groups. A cationic compound of the formula

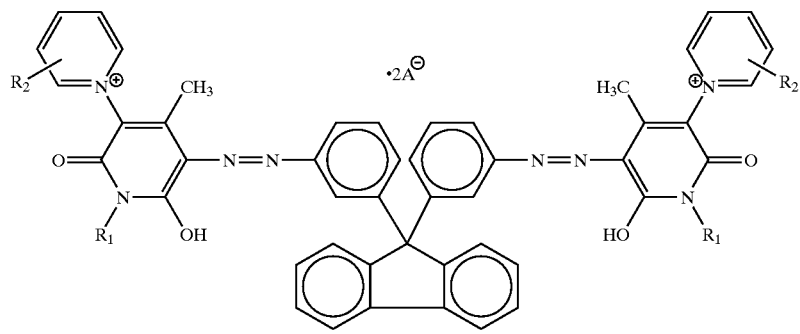

wherein $R_1$ is H or 1–4C alkyl; $R_2$ is H, 1–4C alkyl, or alkoxy; and $A^-$ is an anion which has a structure wherein a tetrazo compound, of 9,9'-bis(4-anilino)fluorene is coupled with a pyridone derivative is selected as a yellow dye, which is useful for dyeing an unsized pulp or paper (e.g. a napkin, table cloth, or sanitary paper). The dyeing with the dye is carried out at a pH of 4–8, preferably 5–7, and at 10–50° C., preferably 15–30° C.

British Patent Publication GB 2 008 606, the disclosure of which is totally incorporated herein by reference, discloses water-insoluble yellow monoazo dyes suitable for dyeing hydrophobic synthetic fibres, particularly polyesters, having the formula

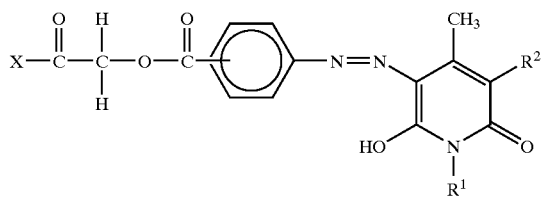

in which X represents $OR^3$ or $NHR^3$, $NR^3R^4$ ($R^3$, $R^4$ together optionally forming with N a ring having 5 to 6 carbon atoms, $NHR^5$; $R^1$ represents a hydrogen atom, an alkyl having 1 to 5 carbon atoms, $(CH_2)_2OH$ or $(CH_2)_3OR^3$; $R^2$ represents CN, $COOR^3$, $CONHR^3$, $CONR^3R^4$ ($R^3$, $R^4$ together optionally forming with N a ring having 5 to 6 carbon atoms); $R^3$ and $R^4$ represent alkyl groups having 1 to 5 carbon atoms; and $R^5$ represents a cycloalkyl having 5 or 6 carbon atoms. The dyes may be prepared by the reaction of

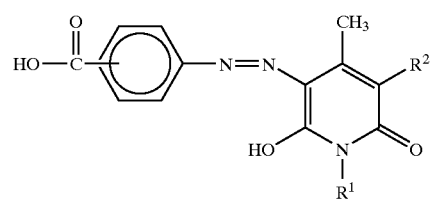

with Hal-$CH_2$—CO—X in which Hal represents Cl or Br.

"Preparation and Evaluation of Yellow Pigments Based on H-Pyridone and Esters of Aminoterephthalic Acid," P. Slosar et al., *CHEMagazin*, Vol. 9, No. 6, pp. 8–11 (1999), the disclosure of which is totally incorporated herein by reference, discloses yellow pigments based on H-pyridone and esters of aminoterephthalic acid wherein the color strength, brilliance (purity), and deepening of greenish shade were the larger the smaller alkyl is in the carbalkoxy group in o-position towards the azo group and the greater alkyl is in the carbalkoxy group in m-position towards the azo group.

Of potential background interest with respect to the present invention are the following references: U.S. Pat. Nos. 5,919,839; 5,827,918; 4,889,560; 5,372,852; "Synthesis, Morphology, and Optical Properties of Tetrahedral Oligo(phenylenevinylene) Materials," S. Wang et al., *J. Am. Chem. Soc.*, Vol. 120, p. 5695 (2000); "Syntheses of Amphiphilic Diblock Copolymers Containing a Conjugated Block and Their Self-Assembling Properties," H. Wang et al., *J. Am. Chem. Soc.*, Vol. 122, p. 6855 (2000); "Crystal Engineering of Conjugated Oligomers and the Spectral Signature of $\pi$ Stacking in Conjugated Oligomers and Polymers," A. Koren et al., *Chem. Mater.*, Vol. 12, p. 1519 (2000); "The Chemistry of Isatoic Anhydride," G. M. Coppola, *Synthesis*, p. 505 (1980); "Isatoic Anhydride. IV. Reactions with Various Nucleophiles," R. P. Staiger et al., *J. Org. Chem.*, Vol. 24, p. 1214 (1959); "Investigation of the Reaction Conditions for the Synthesis of 4,6-Disubstituted-3-cyano-2-pyridones and 4-Methyl-3-cyano-6-hydroxy-2-pyridone," D. Z. Mijin et al., *J. Serb. Chem. Soc.*, Vol. 59, No. 12, p. 959 (1994); "Synthesis of Isoquinoline Alkaloids. II. The Synthesis and Reactions of 4-Methyl-3-pyridinecarboxaldehyde and Other 4-Methyl-3-substituted Pyridines, J. M. Bobbitt et al., *J. Org. Chem.*, Vol 25, p. 560 (1960); "Synthesis and Dyeing Characteristics of 5-(4-Arylazophenyl) azo-3-cyano-4-methyl-6-hydroxy-2-pyridones," J. Kanhere et al., *Indian Journal of Textile Research*, Vol. 13, p. 213 (1988); "Synthesis of Some Pyridone Azo Dyes from 1-Substituted 2-Hydroxy-6-pyridone Derivatives and their Colour Assessment," C. Chen et al., *Dyes and Pigments*, Vol. 15, p. 69 (1991); German Patent Publication DE 3543360; Japanese Patent Publication JP 2001214083; German Patent Publication DE 3505899; Indian Patent Publication 147527; European Patent Publication EP 0 524 637; European Patent Publication EP 0 529 282; European Patent Publication EP 0 083 553; Japanese Patent Publication JP 2000 62327; Japanese Patent Publication JP 85152563; "Synthesis of 3-Cyano-6-hydroxy-5-(2-(perfluoroalkyl)phenylazo)-2-pyridones and their Application for Dye Diffusion Thermal Transfer Printing," Bull. Chem. Soc. Jpn., 1993, Vol. 66, Iss. 6, Pp.1790–4; European Patent Publication 0 844 287; European Patent Publication 0 404 493; U.S. Pat. No. 5,902,841; U.S. Pat. No. 5,621,022; U.S. Pat. No. 5,006,170; Chinese Patent Publication CN 1115773; German Patent Publication DE 3447117; Japanese Patent Publication JP 5331382; Japanese Patent Publication JP 63210169; Japanese Patent Publication JP 63199764; Japanese Patent Publication JP 63199763; Japanese Patent Publication JP 63199762; Japanese Patent Publication JP 63199761; Japanese Patent Publication JP 63199760; Japanese Patent Publication JP 63071392; Japanese Patent Publication JP 61181865; Japanese Patent Publication JP 61036366; Japanese Patent Publication JP 60152563; Japanese Patent Publication JP 60112862; Japanese Patent Publication JP 60112861; Japanese Patent Publication JP 58149953; Japanese Patent Publication JP 56092961; Japanese Patent Publication JP 56026957; Japanese Patent Publication JP 55099958; Japanese Patent Publication JP 96 11443 (JP8011443); Japanese Patent Publication JP 93169849 (JP5169849); Japanese Patent Publication JP 93 51536 (JP5051536); Japanese Patent Publication JP 90185569 (JP2185569); European Patent Publication 0 319 234; European Patent Publication 0 314 002; European Patent Publication 0 302 401; U.S. Pat. No. 4,734,349; Japanese Patent Publication JP 87290762 (JP62290762); Japanese Patent Publication JP 86244595 (JP61244595); Indian Patent Publication IN 147868; Spanish Patent Publication 475254 (Equivalent of Italian Patent Publication IT 1088895); German Patent Publication DE 2727809; "Colour and Constitution of Azo Dyes Derived from 2-Thioalkyl-4, 6-Diaminopyrimidines and 3-Cyano-1,4-dimethyl-6-hydroxy-2-pyridone as Coupling Components," L. Cheng et al., *Dyes and Pigments*, Vol. 7, No. 5, pp. 373–388 (1986); European Patent Publication 1 168 046; U.S. Pat. No. 4,644,058; Japanese Patent Publication JP 63039380; Japanese Patent Publication JP 54102328; Japanese Patent Publication JP 54070337; "Trends in Modern Dye Chemistry. Part 10," N. R. Ayyangar and K. V. Srinivasan, *Colourage*, Vol. 37, No. 2, pp. 29–30 (Jan. 16, 1990); European Patent Publication EP 0 172 283; Japanese Patent Publication JP 05169854; Japanese Patent Publication JP 04292988; Japanese Patent Publication JP 63161060; Japanese Patent Publication JP 61244595; Korean Patent Publication KR 119563; European Patent Publication EP 0 142 863; European Patent Publication EP 0 023 770; Japanese Patent Publication JP 00239549 (JP2000239549); Japanese Patent Publication JP 11269402; Japanese Patent Publication JP 09041267; Japanese Patent Publication JP 08039941; U.S. Pat. No. 4,994,564; Japanese Patent Publication JP 06294909; Japanese Patent Publication JP 06122829; Japanese Patent Publication JP 05255602; Japanese Patent Publication JP 05051536; Japanese Patent Publication JP 04235093; European Patent Publication EP 0 468 647; European Patent Publication EP 0 063 275; U.S. Pat. No. 4,216,145; and German Patent Publication DE 2606506; the disclosures of each of which are totally incorporated herein by reference.

While known compositions and processes are suitable for their intended purposes, a need remains for new yellow colorant compositions. In addition, a need remains for yellow colorant compositions particularly suitable for use in phase change inks. Further, a need remains for yellow colorants with desirable thermal stability. Additionally, a need remains for yellow colorants that exhibit minimal undesirable discoloration when exposed to elevated temperatures. There is also a need for yellow colorants that exhibit a desirable brilliance. In addition, there is a need for yellow colorants that exhibit a desirable hue. Further, there is a need for yellow colorants that are of desirable chroma. Additionally, there is a need for yellow colorants that have desirably high lightfastness characteristics. A need also remains for yellow colorants that have a desirably pleasing color. In addition, a need remains for yellow colorants that exhibit desirable solubility characteristics in phase change ink carrier compositions. Further, a need remains for yellow colorants that enable phase change inks to be jetted at temperatures of over 135° C. while maintaining thermal stability. Additionally, a need remains for yellow colorants that enable phase change inks that generate images with low pile height. There is also a need for yellow colorants that enable phase change inks that generate images that approach lithographic thin image quality. In addition, there is a need for yellow colorants that exhibit oxidative stability. Further, there is a need for yellow colorants that do not precipitate from phase change ink carriers. Additionally, there is a need for yellow colorants that do not, when included in phase change inks, diffuse into adjacently printed inks of different colors. A need also remains for yellow colorants that do not leach from media such as phase change ink carriers into tape adhesives, paper, or the like. In addition, a need remains for yellow colorants that, when incorporated into phase change inks, do not lead to clogging of a phase change ink jet printhead. Further, there is a need for yellow colorants that enable phase change inks that generate images with sharp edges that remain sharp over time. Additionally, there is a need for yellow colorants that enable phase change inks that generate images which retain their high image quality in warm climates. Further, there is a need for yellow colorants that enable phase change inks that generate images of desirably high optical density. Additionally, there is a need for yellow colorants that, because of their good solubility in phase change ink carriers, enable the generation of images of low pile height without the loss of desirably high optical density. A need also remains for yellow colorants that enable cost-effective inks.

SUMMARY OF THE INVENTION

The present invention is directed to a phase change ink composition comprising a phase change ink carrier and a colorant compound of the formula

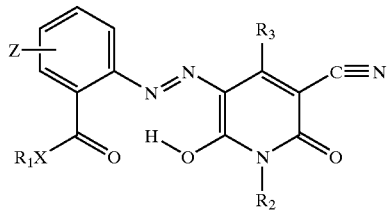

wherein (A) $R_1$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, (B) $R_2$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

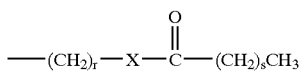

wherein r and s are each, independently of the other, integers representing a number of repeat —$CH_2$— groups, (C) $R_3$ is (i) an alkyl group, (ii) an aryl group, (iii) an arylalkyl group, or (iv) an alkylaryl group, (D) X is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and (E) Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

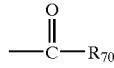

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group.

DETAILED DESCRIPTION OF THE INVENTION

The present invention is directed to phase change inks containing colorant compounds of the formula

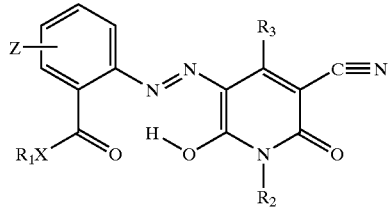

wherein $R_1$ is (i) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl group (including unsubstituted and substituted aryl groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with a t least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (iii) an arylalkyl group (including unsubstituted and substituted arylalkyl groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (iv) an alkylaryl group (including unsubstituted and substituted alkylaryl groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (v) an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (vi) an aryloxy group (including unsubstituted and substituted aryloxy groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (vii) an arylalkyloxy group (including unsubstituted and substituted arylalkyloxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (viii) an alkylaryloxy group (including unsubstituted and substituted alkylaryloxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (ix) a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, (x) a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, (xi) a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, (xii) a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, (xiii) a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, (xiv) a silyl group (including unsubstituted and substituted silyl groups), (xv) a siloxane group (including unsubstituted and substituted siloxane groups), (xvi) a polysilylene group (including unsubstituted and substituted polysilylene groups), typically with from 2 to about 100 repeat silylene units, or (xvii) a polysiloxane group (including unsubstituted and substituted polysiloxane groups), typically with from 2 to about 200 repeat siloxane units, although the number of repeat siloxane units can be outside of this range, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring.

Some specific examples of suitable $R_1$ groups include (but are not limited to) methyl, of the formula —$CH_3$, ethyl, of the formula —$C_2H_5$, n-octyl, of the formula —$(CH_2)_7CH_3$, stearyl, of the formula —$(CH_2)_{17}CH_3$, menthyl, of the formula

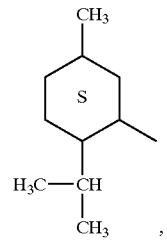

wherein the "S" indicates that the ring is saturated as opposed to being aromatic, branched saturated hydrocarbon groups containing 18 carbon atoms, of the general formula

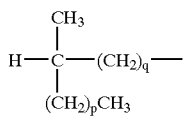

wherein q is an integer of from about 10 to about 15, p is an integer of from 0 to about 3, and the sum of p+q=15, such as isostearyl, oleyl, of the formula

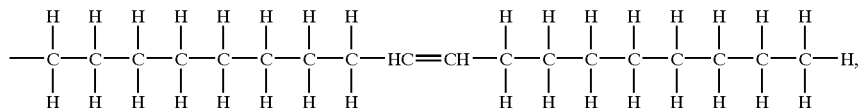

2-octyldodecyl, of the formula

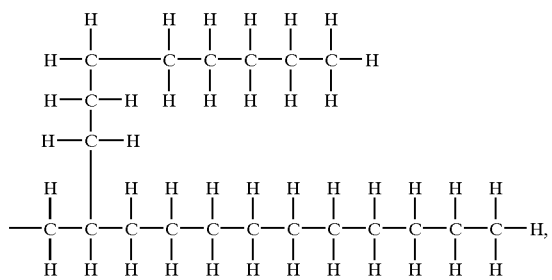

cholesteryl, of the formula

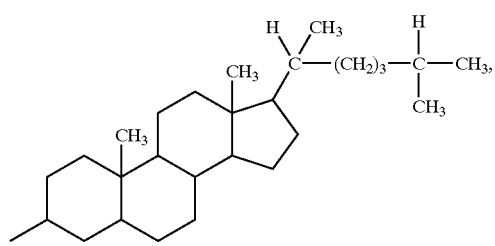

abietyl, including groups of the formula

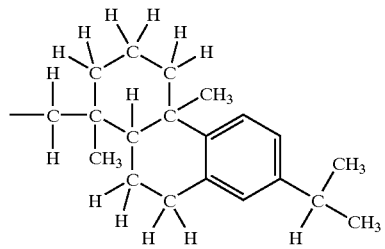

as well as hydrogenated and dehydrogenated isomers of the above formula that are also derivatives of the rosin-derived natural product abietic acid, such as didehydroabietyl and the like, 2-ethylhexyl, of the formula

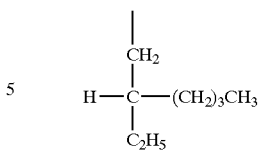

(1-oxypropyl)-2-octyldodecane, of the formula

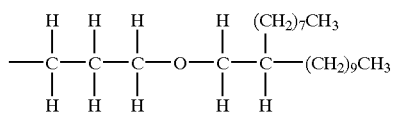

2-(octadecyl)-octadecane, of the formula

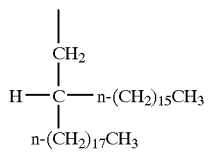

and the like.

$R_2$ is (i) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (ii) an aryl group (including unsubstituted and substituted aryl groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (iii) an arylalkyl group (including unsubstituted and substituted arylalkyl groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (iv) an alkylaryl group (including unsubstituted and substituted alkylaryl groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (v) an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), in one embodiment with at least 1 carbon atom, in another embodiment with at least about 8 carbon atoms, in yet another embodiment with at least about 10 carbon atoms, in still another embodiment with at least about 12 carbon atoms, in another embodiment with at least about 14 carbon atoms, in yet another embodiment with at least about 16 carbon atoms, in still another embodiment with at least about 18 carbon atoms, in another embodiment with at least about 20 carbon atoms, in yet another embodiment with at least about 22 carbon atoms, in still another embodiment with at least about 24 carbon atoms, in another embodiment with at least about 26 carbon atoms, in yet another embodiment with at least about 28 carbon atoms, in still another embodiment with at least about 30 carbon atoms, in another embodiment with at least about 32 carbon atoms, in yet another embodiment with at least about 34 carbon atoms, and in still another embodiment with at least about 36 carbon atoms, and in one embodiment with no more than about 200 carbon atoms, in another embodiment with no more than about 100 carbon atoms, in yet another embodiment with no more than about 75 carbon atoms, in still another embodiment with no more than about 60 carbon atoms, in another embodiment with no more than about 50 carbon atoms, and in yet another embodiment with no more than about 40 carbon atoms, although the number of carbon atoms can be outside of these ranges, (vi) an aryloxy group (including unsubstituted and substituted aryloxy groups), in one embodiment with at least about 6 carbon atoms, in another embodiment with at least about 10 carbon atoms, in yet another embodiment with at least about 13 carbon atoms, in still another embodiment with at least about 14 carbon atoms, in another embodiment with at least about 16 carbon atoms, in yet another embodiment with at least about 17 carbon atoms, in still another embodiment with at least about 18 carbon atoms, in another embodiment with at least about 19 carbon atoms, in yet another embodiment with at least about 20 carbon atoms, in still another embodiment with at least about 21 carbon atoms, in another embodiment with at least about 22 carbon atoms, and in yet another embodiment with at least about 23 carbon atoms, and in one embodiment with no more than about 100 carbon atoms, in another embodiment with no more than about 75 carbon atoms, and in yet another embodiment with no more than about 50 carbon atoms, although the number of carbon atoms can be outside of these ranges, (vii) an arylalkyloxy group (including unsubstituted and substituted arylalkyloxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (viii) an alkylaryloxy group (including unsubstituted and substituted alkylaryloxy groups), in one embodiment with at least about 7 carbon atoms, in another embodiment with at least about 8 carbon atoms, in another embodiment with at least about 10 carbon atoms, in yet another embodiment with at least about 12 carbon atoms, in still another embodiment with at least about 14 carbon atoms, in another embodiment with at least about 16 carbon atoms, in yet another embodiment with at least about 18 carbon atoms, in still another embodiment with at least about 20 carbon atoms, in another embodiment with at least about 22 carbon atoms, in yet another embodiment with at least about 24 carbon atoms, in still another embodiment with at least about 26 carbon atoms, in another embodiment with at least about 28 carbon atoms, in yet another embodiment with at least about 30 carbon atoms, in still another embodiment with at least about 32 carbon atoms, in another embodiment with at least about 34 carbon atoms, in yet another embodiment with at least about 36 carbon atoms, in another embodiment with at least about 38 carbon atoms, in yet another embodiment with at least about 40 carbon atoms, and in still another embodiment with at least about 42 carbon atoms, and in one embodiment with no more than about 200 carbon atoms, in another embodiment with no more than about 100 carbon atoms, and in yet another embodiment with no more than about 44 carbon atoms, although the number of carbon atoms can be outside of these ranges, (ix) a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, (x) a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, (xi) a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, (xii) a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, (xiii) a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, (xiv) a silyl group (including unsubstituted and substituted silyl groups), (xv) a siloxane group (including unsubstituted and substituted siloxane groups), (xvi) a polysilylene group (including unsubstituted and substituted polysilylene groups), typically with from 2 to about 100 repeat silylene units, (xvii) a polysiloxane group (including unsubstituted and substituted polysiloxane groups), typically with from 2 to about 200 repeat siloxane units, although the number of repeat siloxane units can be outside of this range, or (xviii) a group of the formula

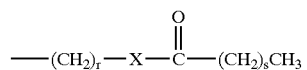

wherein r is an integer representing the number of repeat —$CH_2$— groups, in one embodiment being at least 1, in another embodiment at least about 5, and in yet another embodiment at least about 10, and in one embodiment being no more than about 100, in another embodiment no more than about 50, and in yet another embodiment no more than about 25, although the value of r can be outside of these ranges, and wherein s is an integer representing the number of repeating —$CH_2$— groups, in one embodiment being at least 1, in another embodiment at least about 5, and in yet another embodiment at least about 10, and in one embodiment being no more than about 100, in another embodiment no more than about 50, and in yet another embodiment no more than about 25, although the value of s can be outside of these ranges, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring.

Some specific examples of suitable $R_2$ groups include (but are not limited to) ethyl, of the formula —$CH_2CH_3$, n-butyl, of the formula —$(CH_2)_3CH_3$, n-octyl, of the formula —$(CH_2)_7CH_3$, n-decyl, of the formula —$(CH_2)_9CH_3$, n-dodecyl, of the formula $(CH_2)_{11}CH_3$, n-tetradecyl, of the formula —$(CH_2)_{13}CH_3$, cetyl, of the formula —$(CH_2)_{15}CH_3$, stearyl, of the formula —$(CH_2)_{17}CH_3$, 2-ethylhexyl, of the formula

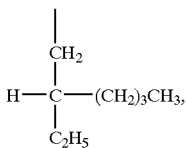

abietyl, including groups of the formula

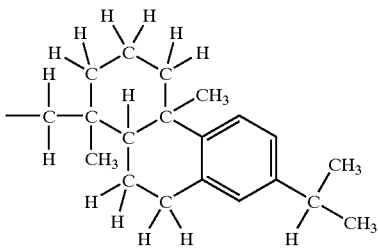

as well as hydrogenated and dehydrogenated isomers of the above formula that are also derivatives of the rosin-derived natural product abietic acid, such as didehydroabietyl and the like, 3-propyl octadecanoyl, of the formula

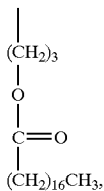

2,2-dimethyl-1,3-dioxolane-4-methylene, of the formula

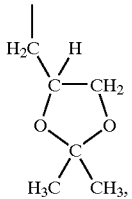

3-hydroxypropyl, of the formula

branched alkyl ethers such as those derived from Guerbet alcohols, such as those of the formula

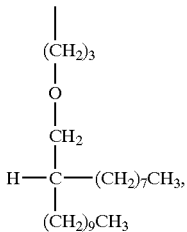

ester groups having long alkyl chains thereon, such as those of the formula

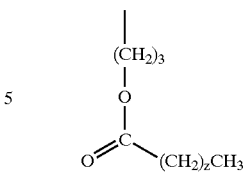

wherein z is an integer of from about 34 to about 44, and the like.

$R_3$ is (i) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like can be present in the alkyl group), typically with from 1 to about 100 carbon atoms, preferably with from about 1 to about 10 carbon atoms, and more preferably with from about 1 to about 5 carbon atoms, although the number of carbon atoms can be outside of these ranges, (ii) an aryl group (including unsubstituted and substituted aryl groups), typically with from about 6 to about 100 carbon atoms, and preferably with from about 6 to about 10 carbon atoms, although the number of carbon atoms can be outside of these ranges, (iii) an arylalkyl group (including unsubstituted and substituted arylalkyl groups), typically with from about 7 to about 100 carbon atoms, and preferably with from about 7 to about 10 carbon atoms, although the number of carbon atoms can be outside of these ranges, or (iv) an alkylaryl group (including unsubstituted and substituted alkylaryl groups), typically with from about 7 to about 100 carbon atoms, and preferably with from about 7 to about 10 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, imine groups, ammonium groups, pyridine groups, pyridinium groups, ether groups, aldehyde groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein two or more substituents can be joined together to form a ring.

Specific examples of suitable $R_3$ groups include methyl (—$CH_3$), linear alkyl groups of the formula —$(CH_2)_c CH_3$ wherein c is an integer of 1, 2, 3, 4, 5, 6, 7, 8, or 9, and the like.

X is (i) a direct bond, (ii) an oxygen atom, (iii) a sulfur atom, (iv) a group of the formula —$NR_{40}$— wherein $R_{40}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 2 to about 20 carbon atoms, and more preferably with from about 4 to about 12 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 10 carbon atoms, although the number of carbon atoms can be outside of these ranges, an arylalkyl group (including substituted arylalkyl groups), typically with from about 7 to about 100 carbon atoms, preferably with from about 7 to about 50 carbon atoms, and more preferably with from about 7 to about 20 carbon atoms, although the number of carbon atoms can be outside of these ranges, or an alkylaryl group (including substituted alkylaryl groups), typically with from about 7 to about 100 carbon atoms, preferably with from about 7 to about 50 carbon atoms, and more preferably with from about 7 to about 20 carbon atoms, although the number of carbon atoms can be outside of these ranges, or (v) a group of the formula —$CR_{50}R_{60}$— wherein $R_{50}$ and $R_{60}$ each, independently of the other, is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 2 to about 20 carbon atoms, and more preferably with from about 4 to about 12 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 10 carbon atoms, although the number of carbon atoms can be outside of these ranges, an arylalkyl group (including substituted arylalkyl groups), typically with from about 7 to about 100 carbon atoms, preferably with from about 7 to about 50 carbon atoms, and more preferably with from about 7 to about 20 carbon atoms, although the number of carbon atoms can be outside of these ranges, or an alkylaryl group (including substituted alkylaryl groups), typically with from about 7 to about 100 carbon atoms, preferably with from about 7 to about 50 carbon atoms, and more preferably with from about 7 to about 20 carbon atoms, although the number of carbon atoms can be outside of these ranges, wherein the substituents on the substituted alkyl, aryl, arylalkyl, and alkylaryl groups can be (but are not limited to) hydroxy groups, halogen atoms, amine groups, imine groups, ammonium groups, pyridine groups, pyridinium groups, ether groups, aldehyde groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein two or more substituents can be joined together to form a ring.

Z is (i) a hydrogen atom, (ii) a halogen atom, including fluorine, chlorine, bromine, and iodine, (iii) a nitro group, (iv) an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, (v) an aryl group (including substituted aryl groups), typically with from about 6 to about 50 carbon atoms, preferably with from about 6 to about 14 carbon atoms, and more preferably with from about 6 to about 10 carbon atoms, although the number of carbon atoms can be outside of these ranges, (vi) an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, (vii) an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, (viii) a group of the formula

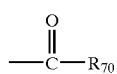

wherein $R_{70}$ is an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphtaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, (ix) a sulfonyl group of the formula —$SO_2R_{80}$, wherein $R_{80}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphtaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, or (x) a phosphoryl group of the formula —$PO_3R_{90}$, wherein $R_{90}$ is a hydrogen atom, an alkyl group (including linear, branched, saturated, unsaturated, cyclic, unsubstituted, and substituted alkyl groups, and wherein hetero atoms, such as oxygen, nitrogen, sulfur, silicon, phosphorus, and the like either may or may not be present in the alkyl group), typically with from 1 to about 50 carbon atoms, preferably with from about 1 to about 20 carbon atoms, and more preferably with from about 1 to about 10 carbon atoms, although the number of carbon atoms can be outside of these ranges, an aryl group (including substituted aryl groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyl group (including substituted arylalkyl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryl group (including substituted alkylaryl groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkoxy group (including linear, branched, saturated, unsaturated, cyclic, unsubstituted, and substituted alkoxy groups, and wherein hetero atoms, such as oxygen, nitrogen, sulfur, silicon, phosphorus, and the like either may or may not be present in the alkyl portion of the alkoxy group), typically with from about 1 to about 50 carbon atoms, preferably with from about 4 to about 20 carbon atoms, and more preferably with from about 8 to about 12 carbon atoms, although the number of carbon atoms can be outside of these ranges, an aryloxy group (including substituted aryloxy groups), typically with from about 6 to about 50 carbon atoms, preferably with from about 6 to about 20 carbon atoms, and more preferably with from about 6 to about 14 carbon atoms, although the number of carbon atoms can be outside of these ranges, an arylalkyloxy group (including substituted arylalkyloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, an alkylaryloxy group (including substituted alkylaryloxy groups), typically with from about 7 to about 50 carbon atoms, preferably with from about 7 to about 25 carbon atoms, and more preferably with from about 7 to about 15 carbon atoms, although the number of carbon atoms can be outside of these ranges, a polyalkyleneoxy group, wherein the alkyl portion of the repeat alkyleneoxy groups typically has from about 1 to about 12 carbon atoms, although the number of carbon atoms can be outside of these ranges, such as a polyethyleneoxy group, a polypropyleneoxy group, a polybutyleneoxy group, or the like, and wherein the number of repeat alkyleneoxy groups typically is from about 2 to about 50 repeat alkyleneoxy groups, although the number of repeat units can be outside of these ranges, a polyaryleneoxy group, wherein the aryl portion of the repeat aryleneoxy groups typically has from about 6 to about 14 carbon atoms, although the number of carbon atoms can be outside of these ranges, such as a polyphenyleneoxy group, a polynaphthaleneoxy group, a polyphenanthreneoxy group, or the like, and wherein the number of repeat aryleneoxy groups typically is from about 2 to about 20 repeat aryleneoxy groups, although the number of repeat units can be outside of these ranges, a polyarylalkyleneoxy group, wherein the arylalkyl portion of the repeat arylalkyleneoxy groups typically has from about 7 to about 50 carbon atoms, although the number of carbon atoms can be outside of these ranges, such as a polybenzyleneoxy group, a polyphenylethyleneoxy group, or the like, and wherein the number of repeat arylalkyleneoxy groups typically is from about 2 to about 20 repeat arylalkyleneoxy groups, although the number of repeat units can be outside of these ranges, a polyalkylaryleneoxy group, wherein the alkylaryl portion of the repeat alkylaryleneoxy groups typically has from about 7 to about 50 carbon atoms, although the number of carbon atoms can be outside of these ranges, such as a polytolueneoxy group or the like, and wherein the number of repeat alkylaryleneoxy groups typically is from about 2 to about 20 repeat alkylaryleneoxy groups, although the number of repeat units can be outside of these ranges, a heterocyclic group (including unsubstituted and substituted heterocyclic groups), typically with from about 2 to about 12 carbon atoms, and typically with from about 4 to about 18 ring atoms, although the number of carbon atoms and the number of ring atoms can be outside of these ranges, wherein the heteroatoms in the heterocyclic groups can be (but are not limited to) nitrogen, oxygen, sulfur, silicon, phosphorus, and the like, as well as mixtures thereof, a silyl group (including unsubstituted and substituted silyl groups), a siloxane group (including unsubstituted and substituted siloxane groups), a polysilylene group (including unsubstituted and substituted polysilylene groups), typically with from 2 to about 100 repeat silylene units, or a polysiloxane group (including unsubstituted and substituted polysiloxane groups), typically with from 2 to about 200 repeat siloxane units, although the number of repeat siloxane units can be outside of this range, wherein the substituents on the substituted alkyl, aryl, arylalkyl, alkylaryl, alkoxy, aryloxy, arylalkyloxy, alkylaryloxy, polyalkyleneoxy, polyaryleneoxy, polyarylalkyleneoxy, polyalkylaryleneoxy, heterocyclic, silyl, siloxy, polysilylene, and polysiloxy groups are hydroxy groups, halogen atoms, cyano groups, ether groups, aldehyde groups, ketone groups, carboxylic acid groups, ester groups, amide groups, carbonyl groups, thiocarbonyl groups, sulfate groups, sulfonate groups, sulfide groups, sulfoxide groups, phosphate groups, nitrile groups, mercapto groups, nitro groups, nitroso groups, sulfone groups, acyl groups, acid anhydride groups, azide groups, cyanato groups, isocyanato groups, thiocyanato groups, isothiocyanato groups, mixtures thereof, and the like, wherein the substituents on the silylene, siloxy, polysilylene, and polysiloxy groups can also be alkyl groups, aryl groups, arylalkyl groups, and alkylaryl groups, wherein two or more substituents can be joined together to form a ring. Up to 4 Z groups can be present on the molecule.

Two or more of the groups $R_1$, Z, and X can be joined together to form a ring.

Some specific examples of colorants of this formula include

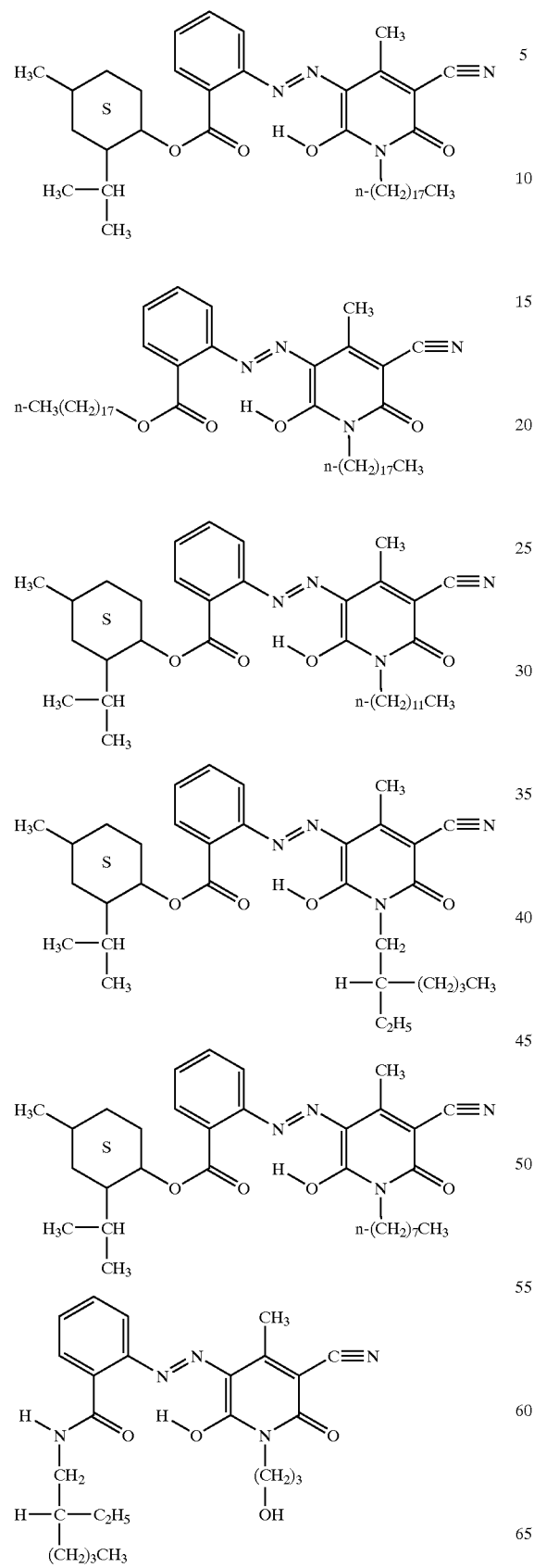
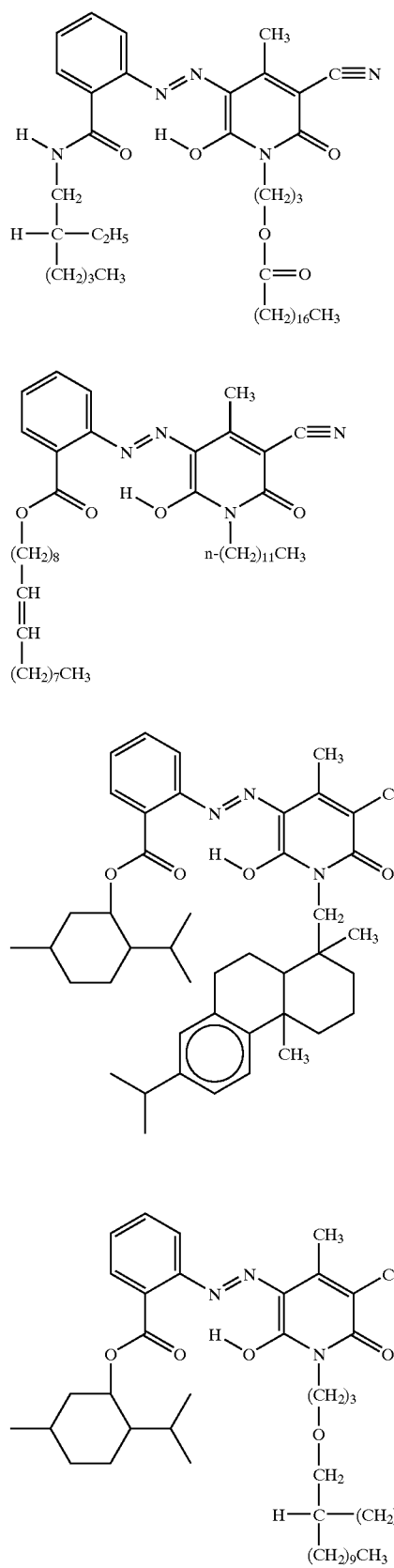

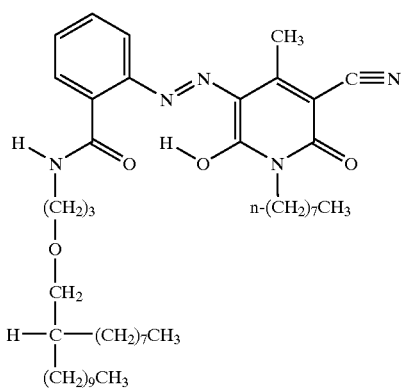

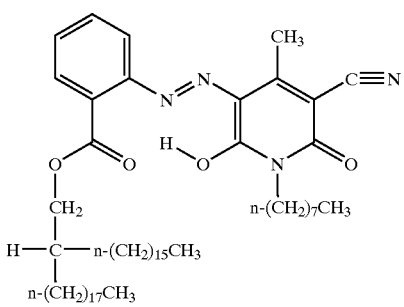

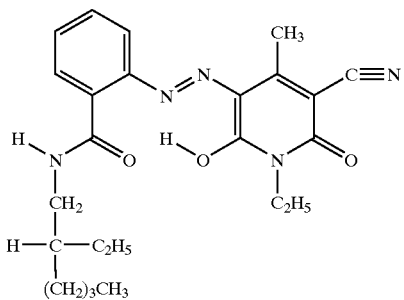

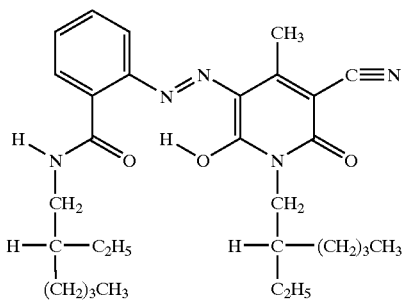

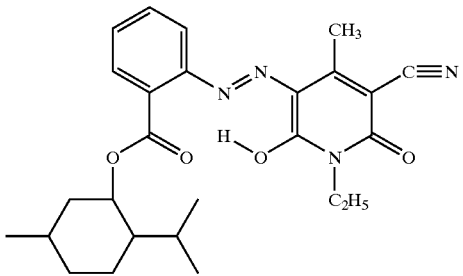

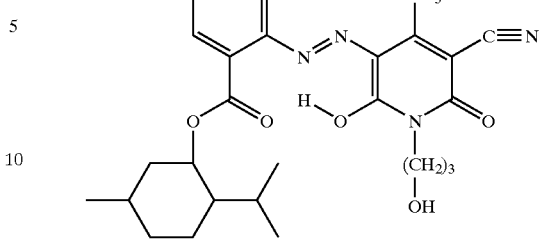

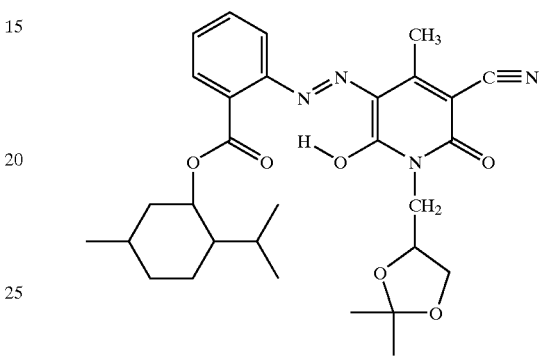

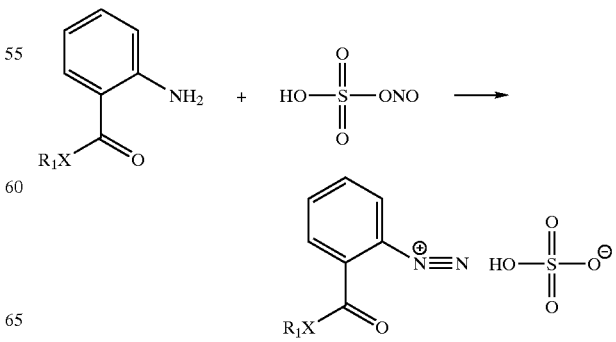

wherein z is an integer of from about 34 to about 44, and the like.

The colorant compounds for the inks of the present invention can be prepared by any desired or effective method. For example, they can be prepared by diazotization of the correspondingly substituted aniline with nitrosylsulfuric acid under cold temperature conditions followed by coupling with the correspondingly substituted pyridone in a buffered alkaline aqueous solution under cold temperature conditions, as follows:

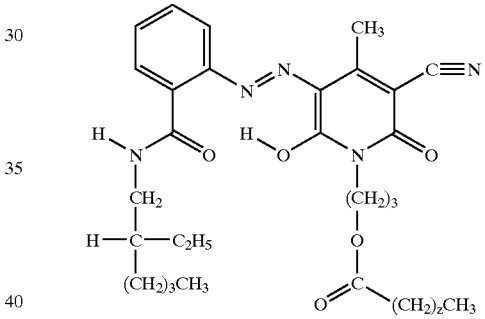

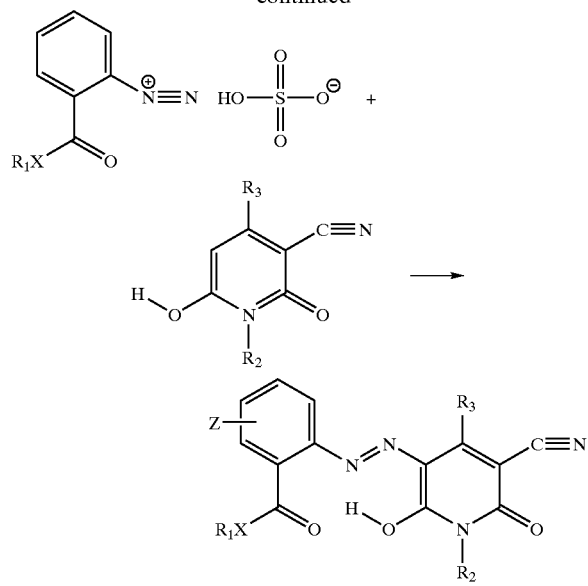

More specifically, the correspondingly substituted aniline is first subjected to a diazotization reaction by dissolving it in acetic acid diluted with a solvent and, optionally, a second acid, such as sulfuric acid, dodecylbenzene sulfonic acid, propionic acid, hydrochloric acid, phosphoric acid, any other acid useful for a diazotization reaction, or the like, as well as mixtures thereof. The solvent can be any solvent useful in a diazotization reaction, such as water, acetone, dimethylformamide, dimethyacetamide, tetrahydrofuran, dimethoxyethane, analogous higher-boiling ether solvents, and the like, as well as mixtures thereof.

The solvent and the aniline are present in any desired or effective relative amounts; if, for purposes of determining relative amounts, "solvent" is defined to include whatever solvent has been selected plus any amount of acetic acid and second acid present, the reactants are present in this combined solvent in relative amounts of in one embodiment at least about 100 grams of substituted aniline per liter of solvent, in another embodiment at least about 200 grams of substituted aniline per liter of solvent, and in yet another embodiment at least about 230 grams of substituted aniline per liter of solvent, and in one embodiment of no more than about 400 grams of substituted aniline per liter of solvent, in another embodiment of no more than about 300 grams of substituted aniline per liter of solvent, and in yet another embodiment of no more than about 270 grams of substituted aniline per liter of solvent, although the relative amounts can be outside of these ranges.

The acetic acid is present in any desired or effective amount, in one embodiment at least about 1 gram of acetic acid per gram of substituted aniline, in another embodiment at least about 2 grams of acetic acid per gram of substituted aniline, and in yet another embodiment at least about 3 grams of acetic acid per gram of substituted aniline, and in one embodiment no more than about 10 grams of acetic acid per gram of substituted aniline, in another embodiment no more than about 7 grams of acetic acid per gram of substituted aniline, and in yet another embodiment no more than about 5 grams of acetic acid per gram of substituted aniline, although the relative amounts can be outside of these ranges.

When present, the optional second acid is present in any desired or effective amount, in one embodiment at least about 0.05 gram of acid per gram of substituted aniline, and in another embodiment at least about 0.1 gram of acid per gram of substituted aniline, and in one embodiment no more than about 0.5 grams of acid per gram of substituted aniline, in another embodiment no more than about 0.3 grams of acid per gram of substituted aniline, and in yet another embodiment no more than about 0.2 grams of acid per gram of substituted aniline, although the relative amounts can be outside of these ranges.

Upon complete dissolution of the ingredients, the mixture is cooled, in one embodiment to a temperature of no more than about +15° C., in another embodiment to a temperature of no more than about +10° C., in yet another embodiment to a temperature of no more than about +5° C., in still another embodiment to a temperature of no more than about +3° C., and in one embodiment to a temperature of no lower than about −5° C., and in another embodiment to a temperature of no lower than about −10° C., although the temperature can be outside of these ranges.

Thereafter, nitrosylsulfuric acid is added to the mixture in any desired or effective amount, in one embodiment at least about 1 mole of nitrosylsulfuric acid per mole of substituted aniline, and in another embodiment at least about 1.05 moles of nitrosylsulfuric acid per mole of substituted aniline, and in one embodiment no more than about 1.5 moles of nitrosylsulfuric acid per mole of substituted aniline, in another embodiment no more than about 1.25 moles of nitrosylsulfuric acid per mole of substituted aniline, and in yet another embodiment no more than about 1.1 moles of nitrosylsulfuric acid per mole of substituted aniline, although the relative amounts can be outside of these ranges. In a specific embodiment, the nitrosylsulfuric acid is added dropwise at a rate such that the temperature of the reaction mixture does not exceed 15° C.

The reaction is essentially instantaneous, and upon completion of addition of the nitrosylsulfuric acid the reaction is essentially complete, although, if desired, a qualitative test can be performed to confirm reaction completion.

Thereafter, residual excess nitrosylsulfuric acid present in the reaction mixture can be quenched by the addition of a quenching agent, such as sulfamic acid, urea, or the like as well as mixtures thereof, in any desired or effective amount, in one embodiment at least about 0.01 mole of quenching agent per mole of nitrosylsulfuric acid (i.e., per mole of nitrosylsulfuric acid originally added to the reaction mixture), in another embodiment at least about 0.05 mole of quenching agent per mole of nitrosylsulfuric acid, and in yet another embodiment at least about 0.1 mole of quenching agent per mole of nitrosylsulfuric acid, and in one embodiment no more than about 0.5 mole of quenching agent per mole of nitrosylsulfuric acid, in another embodiment no more than about 0.3 mole of quenching agent per mole of nitrosylsulfuric acid, and in yet another embodiment no more than about 0.2 mole of quenching agent per mole of nitrosylsulfuric acid, although the amount can be outside of these ranges. Upon completion of the reaction, the reaction mixture contains the corresponding diazonium salt.

A precursor solution of the pyridone having the desired substituents thereon is prepared in an appropriate solvent, such as a mixture of water, organic solvents, including lower alcohols such as methanol, ethanol, isopropanol, and the like, water-miscible nonbasic organic solvents such as tetrahydrofuran, acetone, dimethoxyethane, N,N-dimethylformamide, N,N-dimethylacetamide, and the like, as well as mixtures thereof. Mixtures of water with an organic solvent can be helpful for ease of solvating inorganic or organic salts that are a reaction by-product. In this instance, water and the organic solvent are present in any desired or effective relative amounts, in one embodiment at least about 0.25 gram of organic solvent per gram of water, in another embodiment at least about 0.3 gram of organic solvent per gram of water, and in yet another embodiment at least about 0.4 gram of organic solvent per gram of water, and in one embodiment no more than about 4 grams of organic solvent per gram of water, in another embodiment no more than about 3 grams of organic solvent per gram of water, and in yet another embodiment no more than about 2 grams of organic solvent per gram of water, although the relative amounts can be outside of these ranges.

The pyridone is present in the precursor solution in any desired or effective amount, in one embodiment at least about 10 grams of pyridone per liter of solvent, in another embodiment at least about 30 grams of pyridone per liter of solvent, and in yet another embodiment at least about 50 grams of pyridone per liter of solvent, and in one embodiment no more than about 200 grams of pyridone per liter of solvent, in another embodiment no more than about 100 grams of pyridone per liter of solvent, and in yet another embodiment no more than about 70 grams of pyridone per liter of solvent, although the relative amounts can be outside of these ranges.

The pyridone precursor solution is maintained at an alkaline pH, typically of at least about 10, and in one embodiment no more than about 14, and in another embodiment no more than about 12, although the pH can be outside of these ranges. The pyridone precursor solution can contain a mixture of a base and an optional buffering salt.

Examples of suitable bases include mineral bases, such as sodium hydroxide, potassium hydroxide, and the like, as well as water-miscible organic tertiary amines, such as triethanolamine, N,N-diethylethanolamine, and the like, as well as mixtures thereof, present in any desired or effective amount, in one embodiment at least about 1 mole of base per mole of pyridone, in another embodiment at least about 2 moles of base per mole of pyridone, in yet another embodiment at least about 3 moles of base per mole of pyridone, and in still another embodiment at least about 5 moles of base per mole of pyridone, and in one embodiment no more than about 10 moles of base per mole of pyridone, in another embodiment no more than about 7 moles of base per mole of pyridone, and in yet another embodiment no more than about 5 moles of base per mole of pyridone, although the relative amounts can be outside of these ranges.

Examples of suitable optional buffer salts include those corresponding to the principal acid solvent; for example, when the principal acid solvent is acetic acid, suitable buffers include sodium acetate, potassium acetate, sodium hydrogenphosphate, citric acid, and the like, as well as mixtures thereof. When present, the optional buffer salt is present in any desired or effective amount, in one embodiment at least about 1 mole of buffer per mole of pyridone, in another embodiment at least about 2 moles of buffer per mole of pyridone, in yet another embodiment at least about 3 moles of buffer per mole of pyridone, and in still another embodiment at least about 5 moles of buffer per mole of pyridone, and in one embodiment no more than about 10 moles of buffer per mole of pyridone, in another embodiment no more than about 7 moles of buffer per mole of pyridone, and in yet another embodiment no more than about 5 moles of buffer per mole of pyridone, although the relative amounts can be outside of these ranges. In a specific embodiment, upon dissolution of the pyridone, the thus-formed precursor pyridone solution can be filtered to remove any undissolved solids.

The solution containing the diazonium salt, maintained at a cold temperature, is then slowly added to the pyridone solution in any desired or effective relative amounts, in one embodiment at least about 1 mole of pyridone per mole of diazonium salt, in another embodiment at least about 1.05 moles of pyridone per mole of diazonium salt, and in yet another embodiment at least about 1.1 moles of pyridone per mole of diazonium salt, and in one embodiment no more than about 2 moles of pyridone per mole of diazonium salt, in another embodiment no more than about 1.5 moles of pyridone per mole of diazonium salt, and in yet another embodiment no more than about 1.25 moles of pyridone per mole of diazonium salt, although the relative amounts can be outside of these ranges, resulting in the immediate formation of a bright yellow precipitate. Thereafter, the yellow precipitate can be collected by filtration and, if desired, washed.

Precursor anilines can be prepared by any desired or effective method, such as that disclosed in, for example, "The Chemistry of Isatoic Anhydride," G. M. Coppola, *Synthesis*, p. 505 (1980); "Isatoic Anhydride. IV. Reactions with Various Nucleophiles," R. P. Staiger et al., *J. Org. Chem.*, Vol. 24, p. 1214 (1959); R. P. Staiger et al., *J. Chem. Eng.* Data B, p. 454 (1963); and U.S. Pat. No. 4,016,143; the disclosures of each of which are totally incorporated herein by reference.

Precursor pyridones can be prepared by any desired or effective method, such as that disclosed in, for example, "Investigation of the Reaction Conditions for the Synthesis of 4,6-Disubstituted-3-cyano-2-pyridones and 4-Methyl-3-cyano-6-hydroxy-2-pyridone," D. Z. Mijin et al., *J. Serb. Chem. Soc.*, Vol. 59, No. 12, p. 959 (1994); "Synthesis of Isoquinoline Alkaloids. II. The Synthesis and Reactions of 4-Methyl-3-pyridinecarboxaldehyde and Other 4-Methyl-3-substituted Pyridines, J. M. Bobbitt et al., *J. Org. Chem.*, Vol 25, p. 560 (1960); "Synthesis and Dyeing Characteristics of 5-(4-Arylazophenyl)azo-3-cyano-4-methyl-6-hydroxy-2-pyridones," J. M. Kanhere et al., *Indian Journal of Textile Research*, Vol. 13, p. 213 (1988); "Synthesis of Some Pyridone Azo Dyes from 1-Substituted 2-Hydroxy-6-pyridone Derivatives and their Colour Assessment," C. Chen et al., *Dyes and Pigments*, Vol. 15, p. 69 (1991); "Synthesis of 3-Cyano-6-hydroxy-5-(2-(perfluoroalkyl)phenylazo)-2-pyridones and their Application for Dye Diffusion Thermal Transfer Printing," M. Matsui et al., *Bull. Chem. Soc. Jpn.*, 1993, Vol. 66, Iss. 6, Pp. 1790–4; "Synthesis of N-alkylcyanopyridones," B. Peng et al., *Faming Zhuanli Shenqing Gongkai Shuomingshu* (1997), CN 1158845; "Synthesis of 1-Butyl-3-cyano-4-methyl-6-hydroxypyrid-2-one," X. Kong et al., *Huaxue Shiji* (1998), 20(1), 58–59; "Regioselective Conversion of 3-Cyano-6-hydroxy-2-pyridones into 3-Cyano-6-amino-2-pyridones," A. R. Katritzky et al., *J. Heterocycl. Chem.* (1995), 32(3), 1007–10; "The Synthesis of Some Hetarylazopyridone Dyes and Solvent Effects on their Absorption Spectra," N. Ertan et al., *Dyes Pigm.* (1995), 27(4), 313–20; "Process for the Preparation of Pyridone Compounds," H. Schmid, Ger. Offen. DE 4314430 (1994); "Tautomerism of 4-Methyl-6-hydroxy-2-pyridone derivatives," H. Liu et al., *Dalian Ligong Daxue Xuebao* (1992), 32(4), 405–11; "Preparation of 1-Alkyl-3-cyano-4-methyl-6-hydroxy-2-pyridone-type Mixed Azo Coupling Components," J. Prikryl et al., *Czech.* (1991) 8 pp. CODEN: CZXXA9 CS 273045 B1 19911220 CAN 118:256604 AN 1993:256604 CAPLUS; "Structural Characteristics of Hydroxypyridone Derivatives," Q. Peng et al., *Dalian Ligong Daxue Xueboo* (1991), 31(3), 279–86; and "6-Hydroxypyridin-2-ones," F. Schmidt, Ger. Offen. DE 2845863 (1980); the disclosures of each of which are totally incorporated herein by reference.

While not being limited to any particular theory, it is believed that the ortho-substitution structural feature of the colorant molecules of the present invention enables the formation of strong intramolecular hydrogen bonds between the azo group, the hydroxyl group, and the carbonyl group that imparts rigidity and significant photostability to the colorant under visible light conditions. It is believed that these bonds form as follows:

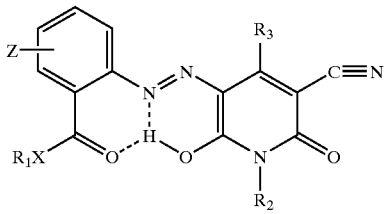

It is believed that this structural feature can also impart thermal stability and chemical stability to the colorant molecule. Further, while not being limited to any particular theory, it is believed that including alkyl groups with at least about 12 carbon atoms, particularly (although not necessarily) branched alkyl groups of this type, in the colorant molecule further reduce diffusion or leaching of the colorant molecule from a medium such as a phase change ink vehicle into adjacent inks of different colors (leading to intercolor bleed), adjacent unprinted areas (leading to edge raggedness), tape adhesives (leading to edge raggedness and possible illegibility), and the like.

Phase change inks of the present invention contain a phase change carrier system or composition. The phase change carrier composition is typically designed for use in either a direct printing mode or an indirect or offset printing transfer system.

In the direct printing mode, the phase change carrier composition in one embodiment contains one or more materials that enable the phase change ink (1) to be applied in a thin film of uniform thickness on the final recording substrate (such as paper, transparency material, and the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in one embodiment exhibits not only the characteristics desirable for direct printing mode inks, but also certain fluidic and mechanical properties desirable for use in such a system, as described in, for example, U.S. Pat. No. 5,389,958, the disclosure of which is totally incorporated herein by reference.

Any desired or effective carrier composition can be used. Examples of suitable ink carrier materials include fatty amides, such as monoamides, tetraamides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

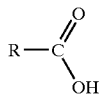

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, U.S. Pat. No. 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, British Patent GB 2 294 939, British Patent GB 2 305 928, British Patent GB 2 305 670, British Patent GB 2 290 793, PCT Publication WO 94/14902, PCT Publication WO 97/12003, PCT Publication WO97/13816, PCT Publication WO96/14364, PCT Publication WO97/33943, and PCT Publication WO95/04760, the disclosures of each of which are totally incorporated herein by reference.

Mixtures of fatty amide materials and isocyanate-derived materials can also be employed as the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

In one specific embodiment, the phase change ink carrier comprises the ink carrier comprises (a) a polyethylene wax, present in the ink in an amount in one embodiment of at least about 25 percent by weight of the ink, in another embodiment of at least about 30 percent by weight of the ink, and in yet another embodiment of at least about 37 percent by weight of the ink, and in one embodiment of no more than about 60 percent by weight of the ink, in another embodiment of no more than about 53 percent by weight of the ink, and in yet another embodiment of no more than about 48 percent by weight of the ink, although the amount can be outside of these ranges; (b) a stearyl stearomide wax, present in the ink in an amount in one embodiment of at least about 8 percent by weight of the ink, in another embodiment of at least about 10 percent by weight of the ink, and in yet another embodiment of at least about 12 percent by weight of the ink, and in one embodiment of no more than about 32 percent by weight of the ink, in another embodiment of no more than about 28 percent by weight of the ink, and in yet another embodiment of no more than about 25 percent by weight of the ink, although the amount can be outside of these ranges; (c) a dimer acid based tetra-amide that is the reaction product of dimer acid, ethylene diamine, and a carboxylic acid derivative of a long chain alcohol having greater than thirty six carbon atoms, present in the ink in an amount in one embodiment of at least about 10 percent by weight of the ink, in another embodiment of at least about 13 percent by weight of the ink, and in yet another embodiment of at least about 16 percent by weight of the ink, and in one embodiment of no more than about 32 percent by weight of the ink, in another embodiment of no more than about 27 percent by weight of the ink, and in yet another embodiment of no more than about 22 percent by weight of the ink, although the amount can be outside of these ranges; (d) a urethane resin derived from the reaction of two equivalents of hydroabietyl alcohol and one equivalent of isophorone diisocyanate, present in the ink in an amount in one embodiment of at least about 6 percent by weight of the ink, in another embodiment of at least about 8 percent by weight of the ink, and in yet another embodiment of at least about 10 percent by weight of the ink, and in one embodiment of no more than about 16 percent by weight of the ink, in another embodiment of no more than about 14 percent by weight of the ink, and in yet another embodiment of no more than about 12 percent by weight of the ink, although the amount can be outside of these ranges; (e) a urethane resin that is the adduct of three equivalents of stearyl isocyanate and a glycerol-based alcohol, present in the ink in an amount in one embodiment of at least about 2 percent by weight of the ink, in another embodiment of at least about 3 percent by weight of the ink, and in yet another embodiment of at least about 4.5 percent by weight of the ink, and in one embodiment of no more than about 13 percent by weight of the ink, in another embodiment of no more than about 10 percent by weight of the ink, and in yet another embodiment of no more than about 7.5 percent by weight of the ink, although the amount can be outside of these ranges; and (f) an antioxidant, present in the ink in an amount in one embodiment of at least about 0.01 percent by weight of the ink, in another embodiment of at least about 0.05 percent by weight of the ink, and in yet another embodiment of at least about 0.1 percent by weight of the ink, and in one embodiment of no more than about 1 percent by weight of the ink, in another embodiment of no more than about 0.5 percent by weight of the ink, and in yet another embodiment of no more than about 0.3 percent by weight of the ink, although the amount can be outside of these ranges.

The ink carrier is present in the phase change ink of the present invention in any desired or effective amount, in one embodiment of at least about 0.1 percent by weight of the ink, in another embodiment of at least about 50 percent by weight of the ink, and in yet another embodiment of at least about 90 percent by weight of the ink, and in one embodiment of no more than about 99 percent by weight of the ink, in another embodiment of no more than about 98 percent by weight of the ink, and in yet another embodiment of no more than about 95 percent by weight of the ink, although the amount can be outside of these ranges.

The phase change inks of the present invention contain a colorant compound of the formula

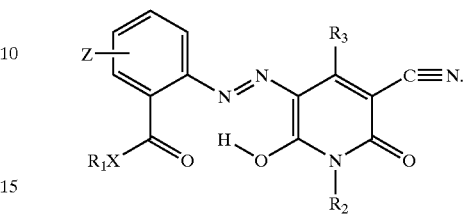

This colorant is present in the ink in any desired or effective amount to obtain the desired color or hue, in one embodiment of at least about 1 percent by weight of the ink, in another embodiment of at least about 2 percent by weight of the ink, and in yet another embodiment of at least about 3 percent by weight of the ink, and in one embodiment of no more than about 20 percent by weight of the ink, in another embodiment of no more than about 13 percent by weight of the ink, and in yet another embodiment of no more than about 6 percent by weight of the ink, although the amount can be outside of these ranges. The colorant according to the present invention can either be the sole colorant in the ink or can be present in combination with other colorants, such as dyes, pigments, mixtures thereof, and the like.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, and NAUGUARD® 512, commercially available from Uniroyal Chemical Company, Oxford, Conn., IRGANOX® 1010, commercially available from Ciba Geigy, and the like. When present, the optional antioxidant is present in the ink in any desired or effective amount, in one embodiment of at least about 0.01 percent by weight of the ink, in another embodiment of at least about 0.1 percent by weight of the ink, and in yet another embodiment of at least about 1 percent by weight of the ink, and in one embodiment of no more than about 20 percent by weight of the ink, in another embodiment of no more than about 5 percent by weight of the ink, and in yet another embodiment of no more than about 3 percent by weight of the ink, although the amount can be outside of these ranges.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, in one embodiment of at least about 0.1 percent by weight of the ink, in another embodiment of at least about 1 percent by weight of the ink, and in yet another embodiment of at least about 10 percent by weight of the ink, and in one embodiment of no more than about 99 percent by weight of the ink, in another embodiment of no more than about 30 percent by weight of the ink, and in yet another embodiment of no more than about 15 percent by weight of the ink, although the amount can be outside of these ranges.

Other optional additives to the inks include clarifiers, such as UNION CAMP® X37-523-235 (commercially available from Union Camp), in an amount in one embodiment of at least about 0.01 percent by weight of the ink, in another embodiment of at least about 0.1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount in one embodiment of at least about 0.1 percent by weight of the ink, in another embodiment of at least about 5 percent by weight of the ink, and in yet another embodiment of at least about 10 percent by weight of the ink, and in one embodiment of no more than about 98 percent by weight of the ink, in another embodiment of no more than about 75 percent by weight of the ink, and in yet another embodiment of no more than about 50 percent by weight of the ink, although the amount can be outside of these range, adhesives, such as VERSAMID® 757, 759, or 744 (commercially available from Henkel), in an amount in one embodiment of at least about 0.1 percent by weight of the ink, in another embodiment of at least about 1 percent by weight of the ink, and in yet another embodiment of at least about 5 percent by weight of the ink, and in one embodiment of no more than about 98 percent by weight of the ink, in another embodiment of no more than about 50 percent by weight of the ink, and in yet another embodiment of no more than about 10 percent by weight of the ink, although the amount can be outside of these ranges, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount in one embodiment of at least about 0.1 percent by weight of the ink, in another embodiment of at least about 1 percent by weight of the ink, and in yet another embodiment of at least about 2 percent by weight of the ink, and in one embodiment of no more than about 50 percent by weight of the ink, in another embodiment of no more than about 30 percent by weight of the ink, and in yet another embodiment of no more than about 10 percent by weight of the ink, although the amount can be outside of these ranges, and the like.

The ink compositions of the present invention in one embodiment have melting points of no lower than about 50° C., in another embodiment of no lower than about 70° C., and in yet another embodiment of no lower than about 80° C., and have melting points in one embodiment of no higher than about 160° C., in another embodiment of no higher than about 140° C., and in yet another embodiment of no higher than about 100° C., although the melting point can be outside of these ranges.

The ink compositions of the present invention generally have melt viscosities at the jetting temperature (in one embodiment no lower than about 75° C., in another embodiment no lower than about 100° C., and in yet another embodiment no lower than about 120° C., and in one embodiment no higher than about 180° C., and in another embodiment no higher than about 150° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, although the melt viscosity can be outside of these ranges.

The ink compositions of the present invention can be prepared by any desired or suitable method. For example, the ink ingredients can be mixed together, followed by heating, to a temperature in one embodiment of at least about 100° C., and in one embodiment of no more than about 140° C., although the temperature can be outside of these ranges, and stirring until a homogeneous ink composition is obtained, followed by cooling the ink to ambient temperature (typically from about 20 to about 25° C.). The inks of the present invention are solid at ambient temperature. In a specific embodiment, during the formation process, the inks in their molten state are poured into molds and then allowed to cool and solidify to form ink sticks.

The inks of the present invention can be employed in apparatus for direct printing ink jet processes and in indirect (offset) printing ink jet applications. Another embodiment of the present invention is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, and the like. Phase change inks of the present invention can also be used in printing processes other than hot melt ink jet printing processes.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A colorant of the formula

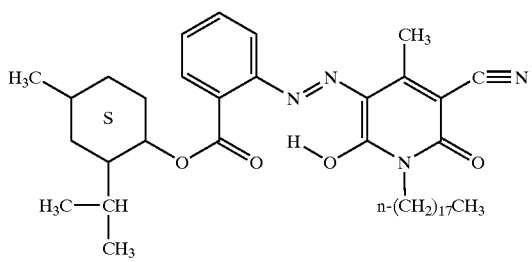

was prepared as follows.

Into a 2 liter flask equipped with stirrer and temperature thermostat was charged octadecylamine (stearylamine, 18.9 grams, 0.07 mol; obtained from Sigma-Aldrich Co., Milwaukee, Wis.) followed with ethyl cyanoacetate (7.9 grams, 0.07 mol; obtained from Spectrum Chemicals, New Brunswick, N.J.). The resulting mixture was stirred and heated to 120° C. internal temperature for 1 hour. To the hot reaction mixture was then sequentially added ethyl acetoacetate (10.08 grams, 0.0775 mol; obtained from Lonza Group, Germany), piperidine (11.0 grams, 0.13 mol; obtained from Sigma-Aldrich Co.), and 60 milliliters of a solvent mixture containing 5 parts by weight toluene and 1 part by weight 1,2-dimethoxyethane. The reaction proceeded at 120° C. for another 24 hours. The solvents were then removed by distillation in vacuo, and the remaining viscous liquid was carefully poured into a solution of methanol (80 milliliters), deionized water (20 milliliters), and concentrated hydrochloric acid (16 milliliters, 2.5 mol). A solid precipitate formed instantly and the slurry was vacuum filtered followed by rinsing the solid cake with 2×50 milliliter portions of 80 percent aqueous methanol. The cake thus obtained was air-dried for 24 hours to afford 24.5 grams (0.061 mol, 87 percent yield) of N-stearyl pyridone product as light tan powder.

Into a 1 liter round-bottom flask equipped with mechanical stirrer and thermometer was charged menthyl anthranilate (137.7 grams, 0.5 mol; obtained from Sigma-Aldrich Co., Milwaukee, Wis.), glacial acetic acid (343 grams), concentrated (94 percent) sulfuric acid (16 grams), and distilled water (69 grams). After complete dissolution of the menthyl anthranilate, the resulting mixture was chilled in an ice bath to an internal temperature of 5 to 10° C. Thereafter, nitrosylsulfuric acid (NSA) (commercial solution containing 40 percent by weight NSA in sulfuric acid, obtained from Sigma-Aldrich Co.; 162.0 grams, 0.51 mol) was added dropwise at such a rate that the solution temperature did not exceed 15° C. This reaction resulted in formation of the corresponding diazonium salt. The residual excess NSA was then quenched by addition of sulfamic acid (4.8 grams, 0.05 mol).

Into a 10 liter beaker fitted with mechanical stirrer was charged N-stearyl pyridone (201.3 grams, 0.5 mol), distilled water (4 liters), sodium hydroxide (100 grams, 2.5 mol), anhydrous sodium acetate (287.2 grams, 3.5 mol), and isopropyl alcohol (2 liters). The solution was stirred well for 30 minutes. The cloudy dark solution was then filtered through a Whatman #4 filter paper and the filtrate was returned to the 10 liter beaker.

The cold diazonium salt solution was poured slowly into the pyridone solution, resulting in the immediate formation of a bright yellow precipitate. After stirring for 30 minutes, the yellow precipitate was vacuum-filtered. The yellow solid was then washed extensively with distilled water by the process of re-dispersing the solid into 4 liter portions of water and filtering, repeating the process until the conductivity of the filtrate was low. The solid yellow cake was given a final rinse with methanol (3 liters) and dried at 40° C. for 24 hours. Total yield was 114.1 grams (35 percent of theoretical) as a bright yellow-orange powder with a melting point of 158° C.

EXAMPLE II

A colorant of the formula

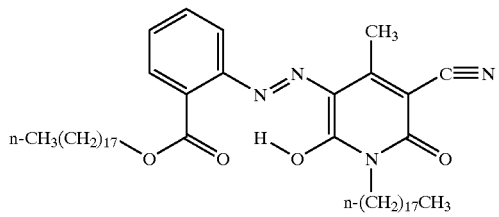

was prepared as follows.

A mixture of octadecanol (270 grams, 1.0 mol; obtained from Sigma-Aldrich Co., Milwaukee, Wis.), isatoic anhydride (244 grams, 1.5 mol; obtained from Sigma-Aldrich Co.), and 1,4-diazabicyclo[2.2.2]octane (56 grams, 0.50 mol; obtained from Sigma-Aldrich Co.) in 1,000 milliliters of dimethylformamide was stirred and heated to 100° C. in a 4 liter beaker. Vigorous gas evolution occurred. After 10 minutes, the resultant brown solution was heated to 150° C. for 15 minutes. The reaction mixture was then cooled to 50° C. and vigorously stirred while 3,000 milliliters of methanol was added. The resultant suspension was stirred for 0.5 hour followed by vacuum filtration. The solid thus obtained was washed in the filter funnel with 4×300 milliliter portions of methanol and then dried in air to give the product stearyl anthranilate as white powder (330.5 grams, 85 percent yield).

N-Stearyl pyridone was prepared as described in Example I.

Into a 1 liter round-bottom flask equipped with stirrer and thermometer was charged stearyl anthranilate (136.4 grams, 0.35 mol), glacial acetic acid (145 grams), dodecylbenzene sulfonic acid (16 grams; obtained from Stepan Chemicals as Biosoft® S-101, Northfield, Ill.), and distilled water (28 grams). After complete dissolution of the stearyl anthranilate, the resulting mixture was chilled in an ice bath to a temperature of 5 to 10° C. Thereafter, nitrosylsulfuric acid (NSA) (commercial solution containing 40 percent by weight NSA in sulfuric acid, obtained from Sigma-Aldrich Co.; 114.4 grams, 0.36 mol) was added dropwise at such a rate that the solution temperature did not exceed 15° C. This reaction resulted in formation of the corresponding diazonium salt. The residual excess NSA was then quenched by addition of sulfamic acid.

Into a 10 liter beaker fitted with mechanical stirrer was charged stearyl pyridone (201.3 grams, 0.5 mol), distilled water (4 liters), sodium hydroxide (100 grams, 2.5 mol), sodium acetate (287.18 grams, 3.5 mol), and isopropyl alcohol (2 liters). The solution was stirred well for 30 minutes. The cloudy solution was then filtered through a Whatman #4 filter paper and the filtrate was returned to the 10 liter beaker.

The cold diazonium salt solution was poured slowly into the pyridone solution, resulting in the immediate formation of a bright yellow precipitate. After stirring for 30 minutes, the precipitate was vacuum-filtered. The yellow solid was then washed extensively with distilled water by the process of re-dispersing the solid into 4 liter portions of water and filtering, repeating the process until the conductivity of the filtrate was low. The solid was then rinsed with methanol (3 liters) and dried at 40° C. to give a final dry yield of 217.2 grams (79 percent) as a bright yellow powder.

EXAMPLE III

A colorant of the formula

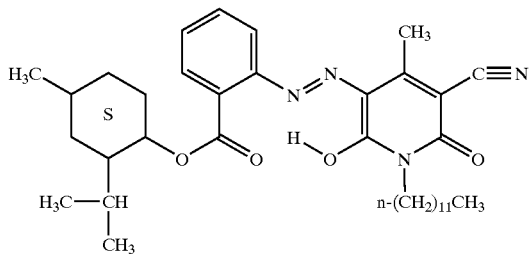

was prepared as follows.

Into a 2 liter round-bottom flask equipped with stirrer and Dean Stark trap was charged melted dodecylamine (185.0 grams, 1.0 mol; obtained from Akzo Nobel Chemicals, Mississauga, Ontario), followed with ethyl cyanoacetate (135.6 grams, 1.2 mol; obtained from Spectrum Chemicals, New Brunswick, N.J.). The colorless mixture was stirred and heated to 120° C. for a period of 1 hour. To the hot reaction mixture stirring at 120° C. internal temperature was then added sequentially, the solvent N,N-dimethylformamide (320 grams; obtained from Caledon Labs, Brampton, Ontario), ethyl acetoacetate (260.0 grams, 2.0 mol; obtained from Lonza Group, Germany), and piperazine (192.2 grams, 2.0 mol; obtained from Spectrum Chemicals, New Brunswick, N.J.). The resultant mixture was heated to 110° C. internal temperature for a period of 4 hours, during which time by-product was distilled away. A golden viscous solution formed and was then allowed to cool to room temperature. The solution was poured, with vigorous stirring while at room temperature, into a prepared solution of methanol (1,624 grams), deionized water (684 grams), and concentrated nitric acid (322 grams, 3.6 mol). A solid material precipitated immediately, and the resulting slurry was stirred for 30 minutes and then vacuum filtered. The solid filter cake was rinsed several times with 500 milliliter portions of a solvent mixture comprising 70 percent by volume methanol and 30 percent by volume water, until the conductivity of the filtrate was low. The solid cake was dried at 40° C. under vacuum for 24 hours to give 277 grams (87 percent yield) of the dodecyl pyridone product as a light beige solid. $^1$H-NMR spectral analysis indicated that the product was of high purity, with no evidence of contaminants exceeding approximately 2 percent of the product yield.

Into a 1 liter round-bottom flask equipped with mechanical stirrer and thermometer was charged menthyl anthranilate (82.6 grams, 0.3 mol; obtained from Sigma Aldrich Co., Milwaukee, Wis.), glacial acetic acid (230 grams), concentrated sulfuric acid (10 grams), and distilled water (40 grams). After complete dissolution of the menthyl anthranilate, the resulting mixture was chilled in an ice bath to an internal temperature of 5 to 10° C. Thereafter, nitrosylsulfuric acid (NSA) (commercial solution containing 40 percent by weight NSA in sulfuric acid; obtained from Sigma Aldrich Co.; 98.5 grams, 0.31 mol) was added dropwise at such a rate that the solution temperature did not exceed 15° C. The residual excess NSA was then quenched by addition of sulfamic acid (4.8 grams, 0.05 mol).

Into a 10 liter beaker fitted with mechanical stirrer was charged N-dodecyl pyridone (95.5 grams, 0.3 mol), distilled water (3 liters), sodium hydroxide (60 grams, 1.5 mol), anhydrous sodium acetate (172.3 grams, 2.1 mol), and isopropyl alcohol (1 liter). The solution was stirred until all solids had dissolved.

The cold diazonium salt solution was poured slowly into the pyridone solution, resulting in the immediate formation of a bright yellow precipitate. After stirring for 30 minutes, the yellow precipitate was vacuum-filtered. The yellow solid was then washed extensively with distilled water by the process of re-dispersing the solid into 4 liter portions of water and filtering, repeating the process until the conductivity of the filtrate was low. The solid yellow filter cake was given a final rinse with methanol (3 liters) and dried at 40° C. for 24 hours. Total yield was 151.2 grams (83 percent of theoretical) as a bright yellow powder with a melting point of 169° C.

EXAMPLE IV

A colorant of the formula

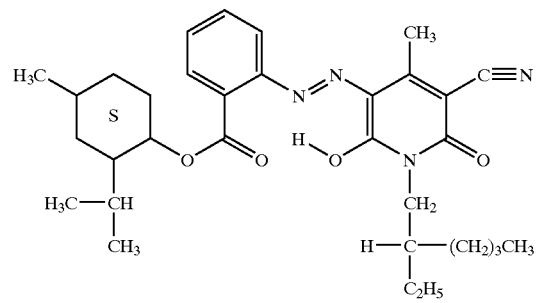

was prepared as follows.

Into a 1 liter round-bottom flask equipped with stirrer and Dean Stark trap was charged methyl cyanoacetate (99 grams, 1 mol; obtained from Sigma-Aldrich Co., Milwaukee, Wis.), followed with methanol solvent (150 milliliters), and the mixture was stirred briefly. 2-Ethylhexylamine (130 grams, 1 mol) was slowly added into this mixture, followed with the sequential addition of ethyl acetoacetate (130 grams, 1 mol; obtained from Sigma-Aldrich Co.), and then piperidine (85 grams, 1 mol; obtained from Sigma-Aldrich Co.). The solution was stirred and heated at 100° C. for 12 hours, and then was cooled to room temperature. The mixture was diluted with 2,500 milliliters of methanol and acidified carefully with concentrated hydrochloric acid until a large amount of precipitate had formed. The precipitate was filtered by vacuum and repeatedly washed with deionized water and filtered until the filtrate was of neutral pH. The crude material was recrystallized in warm methanol to afford 170 grams (65 percent yield) of 2-ethylhexyl pyridone as a white solid.

Into a 500 milliliter vessel equipped with stirrer and thermometer was charged 19.3 grams (0.070 mol) of menthyl anthranilate (obtained from Sigma-Aldrich Co.) and 48 grams of glacial acetic acid. Water (10 grams) was added with stirring, followed by addition of 2.5 grams of concentrated sulfuric acid, giving a clear solution. The resulting mixture was cooled to 0° C., after which 28 grams (0.0875 mol) of nitrosylsulfuric acid (NSA) (commercial solution containing 40 percent by weight NSA in sulfuric acid, obtained from Sigma-Aldrich Co.) was slowly added from an addition funnel, keeping the internal reaction temperature below 10° C. The mixture was stirred for 1 hour at 10° C., after which about 3 grams (0.031 mol) sulfamic acid was added to neutralize any excess NSA.

Into a 2 liter beaker was charged 700 grams of deionized water, 16.2 grams of sodium hydroxide (0.405 mol), and 46 grams of sodium acetate (0.56 mol), and the mixture was stirred until all solids had dissolved. Thereafter, 2-ethylhexyl pyridone (25.5 grams, 0.097 mol) and then isopropanol (80 grams) were added to the solution while stirring at room temperature.

The cold solution of diazonium salt was then poured into the pyridone solution, and a bright yellow precipitate formed immediately. The yellow solids were vacuum filtered, then washed extensively with distilled water by the process of re-dispersing the solid into 2 liter portions of water and filtering, repeating the process until the conductivity of the filtrate was low. The solid yellow filter cake was given a final rinse with methanol (1 liter) and dried at 40° C. for 24 hours. The yellow colorant was then air-dried to give 38.5 grams (78.5 percent) of yield as a bright yellow solid. This material had a melting point of 152° C.

EXAMPLE V

A colorant of the formula

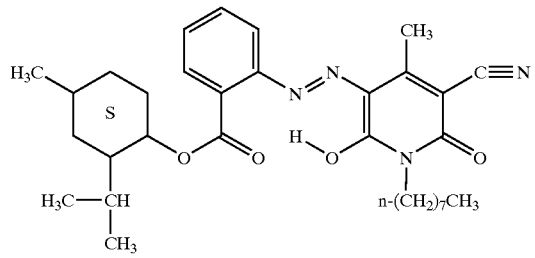

was prepared as follows.

Into a 2 liter flask equipped with a stirrer and Dean Stark trap was charged octylamine (194 grams, 1.5 mol; obtained from Sigma-Aldrich Co., Milwaukee, Wis.) followed with ethyl cyanoacetate (203 grams, 1.8 mol; obtained from Spectrum Chemicals, New Brunswick, N.J.). The mixture thus formed was stirred and then heated to 140° C. for a period of 1 hour. To the hot mixture stirring at 140° C. was then sequentially added a dimethylformamide solvent (375 milliliters; obtained from Caledon Labs, Brampton, Ontario), ethyl acetoacetate (390 grams, 3.0 mol; obtained from Lonza Group, Germany), and piperazine (258 grams, 3.0 mol; obtained from Spectrum Chemicals, New Brunswick, N.J.). The mixture thus formed was heated at 110° C. for 4 hours, during which time more ethanol and water by-products were distilled off. The resulting solution was allowed to cool to room temperature, then poured with vigorous stirring into a prepared solution of methanol (2 liters), deionized water (2 liters), and concentrated nitric acid (448 grams, 5 mol). A solid precipitate formed instantly, and the resulting slurry was stirred for 30 minutes. The slurry was then vacuum filtered and the solid filter cake was rinsed with 1 liter portions of a solvent mixture containing 50 percent by volume methanol and 50 percent by volume water. The solid was dried at 40° C. under vacuum for 24 hours to give the octyl pyridone product as a light tan solid (yield 343 grams; 87 percent). $^1$H-NMR spectral analysis indicated that the product was of high purity.

Into a 500 milliliter vessel equipped with stirrer and thermometer was charged 26.2 grams (0.095 mol) of menthyl anthranilate (obtained from Sigma-Aldrich Co.) and 65 grams glacial acetic acid. Water (13 grams) was added with stirring, followed by addition of 3.2 grams of concentrated sulfuric acid, giving a clear solution. The resulting mixture was cooled to 0° C., after which 45.5 grams (0.143 mol) of nitrosylsulfuric acid (NSA; commercial solution containing 40 percent by weight NSA in sulfuric acid; obtained from Sigma-Aldrich Co.) was slowly added from an addition funnel, keeping the internal reaction temperature below 10° C. Afterward the mixture was stirred for 1 hour at 10° C., after which about 6 grams (0.0618 mol) sulfamic acid was added with stirring for 20 minutes to quench any unreacted excess NSA.

In a 2 liter beaker with magnetic stir bar was combined 500 grams of deionized water, 17.8 grams of sodium hydroxide (0.445 mol), and 50 grams of sodium acetate (0.61 mol). The resulting solution was stirred until all ingredients had dissolved. Thereafter, n-octyl pyridone (25 grams, 0.095 mol) and 200 grams isopropanol were added to this alkaline mixture, after which the pyridone was completely in solution at room temperature.

The cold solution of diazonium salt solution was poured into the pyridone solution, immediately forming a bright yellow precipitate. The yellow solids were vacuum filtered, then washed extensively with distilled water by the process of re-dispersing the solid into 2 liter portions of water and filtering, repeating the process until the conductivity of the filtrate was low. The filter cake was given a final rinse with methanol (1 liter) and dried at 40° C. for 24 hours. Total yield was 47 grams (0.0856 mol, 90 percent yield) of a bright yellow powder, with a melting point of 185 to 186° C.

EXAMPLE VI

A colorant of the formula

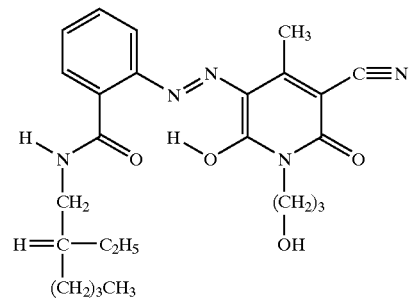

was prepared as follows.

The aniline precursor N-(2-ethylhexyl)-2-aminobenzamide was synthesized from isatoic anhydride and 2-ethylhexylamine as follows. Into a 500 milliliter flask was charged 80.8 grams (0.49 mol) of isatoic anhydride (obtained from Sigma-Aldrich Co., Milwaukee, Wis.) and 125 milliliters of N,N-dimethylacetamide (obtained from Sigma-Aldrich Co.). A solution of 60.5 grams (0.47 mol) of 2-ethylhexylamine and 50 milliliters of N,N-dimethylformamide was then added slowly into the stirred solution of isatoic anhydride. The mixture was stirred at room temperature for about 2 hours, then heated mildly for 4 to 6 more hours. The mixture was then cooled to room temperature and poured into 1.2 liters of deionized water to precipitate the product. The solid material was filtered off, then dissolved into toluene (1 liter) and extracted with 100 milliliters portions of 1 mole per liter aqueous sodium hydroxide solution. The toluene extract was dried with anhydrous magnesium sulfate, and the solvents were removed by distillation in vacuo to afford 111 grams of N-(2-ethylhexyl)-2-aminobenzamide as a white powder (96 percent yield).

A 500 milliliter round-bottom flask was charged sequentially with ethyl cyanoacetate (10.4 grams, 0.092 mol; obtained from Sigma-Aldrich Co.), ethanol (60 milliliters), and 3-aminopropanol (7 grams, 0.095 mol; obtained from Sigma-Aldrich Co.). The mixture thus formed was stirred and heated to about 50° C. over 2 hours, after which time neat ethyl acetoacetate (12 grams, 0.092 mol; obtained from Sigma-Aldrich Co.) was added into the mixture, followed by the addition of potassium carbonate powder (13.4 grams, 0.097 mol). The mixture was then stirred and heated at 90° C. for 8 to 10 hours, during which time gaseous carbon dioxide evolved, then later ceased. The mixture was cooled in an ice bath and acidified by the gradual addition of 25 milliliters of 50 percent by weight of aqueous hydrochloric acid. A white precipitate formed instantly, and after stirring for 30 minutes, the slurry was vacuum filtered. The white solid cake thus collected was rinsed with cold tetrahydrofuran, and was then air-dried to give 16 grams of a white powder (84 percent yield). $^1$H-NMR analysis indicated that the material was pure N-(3-hydroxypropyl) pyridone.

The aniline precursor (2.66 grams; 10.7 mmol) was dissolved in a mixture of 5 milliliters concentrated sulfuric acid, 5 milliliters glacial acetic acid, 0.5 milliliters propionic acid, and 5 milliliters deionized water, and the resulting mixture was cooled to 0° C. About 4.0 grams (12.8 mmol) of nitrosylsulfuric acid (NSA; commercial solution containing 40 percent by weight NSA in sulfuric acid; obtained from Sigma-Aldrich Co.) was added slowly into the cold solution of the aniline at such a rate that the internal temperature was below 5° C. After this time, any excess NSA was neutralized by adding 0.2 grams sulfamic acid to the flask.

The cold pyridone coupling solution was prepared in a 1 liter vessel equipped with mechanical stirrer by dissolving 2.23 grams (10.7 mmol) of N-(3-hydroxypropyl) pyridone, 3.0 grams (75 mmol) of sodium hydroxide, and 8.77 grams (0.107 mol) of sodium acetate into 50 milliliters of distilled water. The cold solution of diazonium salt was added into the chilled pyridone solution, instantly forming a yellow precipitate. The yellow material thus formed was filtered and rinsed with copious amounts of distilled water until the filtrate was of low conductivity. The yellow solid was then dried to afford about 3.95 grams (80 percent yield) of product, with a molecular weight of 467.6 grams per mole.

EXAMPLE VII

A colorant of the formula

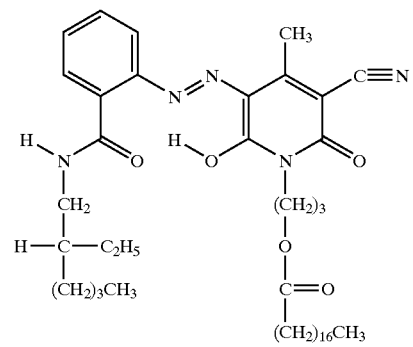

was prepared as follows.

The colorant prepared in Example VI was esterified as follows. A mixture of 2.0 grams (4.3 mmol) of the colorant prepared in Example VI, 1.3 grams (4.5 mmol) of stearic acid, 20 milliliters of toluene, and 0.16 grams (0.43 mmol) of para-toluenesulfonic acid (p-TSA) were charged into a 100 milliliter flask equipped with water condenser and heated at 125° C. for about 3 hours. The solution was then cooled to room temperature and diluted by addition of 200 milliliters of ethyl acetate. The ethyl acetate organic extract thus formed was then washed with distilled water (5×100 milliliter portions) until the waste filtrate water was of neutral pH. The organic extract was then dried with anhydrous sodium sulfate, filtered, and the solvents removed by distillation in vacuo and then dried to give 3.3 grams (quantitative yield) of the stearic acid esterified yellow colorant.

EXAMPLE VIII

Various characteristics of the colorants prepared in Examples I through VII were measured. Structural confirmation of the colorant was obtained by $^1$H-NMR spectroscopy using a 300 megaHertz (7 Tessla) Bruker Avance DPX300 nuclear magnetic resonance spectrometer with a broadband X-transmitter four nucleus probe (two channel system), and performing the analysis for a 50 milligram sample of colorant dissolved in deuterated solvents such as deuterated chloroform ($CDCl_3$) and hexa-deutero dimethylsulfoxide (DMSO-$d_6$), obtained from Sigma-Aldrich Co, Milwaukee, Wis. Melting points were determined by differential scanning calorimetry method using a TA Instruments DSC 2010 calorimeter and whereby a 10 milligram sample of the colorant was heated over one heating cycle at a heating rate of 10° C. per minute up to a maximum of 250° C. For some of the example colorants, quantitative weight concentration of carbon (C), hydrogen (H), and nitrogen (N) was determined by combustion analysis using a LECO CHNS 932 analyzer, for a 2 milligram sample of the colorant. UV/vis wavelength maximum and spectral strength of the colorant were measured in either toluene or dichloromethane solvents using a Hewlett-Packard 8452A diode-array spectrophotometer at a concentration of approximately 0.01 to 0.02 milligrams per milliliter. The results for average molecular weight (MW), melting point range (mp, ° C.), wavelength maximum in toluene ($\lambda_{max}$, nanometers), spectral strength (in toluene, except where otherwise indicated) (SS, mL*$g^{-1}cm^{-1}$), and molar absorptivity ($\epsilon$, L*$mol^{-1}cm^{-1}$) are shown in the table below. Molar Absorptivity $\epsilon$ is defined as the molar extinction coefficient of the colorant, and is expressed by the Beer-Lambert law:

$$\varepsilon = \frac{\text{(measured absorbance)}}{\text{(colorant concentration)} \times \text{(cell path length)}}$$

where colorant concentration has units of mole per liter and path length is 1 centimeter. In addition, Molar Absorptivity, $\epsilon(L*mol^{-1}cm^{-1})$=Spectral Strength (mL*g$^{-1}$cm$^{-1}$)×(colorant molecular weight)÷1000

For comparison purposes, these values are also provided for commercially available NEOPEN 075 YELLOW from BASF.

| Example | MW | mp | $\lambda_{max}$ | SS | $\epsilon$ |
|---|---|---|---|---|---|
| I | 689 | 157–159 | 430 | $5.72 \times 10^4$ | $3.94 \times 10^4$ |
| II | 803.2 | — | 431 | $4.83 \times 10^4$ | $3.88 \times 10^4$ |
| III | 604.8 | 168–169 | 430 | $6.45 \times 10^4$ | $3.90 \times 10^4$ |
| IV | 548.7 | 152–153 | 430 | $6.83 \times 10^4$ | $3.75 \times 10^4$ |
| V | 548.7 | 185–186 | 430 | $7.20 \times 10^4$ | $3.95 \times 10^4$ |
| VI | 467.6 | 240–242 | 429* | $8.02 \times 10^{4*}$ | $3.75 \times 10^{4*}$ |
| VII | 735 | — | 429* | $5.20 \times 10^{4*}$ | $3.82 \times 10^{4*}$ |
| NEOPEN 075 | unknown | — | 430 | $7.47 \times 10^4$ | unknown |

— = not measured
*measured in dichloromethane

EXAMPLE IX

Ink compositions containing the colorants of Examples I through V and, for comparison purposes, commercially available NEOPEN 075 YELLOW from BASF were prepared as follows.

Ink A: In a stainless steel beaker were combined 533.36 grams of polyethylene wax (PE 655, obtained from Baker Petrolite, Tulsa, Okla., of the formula $CH_3(CH_2)_{50}CH_3$), 241.84 grams of stearyl stearamide wax (KEMAMIDE® S-180, obtained from Crompton Corporation, Greenwich, Conn.), about 306.54 grams of a tetraamide resin obtained from the reaction of one equivalent of dimer acid with two equivalents of ethylene diamine and UNICID® 700 (obtained from Baker Petrolite, Tulsa, Okla., a carboxylic acid derivative of a long chain alcohol), prepared as described in Example 1 of U.S. Pat. No. 6,174,937, the disclosure of which is totally incorporated herein by reference, 133.04 grams of a urethane resin obtained from the reaction of two equivalents of ABITOL® E hydroabietyl alcohol (obtained from Hercules Inc., Wilmington, Del.), and one equivalent of isophorone diisocyanate, prepared as described in Example 1 of U.S. Pat. No. 5,782,966, the disclosure of which is totally incorporated herein by reference, 54.04 grams of a urethane resin that was the adduct of three equivalents of stearyl isocyanate and a glycerol-based alcohol prepared as described in Example 4 of U.S. Pat. No. 6,309,453, the disclosure of which is totally incorporated herein by reference, and 2.69 gram of NAUGUARD® 445 antioxidant (obtained from Uniroyal Chemical Co., Middlebury, Conn.). The materials were melted together at a temperature of about 135° C. in an oven, then blended by stirring in a temperature controlled mantle at about 135° C. for about 0.2 hour. To this mixture was then added 75.00 grams of the yellow colorant prepared as described in Example I. After stirring for about 2 additional hours, the yellow ink thus formed was filtered through a heated MOTT® apparatus (obtained from Mott Metallurgical) using NAE 0.2 micro filter and Whatman #3 filter paper (on top of NAE filter) under a pressure of about 15 pounds per square inch. The filtered phase change ink was poured into molds and allowed to solidify to form ink sticks. The yellow phase change ink thus prepared exhibited a viscosity of about 10.42 centipoise as measured by a Rheometrics cone-plate viscometer at about 140° C., melting points of about 86° C. and 104° C. as measured by differential scanning calorimetry using a DuPont 2100 calorimeter, a glass transition temperature ($T_g$) of about 14° C., and a spectral strength, determined by using a spectrophotographic procedure based on the measurement of the colorant in solution by dissolving the solid ink in n-butanol and measuring the absorbance using a Perkin Elmer Lambda 2S UV/VIS spectrophotometer, of about 3517 milliliters absorbance per gram at 429 nanometers.

Ink B: Ink B was prepared in a similar manner to that used to prepare Ink A but using the colorant of Example II.

Ink C: Ink C was prepared in a similar manner to that used to prepare Ink A but using the colorant of Example III.

Ink D: Ink D was prepared in a similar manner to that used to prepare Ink A but using the colorant of Example IV.

Ink E: Ink E was prepared in a similar manner to that used to prepare Ink A but using the colorant of Example V.

Inks F and G (Comparative): Inks were prepared by the process described for Ink A except that instead of the colorant from Example I, the commercially available NEOPEN 075 colorant (obtained from BASF) was used. The properties of Inks F and G were obtained using the same methods as those used for Ink A.

Colorant-free Ink Base: A colorless phase change ink base was prepared in the same manner as described for Ink A except that no colorant was used. The colorless ink base was made for the purpose of evaluating the extent of colorant diffusion into colorless ink base.

The following tables summarize the compositions of the various inks and the amounts of ingredients (weight percentage numbers given in the table) therein:

| Ingredient | Ink A | Ink B | Ink C | Ink D |
|---|---|---|---|---|
| POLYWAX | 39.61 | 38.43 | 39.97 | 40.17 |
| S-180 | 17.96 | 17.43 | 18.12 | 18.13 |
| Tetra-amide | 22.77 | 23.70 | 22.97 | 24.05 |
| Urethane Resin 1* | 9.88 | 9.59 | 9.97 | 11.03 |
| Urethane Resin 2** | 4.01 | 3.90 | 4.05 | 3.57 |
| Example I colorant | 5.57 | — | — | — |
| Example II colorant | — | 6.75 | — | — |
| Example III colorant | — | — | 4.71 | — |
| Example IV colorant | — | — | — | 2.86 |
| NAUGUARD 445 | 0.20 | 0.20 | 0.20 | 0.19 |
| Total | 100.0 | 100.0 | 100.0 | 100.0 |

*ABITOL E based urethane resin
**glycerol alcohol based urethane resin

| Ingredient | Ink E | Ink F | Ink G | Colorless Ink Base |
|---|---|---|---|---|
| POLYWAX | 39.84 | 41.87 | 45.21 | 41.18 |
| S-180 | 17.94 | 19.59 | 18.31 | 19.51 |
| Tetra-amide | 23.49 | 21.50 | 19.70 | 20.16 |
| Urethane Resin 1* | 10.61 | 9.10 | 9.81 | 14.09 |
| Urethane Resin 2** | 3.48 | 3.56 | 4.51 | 4.86 |

-continued

| Ingredient | Ink E | Ink F | Ink G | Colorless Ink Base |
|---|---|---|---|---|
| Example V colorant | 4.44 | — | — | — |
| NEOPEN 075 | — | 4.18 | 2.24 | — |
| NAUGUARD 445 | 0.19 | 0.19 | 0.20 | 0.20 |
| Total | 100.0 | 100.0 | 100.0 | 100.0 |

*ABITOL E based urethane resin
**glycerol alcohol based urethane resin

The yellow inks thus prepared were successfully printed on HAMMERMILL LASERPRINT® paper (obtained from International Paper, Memphis, Tenn.) in a XEROX® PHASER 850 printer, which uses a printing process wherein the ink is first jetted in an imagewise pattern onto an intermediate transfer member followed by transfer of the imagewise pattern from the intermediate transfer member to a final recording substrate. The solid field images with a resolution of 355 dpi×464 dpi were generated from the printer.

Another type of printed samples was generated on HAMMERMILL LASERPRINT® paper using K Printing Proofer (manufactured by RK Print Coat Instrument Ltd., Litlington, Royston, Herts, U.K.). In this method, the tested inks were melted onto a printing plate set at 150° C. A roller bar fitted with the paper was then rolled over the plate containing the melted ink on its surface. The ink on the paper was cooled, resulting in three separated images of rectangular blocks. The most intensely colored block contained the most ink deposited on the paper, and was therefore used to obtain color value measurements.

The color space data of the prints thus generated were obtained on the ACS® Spectro Sensor® II Colorimeter (from Applied Color Systems Inc.) in accordance with the measuring methods stipulated in ASTM 1 E805 (Standard Practice of Instrumental Methods of Color or Color Difference Measurements of Materials) using the appropriate calibration standards supplied by the instrument manufacturer. For purposes of verifying and quantifying the overall calorimetric performance of the inks, measurement data were reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. In addition, the values for CIELAB Psychometric Chroma, $C^*_{ab}$, and CIELAB Psychometric Hue Angle, were calculated according to publication CIE15.2, Colorimetry (Second Edition, Central Bureau de la CIE, Vienna, 1986).

Printed samples of the yellow inks were evaluated for color characteristics, which are reported in the table below. As is apparent to one skilled in the art, the CIE L*a*b* values for inks made with colorants according to the present invention represent an excellent yellow shade printed ink. The table below lists the viscosity ($\eta$, centipoise) of the inks at 140° C., the spectral strength in n-butanol (SS, mL*g$^-$$_1$cm$^{-1}$) of the inks, and the CIE L*a*b color coordinates of the prints made with the inks:

| Ink | η | SS | L*/a*/b* 850 K-Proof | L*/a*/b* PHASER 850 |
|---|---|---|---|---|
| A | 10.42 | 3517 | 87.6 | 91.0 |
|  |  |  | −7.4 | −8.0 |
|  |  |  | 97.0 | 101.6 |
| B | 10.72 | 3241 | — | 88.1 |
|  |  |  |  | −4.8 |
|  |  |  |  | 104.7 |
| C | 10.65 | 3244 | 88.9 | 88.8 |
|  |  |  | −7.6 | −6.0 |
|  |  |  | 99.3 | 102.1 |
| D | 10.68 | 2074 | — | 90.2 |
|  |  |  |  | −8.2 |
|  |  |  |  | 93.0 |
| E | 10.71 | 3108 | 88.7 | 88.5 |
|  |  |  | −9.0 | −6.7 |
|  |  |  | 98.8 | 96.9 |
| F | 10.68 | 3296 | 91.3 | 89.5 |
|  |  |  | −17.6 | −14.6 |
|  |  |  | 89.5 | 97.9 |
| G | 10.68 | 1930 | 91.7 | — |
|  |  |  | −18.5 |  |
|  |  |  | 83.8 |  |

— = not measured

As demonstrated by their L* a* b* color values, Ink A through E have similar color hue and similar or higher yellowness (b* value) as compared to the comparative Inks F and G.

EXAMPLE X

The solid prints from Inks A, B, D, E, F, and G were tested for lightfastness. The prints were irradiated with a 2500-W xenon Arc lamp in Fade-Ometer (Atlas Electric Devices Co., Chicago, Ill.) for varied periods of time at room temperature. The color difference of each irradiated sample relative to its respective un-irradiated control swatch was determined according to the methods described hereinabove for obtaining CIELAB values. Color differences were determined following ASTM D2244-89 (Standard Test Method for Calculation of Color Differences From instrumentally Measured Color Coordinates) $\Delta E=[(L^*_1-L^*_2)^2+(a^*_1-a^*_2)^2+(b^*_1-b^*_2)^2]^{1/2}$. The table below shows the values of $\Delta E$ indicating the change in color values as a function of time:

| Ink | ΔE 0 hours | ΔE 5 hours | ΔE 10 hours | ΔE 20 hours | ΔE 50 hours | ΔE 100 hours |
|---|---|---|---|---|---|---|
| A† | 0 | 1.4 | 1.8 | 2.0 | 1.6 | 1.3 |
| B* | 0 | 3.1 | 3.3 | 3.0 | 2.8 | 2.1 |
| D* | 0 | 0.2 | 0.2 | 0.3 | 0.4 | 0.9 |
| E* | 0 | 1.6 | 2.0 | 2.6 | 2.1 | 2.0 |
| F* | 0 | 0.5 | 0.9 | 1.2 | 1.4 | 3.1 |
| G† | 0 | 1.1 | 1.4 | 1.6 | 2.1 | 2.8 |

* = printed on PHASER 850
† = printed on K-Proofer

As the data indicate, the inks containing colorants according to the present invention exhibit excellent lightfastness values, with ΔE values substantially less than 10 even after 100 hours of irradiation.

EXAMPLE XI

Inks B, C, D, E, and F prepared as described in Example IX were tested for diffusion. A clear ink base was also prepared as described in Example IX. This diffusion evaluation method used printed images to test for the ability of the colorant from a yellow ink pixel to diffuse into neighboring colorless ink pixels that surrounded the yellow ink pixel. The test prints were generated to contain about 20 percent individual yellow pixels surrounded by 80 percent clear ink pixels. The prints were analyzed at 20° C., 45° C., and 60° C. over a number of days for overall color change detected using a color image analyzer, and the response was measured as change in delta E (ΔE) over time and shown in the table below. The color difference of each sample was determined according to the methods described hereinabove for obtaining CIELAB values. Color differences were determined following ASTM D2244-89 (Standard Test Method for Calculation of Color Differences From instrumentally Measured Color Coordinates) (delta $E=[(L^*_1-L^*_2)^2+(a^*_1-a^*_2)^2+(b^*_1-b^*_2)^2]^{1/2}$). Heating the prints served to mimic the conditions when prints are handled in warm climates or passed through high-speed document handlers. The 60° C. print tests were designed as an accelerated test to offer information on colorant diffusion over long periods of time at temperatures lower than 60° C.

| Hours | Ink B | Ink C | Ink D | Ink E | Ink F |
|---|---|---|---|---|---|
| 0 | 0 | 0 | 0 | 0 | 0 |
| 3 | — | 0.3 | 0.7 | 0.2 | 0.2 |
| 6 | — | 0.3 | 2.2 | 0.3 | 0.1 |
| 24 | 0 | 0.5 | 2.3 | 0.3 | 0.3 |
| 49 | 0.6 | — | 3.1 | — | — |
| 53 | — | 0.5 | — | 0.4 | 0.3 |
| 76 | — | — | 3.3 | — | — |
| 96 | 0.1 | — | — | — | — |
| 120 | — | 0.5 | — | 0.4 | 0.7 |
| 168 | 0.1 | — | 3.4 | — | — |
| 192 | — | 0.7 | — | 0.3 | 1.1 |
| 288 | 0.2 | — | — | — | — |
| 336 | — | 0.6 | — | 0.4 | 1.9 |

ΔE at 20° C.;
— = not measured

| Hours | Ink B | Ink C | Ink D | Ink E | Ink F |
|---|---|---|---|---|---|
| 0 | 0 | 0 | 0 | 0 | 0 |
| 3 | — | 0.7 | 3.4 | 0.1 | 2.6 |
| 6 | — | 1.5 | 4.6 | 0.6 | 4.2 |
| 24 | 1.1 | 3.6 | 3.8 | 2.3 | 8.5 |
| 49 | 1.3 | — | 3.7 | — | — |
| 53 | — | 5.4 | — | 4.0 | 12.5 |
| 76 | — | — | 3.8 | — | — |
| 96 | 1.7 | — | — | — | — |
| 120 | — | 7.7 | — | 5.6 | 16.4 |
| 168 | 1.8 | — | 3.9 | — | — |
| 192 | — | 8.9 | — | 6.6 | 19.7 |
| 288 | 2.2 | — | — | — | — |
| 336 | — | 10.1 | — | 7.3 | 23.2 |

ΔE at 45° C.;
— = not measured

| Hours | Ink B | Ink C | Ink D | Ink E | Ink F |
|---|---|---|---|---|---|
| 0 | 0 | 0 | 0 | 0 | 0 |
| 3 | — | 0.8 | 3.1 | 1.8 | 6.1 |
| 6 | — | 1.4 | 4.3 | 3.2 | 8.9 |
| 24 | 2.7 | 3.2 | 3.7 | 7.1 | 17.3 |
| 49 | 3.0 | — | 4.1 | — | — |
| 53 | — | 13.9 | — | 8.8 | 22.5 |
| 76 | — | — | 4.6 | — | — |
| 96 | 3.7 | — | — | — | — |
| 120 | — | 15.5 | — | 10.0 | 27.8 |
| 168 | 4.3 | — | 4.9 | — | — |
| 192 | — | 16.1 | — | 10.3 | 30.2 |
| 288 | 4.6 | — | — | — | — |
| 336 | — | 16.4 | — | 10.2 | 32.2 |

ΔE at 60° C.;
— = not measured

As the data indicate, at test temperatures of 45° C. and 60° C., all colorants examined had migrated into surrounding colorless ink pixels, as observed by the color change and measured as a change in delta E)ΔE). However, the colorants of Examples II through V migrated to a significantly lesser degree than the comparative colorant NEOPEN 075 in the comparative ink. At 20° C., very little diffusion was detected in any of the inks, where the measured ΔE was lower than 5. The accelerated test at 45° C. and 60° C. clearly demonstrated the superiority of the colorants of Examples II through V over the comparative commercial colorant Neopen 075 in their minimized tendencies toward colorant migration.

EXAMPLE XII

Inks A, B, and, for comparative purposes, F, were tested for diffusion. Ink compositions were prepared containing the colorants of Examples I and II and, for comparison purposes, NEOPEN 075, as described in Example IX, as was a colorless ink. This diffusion evaluation method entailed generating text prints of the yellow ink, applying SCOTCH® tape adhesive (obtained from 3M, St. Paul, Minn.) to a portion of the text, and examining the extent of colorant diffusion into the adhesive material over time. The text print samples were studied at room temperature, 45° C., and 60° C. to observe how heat amplified the ability for colorant diffusion. This test simulated the real situation when one applies SCOTCH® tape adhesive labels onto prints generated with inks containing the colorants. Heating the prints served to mimic the conditions when prints are handled in warm climates or passed through high-speed document handlers. The 60° C. print tests were designed as an accelerated test to offer information on colorant diffusion over long periods of time at temperatures lower than 60° C.

Colorant diffusion into the tape adhesive from the comparative ink containing commercial colorant NEOPEN 075 was very noticeable at 60° C., leading to blurred text edges and making the text totally illegible. For Ink A containing the colorant of Example I, diffusion was still noticeable but to a much lesser degree, and the text was still legible. With Ink B containing the colorant of Example II, the extent of diffusion was virtually negligible. Under lower temperature conditions (45° C.) and over longer time period, the ink containing the colorant of Example II also diffused much less than the comparative ink containing NEOPEN 075 commercial dye. A rating system was developed to evaluate the degree of relative colorant diffusion between ink examples, with a rating scale of 1 to 5 wherein a score of 5 represents no noticeable colorant diffusion in the affected text area, and 1 represents excessive colorant diffusion resulting in totally illegible text characters in the affected area. The scores and test conditions for Inks A and B and comparative Ink F are listed in the table below.

| Ink | 7 days at 20° C. | 7 days at 45° C. | 7 days at 60° C. |
|-----|------------------|------------------|------------------|
| A   | 5                | 4                | 2                |
| B   | 5                | —                | 3                |
| D   | 4                | 1                | 1                |

— = not measured

EXAMPLE XIII

The solubilities of the colorants of Examples I and III and, for comparative purposes, commercially available NEOPEN 075, in a phase change ink carrier was examined. Ink compositions A, C, and F containing these colorants were prepared as described in Example IX. Since phase change inks are subjected to a range of temperatures during printer warm-up as well as during operation, it is desirable for the colorants to be complete soluble in the inks at temperatures as low as 125° C. The solubility of each colorant in its respective ink was tested at different temperatures by first heating the inks up to 145° C. and then cooling them down. The results were as follows:

| Temperature | Ink A | Ink C | Ink F |
|-------------|-------|-------|-------|
| 145° C. | soluble | soluble | soluble |
| 135° C. | soluble | soluble | soluble |
| 130° C. | soluble | soluble | soluble |
| 125° C. | soluble | soluble | soluble |
| 120° C. | soluble | soluble | soluble |
| 115° C. | soluble | insoluble | insoluble |

As the results indicate, the colorants of Examples I and III remained completely soluble in their respective inks at temperatures equal to or higher than 120° C.

EXAMPLE XIV

Inks A, B, C, E, F, and G were prepared as described in Example IX containing the colorants of Examples I, III, and V and, for comparative purposes, commercially available NEOPEN 075. Colorant thermal stability in the inks was evaluated by heating the test inks for several days at 141° C. and 145° C. temperatures. Degradation of the colorants was evaluated by monitoring the change (loss) in ink spectral strength at a given test temperature as a function of time. The remaining spectral strength (percentage relative to original value) was used here as the measurement of remaining undegraded colorant in the ink. The results were as follows:

| Day | Ink A | Ink B | Ink C | Ink E | Ink G |
|-----|-------|-------|-------|-------|-------|
| 0   | 100.0 | 100.0 | 100.0 | 100.0 | 100.0 |
| 1   | 98.8  | 99.8  | 99.2  | 99.2  | —     |
| 2   | 96.5  | 98.0  | —     | —     | 99.0  |
| 3   | 94.5  | 97.3  | 97.3  | 97.6  | —     |
| 5   | —     | —     | —     | —     | 74.4  |
| 6   | —     | 94.0  | 94.4  | 94.3  | —     |
| 7   | 91.7  | —     | —     | —     | —     |
| 8   | —     | —     | —     | —     | 52.3  |
| 9   | —     | —     | 90.1  | 86.4  | —     |
| 10  | 88.4  | —     | —     | —     | —     |
| 12  | —     | —     | —     | —     | —     |
| 14  | —     | —     | —     | —     | 23.5  |
| 15  | —     | —     | 88.0  | 86.3  | —     |
| 17  | 84.1  | —     | —     | —     | —     |

Measurements at 145° C.;
— = not measured

| Day | Ink B | Ink C | Ink E | Ink F | Ink G |
|-----|-------|-------|-------|-------|-------|
| 0   | 100.0 | 100.0 | 100.0 | 100.0 | 100.0 |
| 1   | 99.2  | 97.6  | 95.8  | —     | —     |
| 2   | 98.3  | —     | —     | —     | —     |
| 3   | 97.5  | 96.3  | 96.7  | —     | 86.5  |
| 4   | —     | —     | —     | 88.7  | 87.3  |
| 6   | 93.7  | 92.7  | 93.8  | 83.5  | 82.8  |
| 8   | —     | —     | —     | —     | —     |
| 9   | —     | 90.1  | 90.6  | —     | —     |
| 10  | —     | —     | —     | 72.3  | 73.0  |
| 12  | —     | —     | —     | —     | —     |
| 14  | —     | —     | —     | 56.9  | 59.0  |
| 15  | —     | 85.2  | 85.3  | —     | —     |

Measurements at 141° C.;
— = not measured

As the results indicate, Inks A, B, C, and E have remaining spectral strengths higher that 90 percent after being heated for 6 or 7 days at 145° C., whereas comparative Ink F lost about 25 percent of its original spectral strength after being heated at 145° C. for 5 days. Longer heating led to bigger differences in the remaining spectral strengths. Since the loss of spectral strength results from colorant degradation, these results demonstrate that the colorants of Examples I, II, III, and V exhibit clearly superior thermal stability compared to that of commercially available NEOPEN 075.

EXAMPLE XV

Inks A, C, and F as well as a colorless ink were prepared as described in Example IX.

Colorant degradation not only leads to a decrease in spectral strength (as shown in Example XIV) but can also generate undesirable color as a result of the colorant decomposition reaction in the ink. Both of these phenomena can adversely affect the color quality of prints from the inks if the colorant is not thermally stable. From a practical application point of view, it is the overall color change of the ink (measured as ΔE change in color values) that matters most when evaluating colorant thermal stability.

A thermal stability test was performed by heating the test inks and the colorless ink in a printer under operating conditions (the average temperature in the printhead reservoir was about 138° C. in the center and as high as 145° C. near the wall) and measuring the color change of the prints as a function of time (referred to as the "No-standby" test). The color changes of the resultant prints were monitored by CIELAB values and expressed by Delta E relative to the initial CIELAB values. The results for Inks A and C containing the colorants of Examples I and III as well as for the comparative Ink F containing NEOPEN 075 and for the clear ink base were as follows:

| Days | Ink A | Ink C | Ink F | Colorless Ink Base |
|---|---|---|---|---|
| 0.0 | 0.0 | 0.0 | 0.0 | 0.0 |
| 0.7 | — | 1.3 | — | 2.1 |
| 1.0 | 3.5 | 2.4 | 5.7 | 3.3 |
| 2.0 | 5.6 | — | 9.5 | — |
| 4.0 | 8.0 | — | 15.6 | — |
| 4.7 | — | 7.9 | — | 8.1 |
| 5.7 | — | 10.0 | — | 10.2 |
| 7.0 | 12.9 | — | 26.6 | — |
| 7.7 | — | 13.3 | — | 14.9 |
| 8.7 | — | 14.3 | — | 16.2 |
| 9.0 | 14.6 | — | 31.5 | — |
| 11.0 | 18.6 | — | 38.0 | — |
| 11.7 | — | 18.4 | — | 19.3 |
| 13.9 | — | 20.9 | — | 22.6 |
| 16.0 | 25.1 | — | 49.1 | — |
| 18.0 | 25.1 | — | 50.6 | — |
| 21.0 | 31.0 | — | 56.1 | — |

— = not measured

As the data indicate, Inks A and C containing the colorants of Examples I and III demonstrated better color stability than comparative Ink F containing NEOPEN 075. In addition, the color changes observed in the inks containing the colorants of Examples I and III can be attributed largely to discoloring of the ink base, as shown by the data for the clear ink base in the table, indicating very good thermal stability of these colorants.

EXAMPLE XVI

A phase change ink according to the present invention is prepared as follows. A solid ink carrier composition is prepared as described in Example 11 of U.S. Pat. No. 5,780,528, the disclosure of which is totally incorporated herein by reference. To this composition is added about 2.0 percent by weight of the yellow colorant prepared as described in Example I. After stirring for about 3 additional hours, the yellow ink thus formed is filtered through a heated MOTT® apparatus (obtained from Mott Metallurgical) using #3 Whatman filter paper and a pressure of about 15 pounds per square inch. The filtered phase change ink is then poured into molds and allowed to solidify to form ink sticks.

It is believed that the yellow phase change ink thus prepared will exhibit a viscosity of about 11 to 13 centipoise as measured by a Rheometrics cone-plate viscometer at about 140° C., a melting point of about 80° C. as measured by differential scanning calorimetry using a DuPont 2100 calorimeter, a glass transition temperature ($T_g$) of about 14° C., and a spectral strength (determined by using a spectrophotometric method based on the measurement of the colorant in solution by dissolving the solid ink in toluene and measuring the absorbance using a Perkin Elmer Lambda 2S UV/VIS spectrophotometer) of about 150 milliliters absorbance per gram at about 555 nanometers.

EXAMPLE XVII

Into a 2 liter round-bottom flask equipped with mechanical stirrer and Dean Stark trap was charged octylamine (194 grams, 1.5 mol; obtained from Aldrich Chemicals, Oakville, Ontario) followed with ethyl cyanoacetate (203 grams, 1.8 mol; obtained from Spectrum Chemicals, New Brunswick, N.J.). The mixture thus formed was stirred and then heated to 140° C. for a period of 1 hour, during which time a by-product formed and was allowed to distill away.

To the hot reaction mixture was then sequentially added a dimethylformamide solvent (375 milliliters; obtained from Caledon Labs, Brampton, Ontario), ethyl acetoacetate (390 grams, 3.0 mol; obtained from Lonza Group, Germany), and piperazine (258 grams, 3.0 mol; obtained from Spectrum Chemicals, New Brunswick, N.J.). The mixture thus formed was heated at 110° C. for a period of 4 hours, during which time more by-product was distilled off. The resulting solution was then allowed to cool to room temperature.

The solution was then carefully poured, with vigorous stirring, into a prepared room temperature solution of methanol (2 liters), deionized water (2 liters), and concentrated nitric acid (448 grams, 5 mol). A solid precipitate formed almost at once, and the resulting slurry was stirred for 30 minutes. The slurry was then vacuum filtered and the solid cake was rinsed in the funnel with 1 liter portions of a solvent mixture containing 50 percent by volume methanol and 50 percent by volume water. The solid was dried at 40° C. under vacuum for 24 hours to give the octyl pyridone product as a light beige solid (yield 343 grams; 87 percent). $^1$H-NMR spectral analysis indicated that the product was of high purity, with no evidence of contaminants exceeding approximately 2 percent of the product yield.

EXAMPLE XVIII

Into a 1 liter round-bottom flask equipped with mechanical stirrer and Dean Stark trap was charged melted stearylamine (135.0 grams, 0.5 mol; obtained from Aldrich Chemical, Oakville, Ontario) followed with ethyl cyanoacetate (67.8 grams, 0.6 mol, density 1.06 grams per milliliter; obtained from Spectrum Chemicals, New Brunswick, N.J.). The mixture thus formed was stirred and then heated to 120° C. for a period of 1 hour, during which time a by-product had distilled away.

To the hot reaction mixture stirring at 120° C. internal temperature was then sequentially added dimethylformamide (190 grams; obtained from Caledon Labs, Brampton, Ontario), ethyl acetoacetate (130.0 grams, 1.0 mol, density 1.02 grams per milliliter; obtained from Lonza Group, Germany), and piperazine (86.2 grams, 1.0 mol; obtained from Spectrum Chemicals, New Brunswick, N.J.). The mixture thus formed was heated to 120° C. for a period of 6 hours, during which time more by-product had distilled off. The resulting solution was then allowed to cool to room temperature.

The solution was then carefully poured, with vigorous stirring, into a room temperature solution of methanol (1,975 grams) and concentrated nitric acid (180 grams, 2.0 mol). A solid precipitate formed almost at once, and the resulting slurry was stirred for 30 minutes. The slurry was then vacuum filtered in a 25 centimeter Buchner funnel, and the solid cake was rinsed in the funnel with 500 milliliter portions of a solvent mixture containing 50 percent by volume methanol and 50 percent by volume water until the conductivity of the filtrate was low. The solid was dried at 60° C. for 48 hours to give the stearyl pyridone product as a light beige solid (yield 169.5 grams; 84 percent). $^1$H-NMR spectral analysis indicated that the product was of high purity, with no evidence of contaminants exceeding approximately 2 percent of the product yield.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising a phase change ink carrier and a colorant compound of the formula

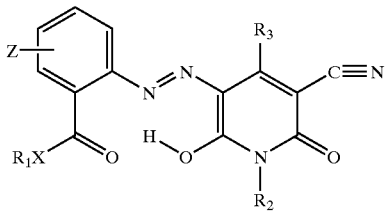

wherein (A) $R_1$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, (B) $R_2$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

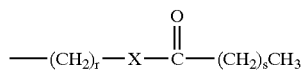

wherein r and s are each, independently of the other, integers representing a number of repeat —$CH_2$— groups, (C) $R_3$ is (i) an alkyl group, (ii) an aryl group, (iii) an arylalkyl group, or (iv) an alkylaryl group, (D) X is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and (E) Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

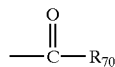

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group.

2. A phase change ink composition according to claim 1 wherein the phase change ink carrier comprises a monoamide, a tetraamide, or a mixture thereof.

3. A phase change ink composition according to claim 1 wherein the phase change ink carrier comprises (a) stearyl stearamide, (b) a dimer acid based tetra-amide that is the reaction product of dimer acid, ethylene diamine, and stearic acid, or (c) mixtures thereof.

4. A phase change ink composition according to claim 1 wherein the phase change ink carrier comprises (a) stearyl stearamide, (b) a dimer acid based tetra-amide that is the reaction product of dimer acid, ethylene diamine, and a carboxylic acid having at least about 36 carbon atoms, or (c) mixtures thereof.

5. A phase change ink composition according to claim 4 wherein the carboxylic acid has at least about 40 carbon atoms, and wherein the carboxylic acid has no more than about 200 carbon atoms.

6. A phase change ink composition according to claim 1 wherein the phase change ink carrier comprises an isocyanate-derived material.

7. A phase change ink composition according to claim 1 wherein the phase change ink carrier comprises a urethane isocyanate-derived material, a urea isocyanate-derived material, a urethane/urea isocyanate-derived material, or mixtures thereof.

8. A phase change ink composition according to claim 1 wherein the phase change ink carrier comprises a mixture of one or more amides and one or more isocyanate-derived materials.

9. A phase change ink composition according to claim 1 wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

10. A phase change ink composition according to claim 1 wherein the phase change ink carrier is present in the ink in an amount of at least about 0.1 percent by weight of the ink and wherein the phase change ink carrier is present in the ink in an amount of no more than about 99 percent by weight of the ink.

11. A phase change ink composition according to claim 1 wherein the phase change ink carrier is present in the ink in an amount of at least about 50 percent by weight of the ink and wherein the phase change ink carrier is present in the ink in an amount of no more than about 98 percent by weight of the ink.

12. A phase change ink composition according to claim 1 wherein the phase change ink carrier is present in the ink in an amount of at least about 90 percent by weight of the ink and wherein the phase change ink carrier is present in the ink in an amount of no more than about 95 percent by weight of the ink.

13. A phase change ink composition according to claim 1 wherein the ink further contains an antioxidant.

14. A phase change ink composition according to claim 13 wherein the antioxidant is present in the ink in an amount of at least about 0.01 percent by weight of the ink, and wherein the antioxidant is present in the ink in an amount of no more than about 20 percent by weight of the ink.

15. A phase change ink composition according to claim 1 wherein the ink further contains a viscosity modifier.

16. A phase change ink composition according to claim 15 wherein the viscosity modifier is an aliphatic ketone.

17. A phase change ink composition according to claim 15 wherein the viscosity modifier is present in the ink in an amount of at least about 0.1 percent by weight of the ink and wherein the viscosity modifier is present in the ink in an amount of no more than about 99 percent by weight of the ink.

18. A phase change ink composition according to claim 1 wherein the ink carrier comprises (a) a polyethylene wax, (b) a stearyl stearamide wax, (c) a dimer acid based tetra-amide that is the reaction product of dimer acid, ethylene diamine, and a carboxylic acid having at least about 36 carbon atoms, (d) a urethane resin derived from the reaction of two equivalents of hydroabietyl alcohol and one equivalent of isophorone diisocyanate, (e) a urethane resin that is the adduct of three equivalents of stearyl isocyanate and a glycerol-based alcohol, and (f) an antioxidant.

19. A phase change ink composition according to claim 1 wherein the ink carrier comprises (a) a polyethylene wax in an amount of at least about 25 percent by weight of the ink and in an amount of no more than about 60 percent by weight of the ink, (b) a stearyl stearamide wax in an amount of at least about 8 percent by weight of the ink and in an amount of no more than about 32 percent by weight of the ink, (c) a dimer acid based tetra-amide that is the reaction product of dimer acid, ethylene diamine, and a carboxylic acid having at least about 36 carbon atoms in an amount of at least about 10 percent by weight of the ink and in an amount of no more than about 32 percent by weight of the ink, (d) a urethane resin derived from the reaction of two equivalents of hydroabietyl alcohol and one equivalent of isophorone diisocyanate in an amount of at least about 6 percent by weight of the ink and in an amount of no more than about 16 percent by weight of the ink, (e) a urethane resin that is the adduct of three equivalents of stearyl isocyanate and a glycerol-based alcohol in an amount of at least about 2 percent by weight of the ink and in an amount of no more than about 13 percent by weight of the ink, and (f) an antioxidant in an amount of at least about 0.01 percent by weight of the ink and in an amount of no more than about 1 percent by weight of the ink.

20. A phase change ink composition according to claim 1 wherein the colorant is present in the ink in an amount of at least about 1 percent by weight of the ink.

21. A phase change ink composition according to claim 1 wherein the colorant is present in the ink in an amount of at least about 2 percent by weight of the ink.

22. A phase change ink composition according to claim 1 wherein the colorant is present in the ink in an amount of at least about 3 percent by weight of the ink.

23. A phase change ink composition according to claim 1 wherein the colorant is present in the ink in an amount of no more than about 20 percent by weight of the ink.

24. A phase change ink composition according to claim 1 wherein the colorant is present in the ink in an amount of no more than about 13 percent by weight of the ink.

25. A phase change ink composition according to claim 1 wherein the colorant is present in the ink in an amount of no more than about 6 percent by weight of the ink.

26. A phase change ink composition according to claim 1 wherein the ink has a melting point of no lower than about 50° C. and wherein the ink has a melting point of no higher than about 160° C.

27. A phase change ink composition according to claim 1 wherein the ink has a melting point of no lower than about 70° C. and wherein the ink has a melting point of no higher than about 140° C.

28. A phase change ink composition according to claim 1 wherein the ink has a melting point of no lower than about 80° C. and wherein the ink has a melting point of no higher than about 100° C.

29. A phase change ink composition according to claim 1 wherein the ink has a melt viscosity at a temperature of about 140° C. of no more than about 30 centipoise.

30. A phase change ink composition according to claim 1 wherein the ink has a melt viscosity at a temperature of about 140° C. of no more than about 20 centipoise.

31. A phase change ink composition according to claim 1 wherein the ink has a melt viscosity at a temperature of about 140° C. of no more than about 15 centipoise.

32. A phase change ink composition according to claim 1 wherein the ink has a melt viscosity at a temperature of about 140° C. of no less than about 1 centipoise.

33. A phase change ink composition according to claim 1 wherein the ink has a melt viscosity at a temperature of about 140° C. of no less than about 5 centipoise.

34. A phase change ink composition according to claim 1 wherein the ink has a melt viscosity at a temperature of about 140° C. of no less than about 7 centipoise.

35. A phase change ink composition according to claim 1 wherein $R_1$ is a linear alkyl group.

36. A phase change ink composition according to claim 1 wherein $R_1$ is a branched alkyl group.

37. A phase change ink composition according to claim 1 wherein $R_1$ is a saturated alkyl group.

38. A phase change ink composition according to claim 1 wherein $R_1$ is an unsaturated alkyl group.

39. A phase change ink composition according to claim 1 wherein $R_1$ is an alkyl group including aliphatic cyclic moieties therein.

40. A phase change ink composition according to claim 1 wherein $R_1$ is an unsubstituted alkyl group.

41. A phase change ink composition according to claim 1 wherein $R_1$ is a substituted alkyl group.

42. A phase change ink composition according to claim 1 wherein $R_1$ is an alkyl group wherein hetero atoms selected from oxygen, nitrogen, sulfur, silicon, or phosphorus are present in the alkyl group.

43. A phase change ink composition according to claim 1 wherein $R_1$ is an alkyl group wherein no hetero atoms are present in the alkyl group.

44. A phase change ink composition according to claim 1 wherein $R_1$ is an alkyl group with at least about 8 carbon atoms.

45. A phase change ink composition according to claim 1 wherein $R_1$ is an alkyl group with at least about 12 carbon atoms.

46. A phase change ink composition according to claim 1 wherein $R_1$ is an alkyl group with at least about 18 carbon atoms.

47. A phase change ink composition according to claim 1 wherein $R_1$ is an aryl group with at least about 10 carbon atoms, an arylalkyl group with at least about 10 carbon atoms, an alkylaryl group with at least about 10 carbon atoms, an alkoxy group with at least about 8 carbon atoms, an aryloxy group with at least about 10 carbon atoms, an arylalkyloxy group with at least about 10 carbon atoms, an alkylaryloxy group with at least about 10 carbon atoms, a polyalkyleneoxy group wherein the alkyl portion of the repeat alkyleneoxy groups has from about 1 to about 12 carbon atoms and wherein the number of repeat alkyleneoxy groups is from about 2 to about 50 repeat alkyleneoxy groups, a polyaryleneoxy group wherein the aryl portion of the repeat aryleneoxy groups has from about 6 to about 14 carbon atoms and wherein the number of repeat aryleneoxy groups is from about 2 to about 20 repeat aryleneoxy groups, a polyarylalkyleneoxy group wherein the arylalkyl portion of the repeat arylalkyleneoxy groups has from about 7 to about 50 carbon atoms and wherein the number of repeat arylalkyleneoxy groups is from about 2 to about 20 repeat arylalkyleneoxy groups, a polyalkylaryleneoxy group wherein the alkylaryl portion of the repeat alkylaryleneoxy groups has from about 7 to about 50 carbon atoms and wherein the number of repeat alkylaryleneoxy groups is from about 2 to about 20 repeat alkylaryleneoxy groups, a heterocyclic group with from about 2 to about 12 carbon atoms and with from about 4 to about 18 ring atoms and wherein the heteroatoms in the heterocyclic groups are nitrogen, oxygen, sulfur, silicon, or phosphorus, a silyl group, a siloxane group, a polysilylene group with from 2 to about 100 repeat silylene units, or a polysiloxane group with from 2 to about 200 repeat siloxane units.

48. A phase change ink composition according to claim 1 wherein $R_1$ is

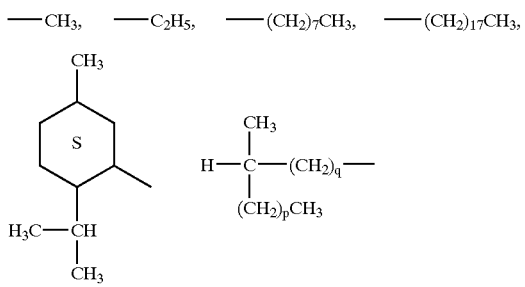

wherein q is an integer of from about 10 to about 15, p is an integer of from 0 to about 3, and the sum of p+q=15, 49. A phase change ink composition according to claim 1 wherein $R_2$ is a linear alkyl group.

50. A phase change ink composition according to claim 1 wherein $R_2$ is a branched alkyl group.

51. A phase change ink composition according to claim 1 wherein $R_2$ is a saturated alkyl group.

52. A phase change ink composition according to claim 1 wherein $R_2$ is an unsaturated alkyl group.

53. A phase change ink composition according to claim 1 wherein $R_2$ is an alkyl group including aliphatic cyclic moieties therein.

54. A phase change ink composition according to claim 1 wherein $R_2$ is an unsubstituted alkyl group.

55. A phase change ink composition according to claim 1 wherein $R_2$ is a substituted alkyl group.

56. A phase change ink composition according to claim 1 wherein $R_2$ is an alkyl group wherein hetero atoms selected from oxygen, nitrogen, sulfur, silicon, or phosphorus are present in the alkyl group.

57. A phase change ink composition according to claim 1 wherein $R_2$ is an alkyl group wherein no hetero atoms are present in the alkyl group.

58. A phase change ink composition according to claim 1 wherein $R_2$ is an alkyl group with at least about 8 carbon atoms.

59. A phase change ink composition according to claim 1 wherein $R_2$ is an alkyl group with at least about 12 carbon atoms.

60. A phase change ink composition according to claim 1 wherein $R_2$ is an alkyl group with at least about 18 carbon atoms.

61. A phase change ink composition according to claim 1 wherein $R_2$ is an aryl group with at least about 10 carbon

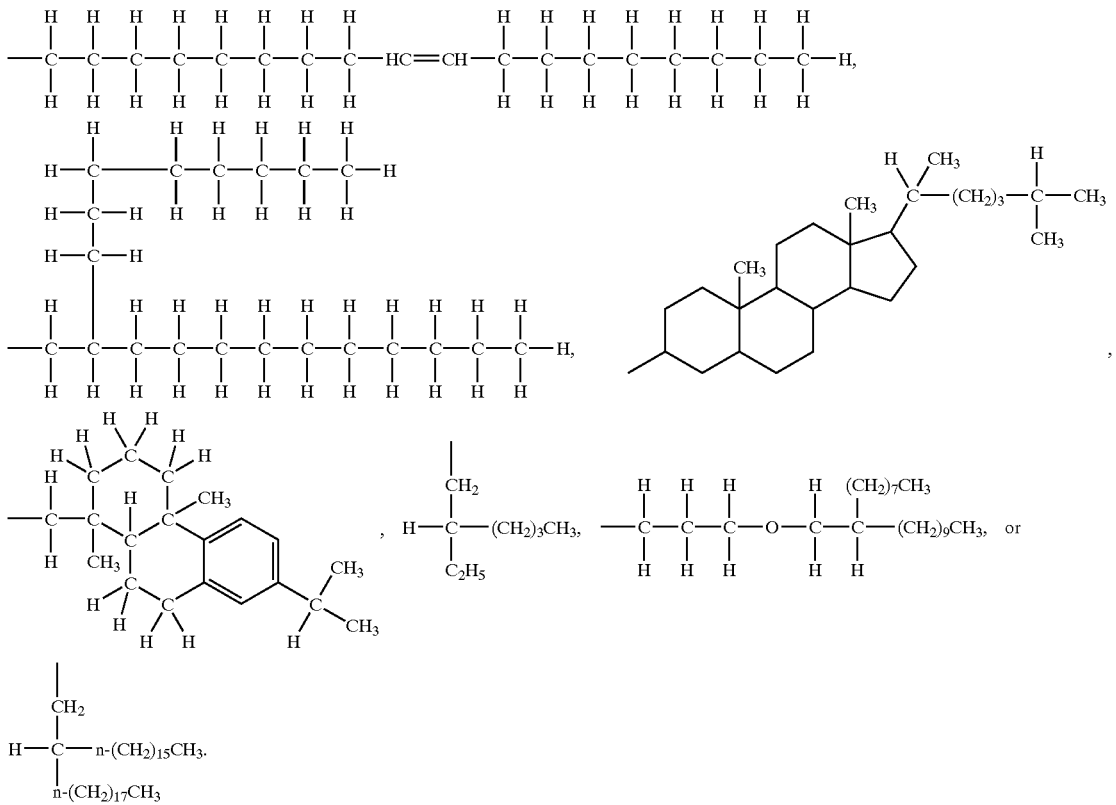

atoms, an arylalkyl group with at least about 10 carbon atoms, an alkylaryl group with at least about 10 carbon atoms, an alkoxy group with at least about 8 carbon atoms, an aryloxy group with at least about 10 carbon atoms, an arylalkyloxy group with at least about 10 carbon atoms, an alkylaryloxy group with at least about 10 carbon atoms, a polyalkyleneoxy group wherein the alkyl portion of the repeat alkyleneoxy groups has from about 1 to about 12 carbon atoms and wherein the number of repeat alkyleneoxy groups is from about 2 to about 50 repeat alkyleneoxy groups, a polyaryleneoxy group wherein the aryl portion of the repeat aryleneoxy groups has from about 6 to about 14 carbon atoms and wherein the number of repeat aryleneoxy groups is from about 2 to about 20 repeat aryleneoxy groups, a polyarylalkyleneoxy group wherein the arylalkyl portion of the repeat arylalkyleneoxy groups has from about 7 to about 50 carbon atoms and wherein the number of repeat arylalkyleneoxy groups is from about 2 to about 20 repeat arylalkyleneoxy groups, a polyalkylaryleneoxy group wherein the alkylaryl portion of the repeat alkylaryleneoxy groups has from about 7 to about 50 carbon atoms and wherein the number of repeat alkylaryleneoxy groups is from about 2 to about 20 repeat alkylaryleneoxy groups, a heterocyclic group with from about 2 to about 12 carbon atoms and with from about 4 to about 18 ring atoms and wherein the heteroatoms in the heterocyclic groups are nitrogen, oxygen, sulfur, silicon, or phosphorus, a silyl group, a siloxane group, a polysilylene group with from 2 to about 100 repeat silylene units, or a polysiloxane group with from 2 to about 200 repeat siloxane units.

62. A phase change ink composition according to claim 1 wherein $R_2$ is a group of the formula

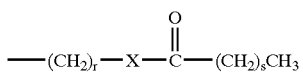

wherein r is at least 1, and wherein r is no more than about 100, and wherein s is at least 1, and wherein s is no more than about 100.

63. A phase change ink composition according to claim 1 wherein $R_2$ is

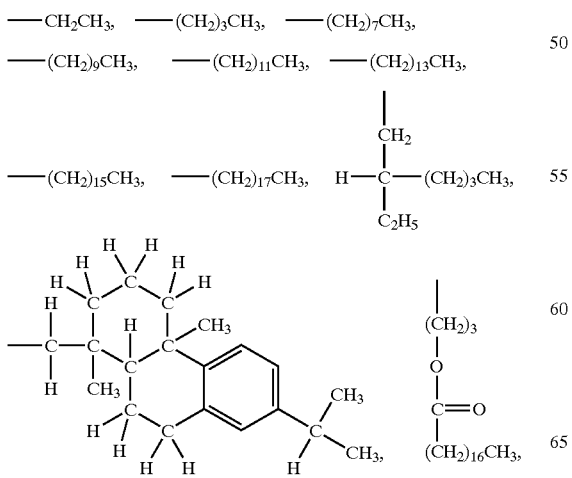

-continued

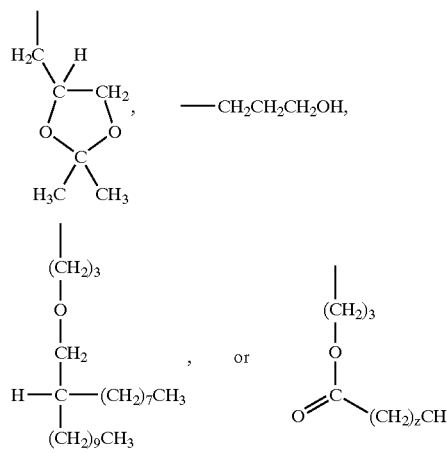

wherein z is an integer of from about 34 to about 44.

64. A phase change ink composition according to claim 1 wherein the colorant compound is of the formulae

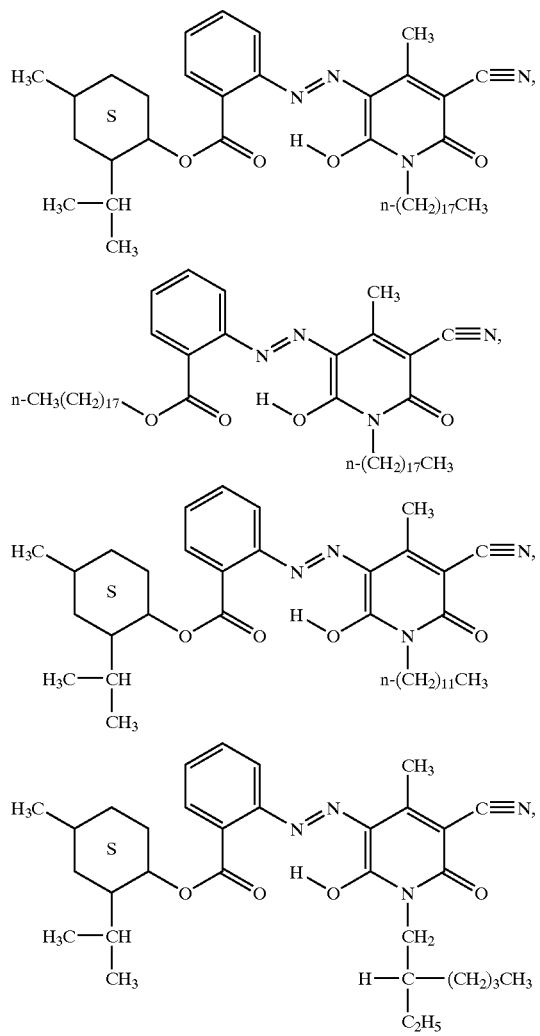

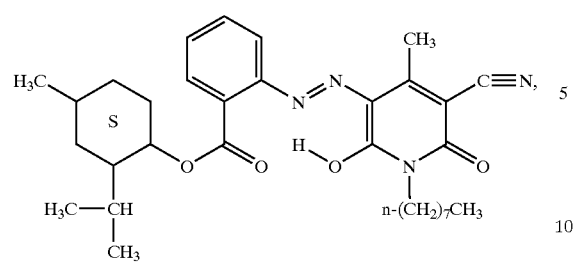
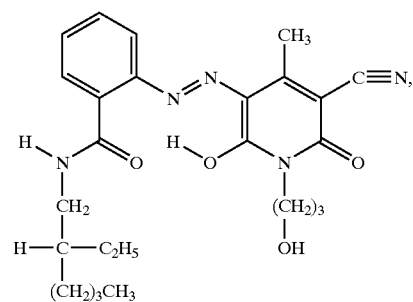
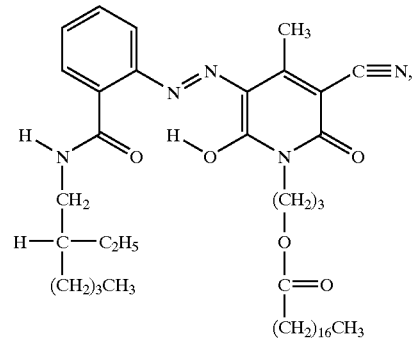
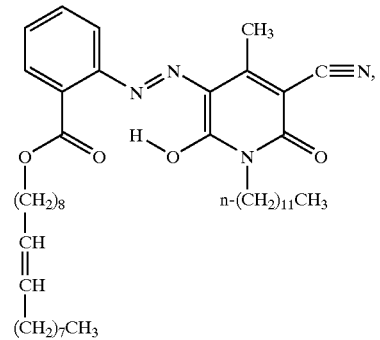
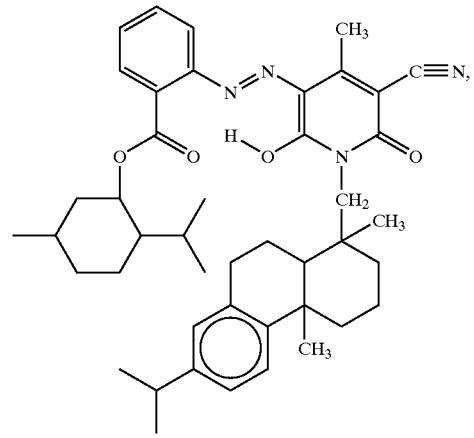
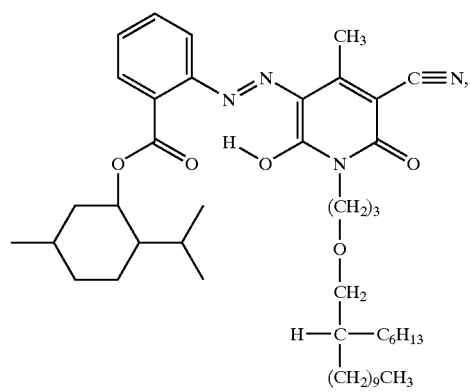
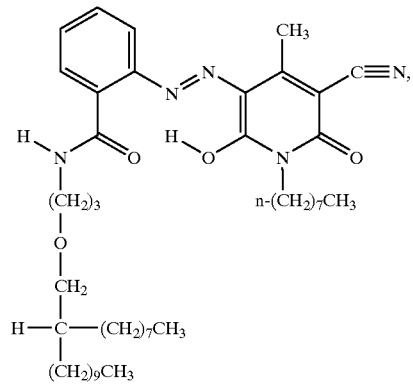
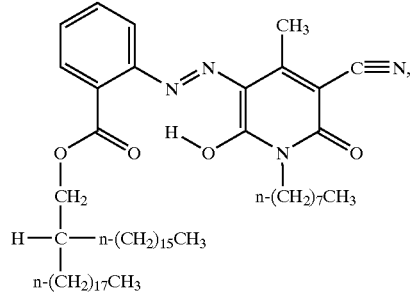
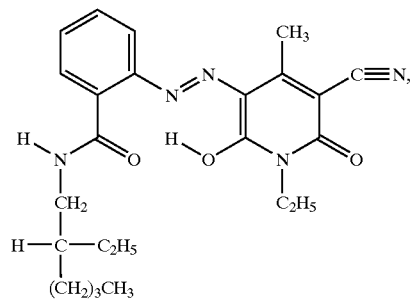
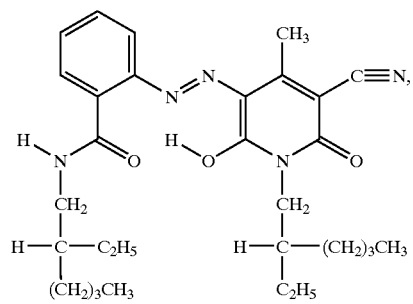

-continued

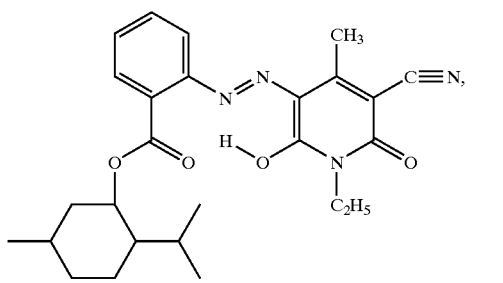

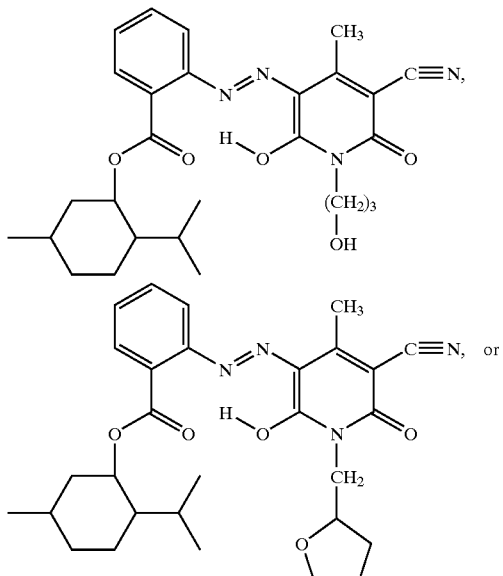

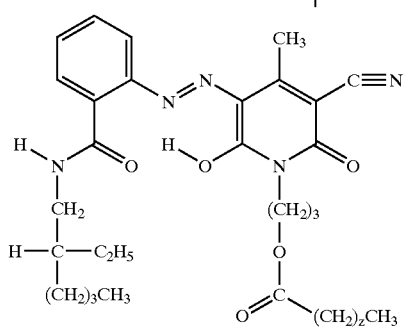

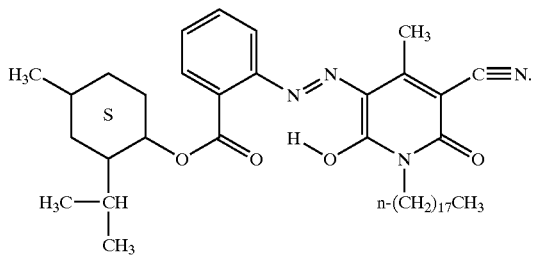

wherein z is an integer of from about 34 to about 44.

65. A phase change ink composition according to claim 1 wherein the colorant compound is of the formula

66. A phase change ink composition according to claim 1 wherein the colorant compound is of the formula

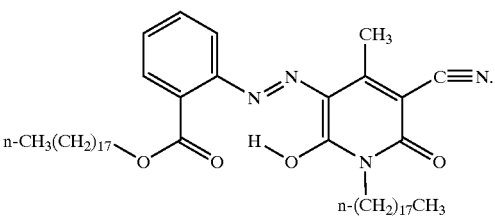

67. A phase change ink composition according to claim 1 wherein the colorant compound is of the formula

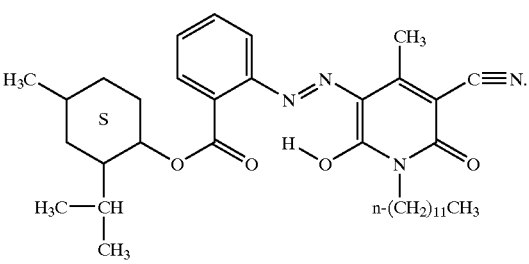

68. A phase change ink composition according to claim 1 wherein the colorant compound is of the formula

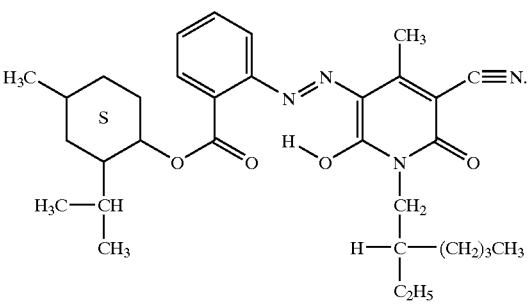

69. A phase change ink composition according to claim 1 wherein the colorant compound is of the formula

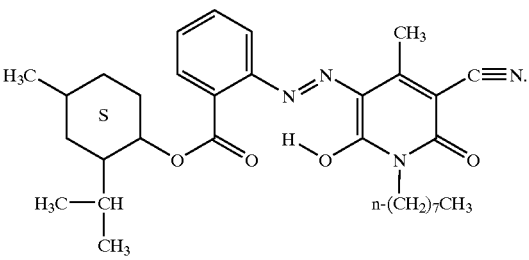

70. A phase change ink composition according to claim 1 wherein the colorant compound is of the formula

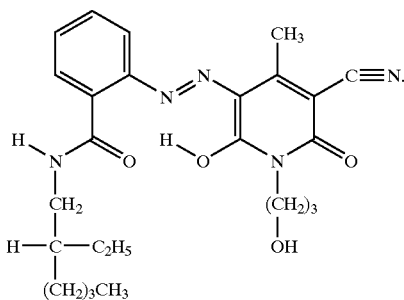

71. A phase change ink composition according to claim 1 wherein the colorant compound is of the formula

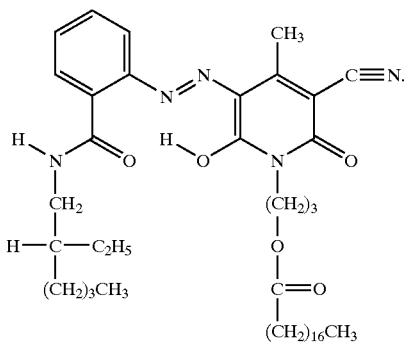

72. A process which comprises (a) incorporating into an ink jet printing apparatus a phase change ink composition comprising a phase change ink carrier and a colorant compound of the formula

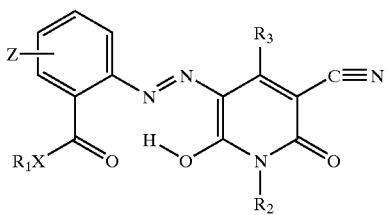

wherein (A) $R_1$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, or (xvii) a polysiloxane group, (B) $R_2$ is (i) an alkyl group, (ii) an aryl group, (iii) an arylalkyl group, (iv) an alkylaryl group, (v) an alkoxy group, (vi) an aryloxy group, (vii) an arylalkyloxy group, (viii) an alkylaryloxy group, (ix) a polyalkyleneoxy group, (x) a polyaryleneoxy group, (xi) a polyarylalkyleneoxy group, (xii) a polyalkylaryleneoxy group, (xiii) a heterocyclic group, (xiv) a silyl group, (xv) a siloxane group, (xvi) a polysilylene group, (xvii) a polysiloxane group, or (xviii) a group of the formula

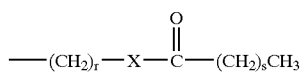

wherein r and s are each, independently of the other, integers representing a number of repeat —$CH_2$— groups, (C) $R_3$ is (i) an alkyl group, (ii) an aryl group, (iii) an arylalkyl group, or (iv) an alkylaryl group, (D) X is (i) a direct bond, (ii) an oxygen atom, (iii) a sulfur atom, (iv) a group of the formula —$NR_{40}$— wherein $R_{40}$ is a hydrogen atom, an alkyl group, an aryl group, an arylalkyl group, or an alkylaryl group, or (v) a group of the formula —$CR_{50}R_{60}$— wherein $R_{50}$ and $R_{60}$ each, independently of the other, is a hydrogen atom, an alkyl group, an aryl group, an arylalkyl group, or an alkylaryl group, and (E) Z is (i) a hydrogen atom, (ii) a halogen atom, (iii) a nitro group, (iv) an alkyl group, (v) an aryl group, (vi) an arylalkyl group, (vii) an alkylaryl group, (viii) a group of the formula

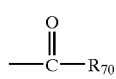

wherein $R_{70}$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, (ix) a sulfonyl group of the formula —$SO_2R_{80}$ wherein $R_{80}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group, or (x) a phosphoryl group of the formula —$PO_3R_{90}$ wherein $R_{90}$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group; (b) melting the ink; and (c) causing droplets of the melted ink to be ejected in an imagewise pattern onto a substrate.

73. A process according to claim 72 wherein the printing apparatus employs a piezoelectric printing process wherein droplets of the ink are caused to be ejected in imagewise pattern by oscillations of piezoelectric vibrating elements.

74. A process according to claim 72 wherein the substrate is a final recording sheet and droplets of the melted ink are ejected in an imagewise pattern directly onto the final recording sheet.

75. A process according to claim 72 wherein the substrate is an intermediate transfer member and droplets of the melted ink are ejected in an imagewise pattern onto the intermediate transfer member followed by transfer of the imagewise pattern from the intermediate transfer member to a final recording sheet.

76. A process according to claim 75 wherein the intermediate transfer member is heated to a temperature above that of the final recording sheet and below that of the melted ink in the printing apparatus.

* * * * *